United States Patent
Voloshynovskiy et al.

(10) Patent No.: US 12,293,007 B2
(45) Date of Patent: May 6, 2025

(54) OBJECT AUTHENTICATION USING DIGITAL BLUEPRINTS AND PHYSICAL FINGERPRINTS

(71) Applicant: Université de Genève, Geneva (CH)

(72) Inventors: Svyatoslav Voloshynovskiy, Vesénaz (CH); Olga Taran, Petit-Lancy (CH); Joakim Tutt, Petit-Lancy (CH); Taras Holotyak, Geneva (CH)

(73) Assignee: Université de Genève, Geneva (CH)

( * ) Notice: Subject to any disclaimer, the term of this patent is extended or adjusted under 35 U.S.C. 154(b) by 359 days.

(21) Appl. No.: 17/835,674

(22) Filed: Jun. 8, 2022

(65) Prior Publication Data
US 2022/0398348 A1 Dec. 15, 2022

(30) Foreign Application Priority Data

Jun. 8, 2021 (CH) .................................. 00676/21
Jun. 30, 2021 (EP) .................................. 21182951

(51) Int. Cl.
*G06F 21/00* (2013.01)
*G06F 18/214* (2023.01)
(Continued)

(52) U.S. Cl.
CPC ............ *G06F 21/64* (2013.01); *G06F 18/214* (2023.01); *G06F 18/22* (2023.01);
(Continued)

(58) Field of Classification Search
CPC ........ G06F 21/64; G06F 18/214; G06F 18/22; G06F 18/2433; G06F 18/2135;
(Continued)

(56) References Cited

U.S. PATENT DOCUMENTS

| 7,644,281 B2 | 1/2010 | Deguillaume et al. |
| 7,965,862 B2 | 6/2011 | Jordan et al. |

(Continued)

FOREIGN PATENT DOCUMENTS

| WO | WO 97/24699 A1 | 7/1997 |
| WO | WO 2005/088517 A1 | 9/2005 |
| WO | WO 2007/028799 A1 | 3/2007 |

OTHER PUBLICATIONS

Wong, Chau-Wai, et al., "Counterfeit Detection Based on Unclonable Feature of Paper Using Mobile Camera," *IEEE Transactions on Information Forensics and Security*, vol. 12, No. 8, pp. 1885-1899 (2017).

(Continued)

*Primary Examiner* — Jeffrey C Pwu
*Assistant Examiner* — Helai Salehi
(74) *Attorney, Agent, or Firm* — Christensen, Fonder, Dardi & Herbert PLLC; John P. Fonder

(57) ABSTRACT

A method of object authentication based on digital blueprints and physical fingerprints comprising the steps of acquiring a set of training blueprints and fingerprints, training, object enrollment and object authentication. The method uses a pair of a mapper realized as an encoder and a decoder and a set of multi-metric scores originating from the decomposition of mutual information and applied to both the output of the encoder and decoder and producing a feature vector for a one-class classifier. The method is trained only on the original physical objects and does not use any fakes for reliable authentication.

28 Claims, 23 Drawing Sheets

(51) Int. Cl.
      G06F 18/22       (2023.01)
      G06F 18/2433     (2023.01)
      G06F 21/64       (2013.01)
      G06N 20/10       (2019.01)
      G06N 20/20       (2019.01)
(52) U.S. Cl.
      CPC ......... *G06F 18/2433* (2023.01); *G06N 20/10* (2019.01); *G06N 20/20* (2019.01)
(58) Field of Classification Search
      CPC . G06F 18/217; G06F 18/24133; G06N 20/10; G06N 20/20; G06V 20/80
      See application file for complete search history.

(56)         References Cited

U.S. PATENT DOCUMENTS

| | | |
|---|---|---|
| 8,387,889 B2 | 3/2013 | Lapstun et al. |
| 8,705,873 B2 | 4/2014 | Voloshynovskiy et al. |
| 8,736,910 B2 | 5/2014 | Sagan et al. |
| 9,436,852 B2 | 9/2016 | Sakina et al. |
| 9,552,543 B2 | 1/2017 | Toedtli et al. |
| 9,594,993 B2 | 3/2017 | Picard et al. |
| 9,794,067 B2 | 10/2017 | Voloshynovskiy |
| 9,947,163 B2 | 4/2018 | Lohweg et al. |
| 10,019,646 B2 | 7/2018 | Voloshynovskiy et al. |
| 2017/0032285 A1 | 2/2017 | Sharma et al. |
| 2017/0109600 A1* | 4/2017 | Voloshynovskiy .... G06V 20/80 |
| 2022/0366061 A1* | 11/2022 | Spivack ................ H04L 9/3271 |
| 2023/0274050 A1* | 8/2023 | O'Sullivan ............. G06F 30/20 703/6 |

OTHER PUBLICATIONS

Schraml, Rudolf, et al., "Real or Fake: Mobile Device Drug Packaging Authentication," in *Proceedings of the 6th ACM Workshop on Information Hiding and Multimedia Security*, New York, NY, USA, IHMMSec18, pp. 121-126, Association for Computing Machinery (2018).
Arppe, Riikka, et al., "Physical unclonable functions generated through chemical methods for anti-counterfeiting," *Nature Reviews Chemistry*, vol. 1, No. 4 (2017).
Carro-Temboury, et al., "An optical authentication system based on imaging of excitation-selected lanthanide luminescence," *Science Advances*, vol. 4, No. 1, 7 pages (2018).
Valehi, Ali, et al., "A Graph Matching Algorithm for User Authentication in Data Networks using Image-based Physical Unclonable Functions," in *Computing Conference* 2017, pp. 863-870 (Jul. 18-20, 2017).
Voloshynovskyy, Svyatoslav, et al., "Mobile visual object identification: from SIFT-BoF-RANSAC to SketchPrint," in *Proceedings of SPIE Photonics West, Electronic Imaging, Media Forensics and Security V.* San Francisco, USA, 16 pages (Jan. 13, 2015).
Diephuis, Maurits, "Micro-structure based physical object identification on mobile platforms", *Ph.D. thesis, University of Geneva*, 219 pages (2017).
Beekhof, Fokko, et al., "Content Authentication and Identification under Informed Attacks," in *Proceedings of IEEE International Workshop on Information Forensics and Security, Tenerife, Spain*, pp. 133-138 (Dec. 2-5, 2012).
Diephuis, Maurits, "A Framework for Fobust Forensic Image Identification," *M.S. thesis, University of Twente*, 164 pgs. (2010).
Diephuis, Maurits, et al., "A framework for fast and secure packaging identification on mobile phones," in *Media Watermarking, Security, and Forensics*, Adnan M. Alattar, et al., Eds. International Society for Optics and Photonics, vol. 9028, pp. 296-305, SPIE (2014).
Pickard, Justin, "Digital authentication with copy-detection patterns," in *Optical Security and Counterfeit Deterrence Techniques V*, Rudolf L. van Renesse, Ed. International Society for Optics and Photonics, vol. 5310, pp. 176-183, SPIE (2004).
Tkachenko, Iuliia, et al., "Exploitation of redundancy for pattern estimation of copy-sensitive two level QR code," in *2018 IEEE International Workshop on Information Forensics and Security (WIFS)*, pp. 1-6 (2018).
Dewaele, Thomas, et al., "Forensic authentication of banknotes on mobile phones," in *Proceedings of SPIE Photonics West, Electronic Imaging, Media Forensics and Security V*, San Francisco, USA, 8 pgs., (Jan. 14-18, 2016).
Adams, Guy, "A study of the Interaction of Paper Substrates on Printed Forensic Imaging," in *Proceedings of the 11th ACM Symposium on Document Engineering, New York, NY, USA*, DocEng '11, p. 263266, Association for Computing Machinery, 4 pgs. (2011).
Pollard, Stephen B., et al., "Model Based Print Signature Profile Extraction for Forensic Analysis of Individual Text Glyphs," in *2010 IEEE International Workshop on Information Forensics and Security*, 6 pgs. (2010).
Ju, Yanling, et al., "Modeling Large-Area Influence in Digital Halftoning for Electrophotographic Printers," in *Color Imaging XVII: Displaying, Processing, Hardcopy, and Applications*, Reiner Eschbach et al., Eds. International Society for Optics and Photonics, vol. 8292, pp. 259-267, SPIE (2012).
Villán, Renato, et al., "Multilevel 2-D Bar Codes: Toward High-Capacity Storage Modules for Multimedia Security and Management," *IEEE Transactions on Information Forensics and Security*, vol. 1, No. 4, pp. 405-420 (2006).
Taran, Olga, "Clonability of Anti-Counterfeiting Printable Graphical Codes: A Machine Learning Approach," in *IEEE International Conference on Acoustics, Speech and Signal Processing*, Brighton, United Kingdom, 5 pgs. (May 2019).
Yadav, Rohit, et al., "Estimation of Copy-sensitive Codes Using a Neural Approach," in *7th ACM Workshop on Information Hiding and Multimedia Security, IH&MMSec '19*, Paris, France, pp. 77-82 )Jul. 2019).
Perry, Burt, et al., "Digital watermarks as a security feature for identity documents," in *Optical Security and Counterfeit Deterrence Techniques III*, Rudolf L. van Renesse and Willem A. Vliegenthart, Eds. International Society for Optics and Photonics, vol. 3973, pp. 80-87, SPIE (2000).
Thulasidharan, Pillai, et al., "QR code based blind digital image watermarking with attack detection code," *International Journal of Electronics and Communications*, vol. 69, No. 7, pp. 1074-1084 (2015).
Sun, Guangmin et al.,, "High-definition Digital Color Image Watermark Algorithm Based on QR code and DWT," in *2015 IEEE 10th Conference on Industrial Electronics and Applications*, pp. 220-223 (2015).
Chow, Yang, Wai, et al., "A QR Code Watermarking Approach based on the DWT-DCT Technique," in *Information Security and Privacy*, Josef Pieprzyk and Suriadi Suriadi, Eds. pp. 314-331, Springer International Publishing (2017).
Feng, Xiaofei, et al., "A Blind Watermarking Method with Strong Robust Based on 2D-barcode," in *2009 International Conference on Information Technology and Computer Science*, vol. 2, pp. 452-456 (2009).
Zhang, Weijun, et al., "An Improved Digital Watermarking Technology Based on QR Code," in *2015 4th International Conference on Computer Science and Network Technology (ICCSNT)*, vol. 01, pp. 1004-1007 (2015).
Vongpradhip, Sartid, et al., "QR Code Using Invisible Watermarking in Frequency Domain," in *2011 Ninth International Conference on ICT and Knowledge Engineering*, pp. 47-52 (2012).
Li, Li, et al., "A Digital Watermark Algorithm for QR Code," *International Journal of Intelligent Information Processing*, vol. 2, No. 2, pp. 29-36 (2011).
Panyavaraporn, Jantana, et al., "QR Code Watermarking Algorithm Based on Wavelet Transform," in *2013 13th International Symposium on Communications and Information Technologies (ISCIT)*, pp. 791-796 (2013).

(56) References Cited

OTHER PUBLICATIONS

Sun, Ming, et al., "Research on embedding and extracting methods for digital watermarks applied to QR code images," *New Zealand Journal of Agricultural Research*, vol. 50, No. 5, pp. 861-867 (2007).
Xie, Rongsheng, et al., "Anti-counterfeiting digital watermarking algorithm for printed QR barcode," *Neurocomputing*, vol. 167, pp. 625-635 (2015).
Lin, Pei-Yu, et al., "Secret Hiding Mechanism Using QR Barcode," in *2013 International Conference on Signal-Image Technology Internet-Based Systems*, pp. 22-25 (2013).
Barmawi, Ari Moesriami, et al., "Watermarking QR Code," in *2015 2nd International Conference on Information Science and Security (ICISS)*, pp. 1-4 (2015).
Bui, Thach V., et al., "Robust Message Hiding for QR Code," in *2014 Tenth International Conference on Intelligent Information Hiding and Multimedia Signal Processing*, pp. 520-523 (2014).
Tkachenko, Iuliia, et al., "Two-Level QR Code for Private Message Sharing and Document Authentication," *IEEE Transactions on Information Forensics and Security*, vol. 11, No. 3, pp. 571-583 (2016).
Tkachenko, Iu., et al., "Printed Document Authentication Using Two Level QR Code," in *2016 IEEE International Conference on Acoustics, Speech and Signal Processing (ICASSP)*, pp. 2149-2153 (2016).
Cheng, Yuqiao, "A new two-level QR code with visual cryptography scheme," *Multimedia Tools and Applications*, vol. 77, No. 16, pp. 20629-20649 (2018).
Nguyen, H.Phuong, et al., "A Watermarking Technique to Secure Printed QR Codes Using a Statistical Test," in *2017 IEEE Global Conference on Signal and Information Processing (GlobalSIP)*, pp. 288-292 (2017).
Nguyen, Hoai Phuong, et al., "A Watermarking Technique to Secure Printed Matrix Barcode-Application for Anti-Counterfeit Packaging," *IEEE Access*, vol. 7, pp. 131839-131850 (2019).
Yuan, Tailing, et al., "Two-Layer QR Codes," *IEEE Transactions on Image Processing*, vol. 28, No. 9, pp. 4413-4428 (2019).
Kutter, Martin, et al., "The Watermark Copy Attack," in *Security and Watermarking of Multimedia Contents II*, Ping Wah Wong and Edward J. Delp III, Eds. International Society for Optics and Photonics, vol. 3971, pp. 371-380, SPIE (2000).
Reed, Alastair, et al., "Watermarking Spot Colors in Packaging," in *Media Watermarking, Security, and Forensics 2015*, vol. 9409 of Society of Photo-Optical Instrumentation Engineers (SPIE) Conference Series, pp. 940-906 (Mar. 2015).
Huang, Sandy, et al., "Adversarial Attacks on Neural Network Policies," 10 pgs. (2017).
Carlini, Nicholas, et al., "Towards Evaluating the Robustness of Neural Networks," in *2017 IEEE Symposium on Security and Privacy (SP)*, pp. 39-57 (2017).
Ho, Anh Thu Phan, et al., "Document Authentication Using Graphical Codes: Impacts of the Channel Model," in *ACM Workshop on Information Hiding and Multimedia Security*, Montpellier, France, Jun. 2013, pp. ACM 978-1-4503-2081 (Aug. 13, 2006).
Bishop, Christopher M., "Pattern Recognition and Machine Learning (Information Science and Statistics), Ch. 7, Sparse Kernel Machines", Springer-Verlag, Berlin, Heidelberg, 16 pgs. (2006).
Bishop, Christopher M., "Pattern Recognition and Machine Learning (Information Science and Statistics), Ch. 12, Continuous Latent Variables", Springer-Verlag, Berlin, Heidelberg, 12 pgs. (2006).
Murphy, Kevin P., "Machine Learning: A Probabilistic Perspective", MIT Press, Cambridge, Mass. [u.a.], 12 pgs. (2013).
Goodfelow, Ian, et al., :Deep Learning, MIT Press, Cambridge, MA, USA, url http://www.deeplearningbook.org, 42 pgs. (2016).
Taran, Olga, et al., "Adversarial Detection of Counterfeited Printable Graphical Codes: Towards 'Adversarial Games' in Physical World," in *ICASSP 2020—2020 IEEE International Conference on Acoustics, Speech and Signal Processing (ICASSP)*, pp. 2812-2816 (2020).
Kurakin, Alexey, et al., "Adversarial Examples in the Physical World," CoRR, vol. abs/1607.02533, 14 pgs. (2016).
MacMillan, Neil A., et al., "Detection Theory: A User's Guide", Lawrence Erlbaum Associates, Mahwah, New Jersey, London, 23 pgs. (2005).
Poor, H. Vincent, "An Introduction to Signal Detection and Estimation", Springer-Verlag, Berlin, Heidelberg, 40 pgs. (2013).
Kingma, Diederik P., et al., "Auto-Encoding Variational Bayes," in *2nd International Conference on Learning Representations, ICLR*, Ban , AB, Canada, Apr. 14-16, 2014, Conference Track Proceedings, 14 pgs. (2014).
Makhzani, Alireza, et al., "Adversarial Autoencoders," CoRR, vol. abs/1511.05644, 16 pgs. (2015).
Ruff, Lukas, et al., "Deep One-Class Classification," in *Proceedings of the 35th International Conference on Machine Learning*, Jennifer Dy and Andreas Krause, Eds. 10-15, vol. 80 of Proceedings of Machine Learning Research, pp. 4393-4402, PMLR (Jul. 2018).
Sabokrou, Mohammad, et al., "Adversarially Learned One-Class Classifier for Novelty Detection.," in CVPR. 2018, pp. 3379-3388, IEEE Computer Society (Feb. 2018).
Salehi, Mohammadreza, et al., "Puzzle-AE: Novelty Detection in Images Through Solving Puzzles," CoRR, vol. abs/2008.12959, 12 pgs. (2020).
He, Kaiming, et al., "Deep Residual Learning for Image Recognition," in *2016 IEEE Conference on Computer Vision and Pattern Recognition (CVPR)*, pp. 770-778 (2016).
Ronneberger, Olaf, et al., "U-Net: Convolutional Networks for Biomedical Image Segmentation," *Medical Image Computing and Computer-Assisted Intervention MICCAI 2015*, pp. 234-241 (May 2015).
Bergmann, Paul, et al., "The MVTec Anomaly Detection Dataset: A Comprehensive Real-World Dataset for Unsupervised Anomaly Detection," *International Journal of Computer Vision*, vol. 129, No. 4, pp. 1038-1059 (2021).
Ohtsu, Nobuyuki, "A Threshold Selection Method From Gray-Level Histograms," *IEEE Transactions on Systems*, Man, and Cybernetics, vol. 9, No. 1, pp. 62-66 (1979).
Chen, Yunqiang, et al., "One-class SVM for Learning in Image Retrieval," in *Proceedings 2001 International Conference on Image Processing (Cat. No.01CH37205)*, vol. 1, pp. 34-37 (2001).
Belghazi, Mohamed Ishmael, "Mutual Information Neural Estimation," in *Proceedings of the 35th International Conference on Machine Learning*, Jennifer Dy and Andreas Krause, Eds. Vol. 80 of Proceedings of Machine Learning Research, pp. 531-540, PMLR (Jul. 10-15, 2018).
Voloshynovskiy, Slava, et al., "Information bottleneck through variational glasses," in *NeurIPS Workshop on Bayesian Deep Learning*, Vancouver, Canada, 16 pgs. (Dec. 2019).
Goodfellow, Ian J., et al. "Generative Adversarial Nets," in *Proceedings of the 27th International Conference on Neural Information Processing Systems*, vol. 2, Cambridge, MA, USA, NIPS'14, p. 2672-2680, MIT Press (2014).
Sugiyama, Masashi, et al., *Density Ratio Estimation in Machine Learning*, Cambridge University Press, USA, 1st edition, 17 pgs. (2012).
Nowozin, Sebastian, et al., "f-GAN: Training Generative Neural Samplers using Variational Divergence Minimization," *30th Conference on Neural Information Processing Systems (NIPS 2016)*, 9 pgs. (2016).
Sugiyama, Masashi, et al., "Density-ratio matching under the Bregman divergence: a unifed framework of density-ratio estimation," *Annals of the Institute of Statistical Mathematics*, vol. 64, No. 5, pp. 1009-1044 (Oct. 2012).
Arjovsky, Martin, et al., "Wasserstein Generative Adversarial Networks," cite arxiv: 1701.07875, 10 pgs. (2017).
Chwialkowski, Kacper, et al., "Fast Two-Sample Testing with Analytic Representations of Probability Measures," in *Proceedings of the 28th International Conference on Neural Information Processing Systems*,—vol. 2, Cambridge, MA, USA, NIPS'15, pp. 1981-1989, MIT Press (2015).

(56) References Cited

OTHER PUBLICATIONS

Weinberger, Kilian Q., et al., "Distance Metric Learning for Large Margin Nearest Neighbor Classification," in *Advances in Neural Information Processing Systems*, Y. Weiss, B. Scholkopf, and J. Platt, Eds., vol. 18, MIT Press, 8 pgs. (2006).

Sohn, Kihyuk, "Improved Deep Metric Learning with Multi-class N-pair Loss Objective," in *Advances in Neural Information Processing Systems*, D. Lee, M. Sugiyama, U. Luxburg, I. Guyon, and R. Garnett, Eds., vol. 29, Curran Associates, Inc., 9 pgs. (2016).

Chen, Ting, et al., "A Simple Framework for Contrastive Learning of Visual Representations," in *Proceedings of the 37th International Conference on Machine Learning*, Hal Daum III and Aarti Singh, Eds., vol. 119 of Proceedings of Machine Learning Research, pp. 1597-1607, PMLR (Jul. 13-18, 2020).

Khosla, Pranny, et al., "Supervised Contrastive Learning," in *Advances in Neural Information Processing Systems*, H. Larochelle, M. Ranzato et al., Eds., vol. 33, pp. 18661-18673, Curran Associates, Inc. (2020).

Foi, Alessandro, et al., "Practical Poissonian-Gaussian Noise Modeling and Fitting for Single-Image Raw-Data," *IEEE Transactions on Image Processing*, vol. 17, No. 10, pp. 1737-1754 (2008).

Gretton, Arthur, et al., "A Kernel Two-Sample Test," *J. Mach. Learn. Res.*, vol. 13, pp. 723-773 (Mar. 2012).

Papamakarios, George, et al., "Normalizing Flows for Probabilistic Modeling and Inference," CoRR, vol. abs/1912.02762, Journal of Medicine Learning Research, vol. 22, 54 pgs. (2021).

Durkan, Conor, et al., "Neural Spline Flows," in *Advances in Neural Information Processing Systems*. vol. 32, Curran Associates, Inc., 12 pgs. (2019).

Oza, Poojan, et al., "Active Authentication using an Autoencoder regularized CNN-based One-Class Classifier," *2019 14th IEEE International Conference on Automatic Face & Gesture Recognition*, pp. 1-8 (May 14, 2019).

Baweja, Yashasvi, et al., "Anomaly Detection-Based Unknown Face Presentation Attack Detection," *2020 IEEE International Joint Conference on Biometrics*, pp. 1-9 (Sep. 28, 2020).

Perera, Pramuditha, "One-Class Classification: A Survey," Arvix. Org, Cornell University Library, Ithaca, NY, 19 pgs. (Jan. 8, 2021).

\* cited by examiner

Training of embedder
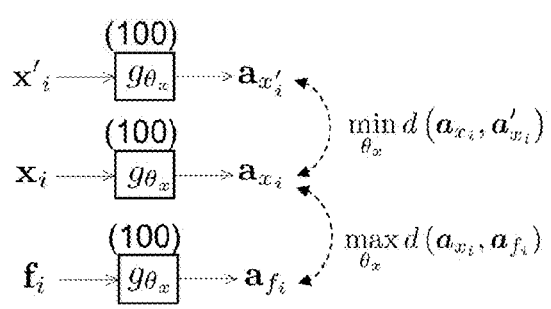
Training/Testing
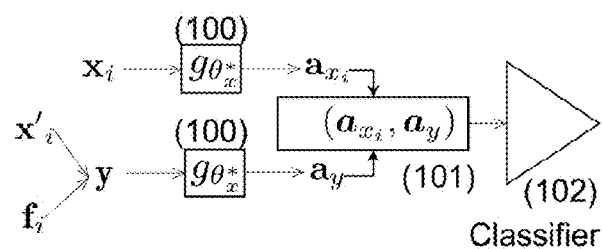
Fig. 2A
Training of embedder
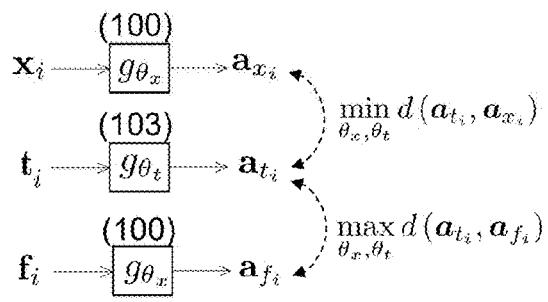
Training/Testing
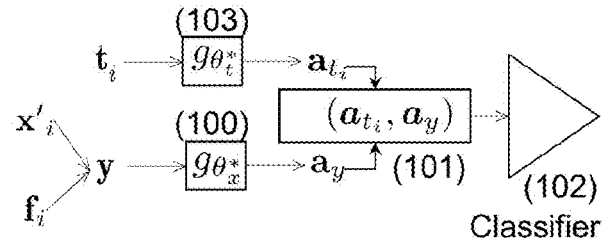
Fig. 2B

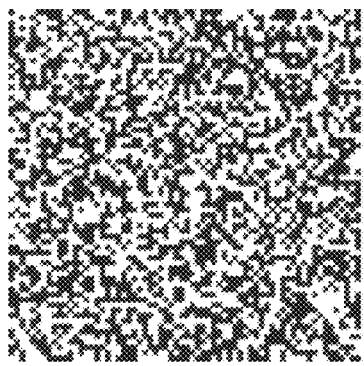
Fig. 5A blueprint
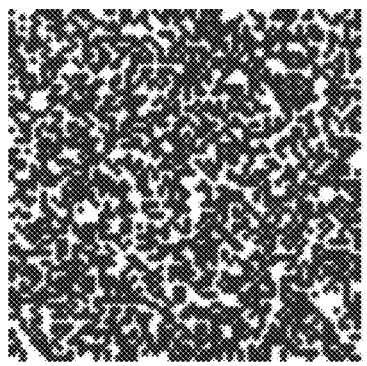
Fig. 5B fingerprint
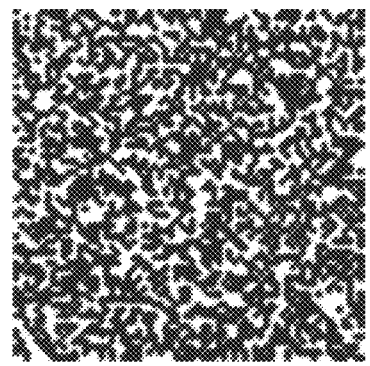
Fig. 5C fake 1
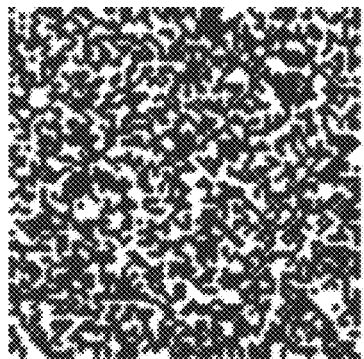
Fig. 5D fake 2
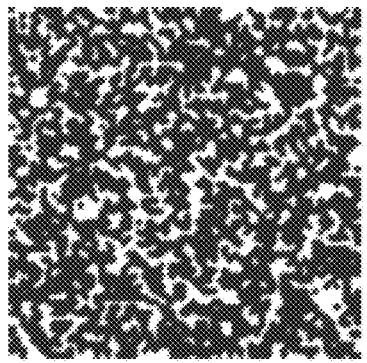
Fig. 5E fake 3
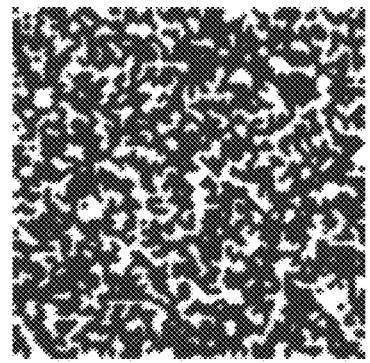
Fig. 5F fake 4

Fig. 6 Multi-metric scores for blueprints
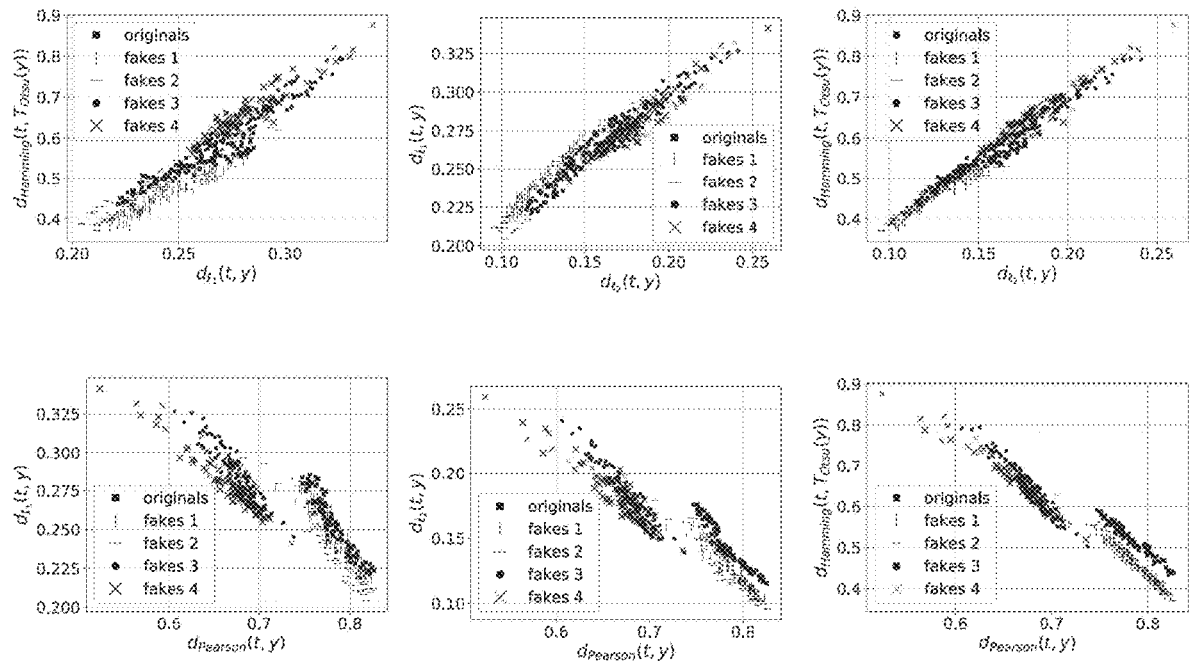

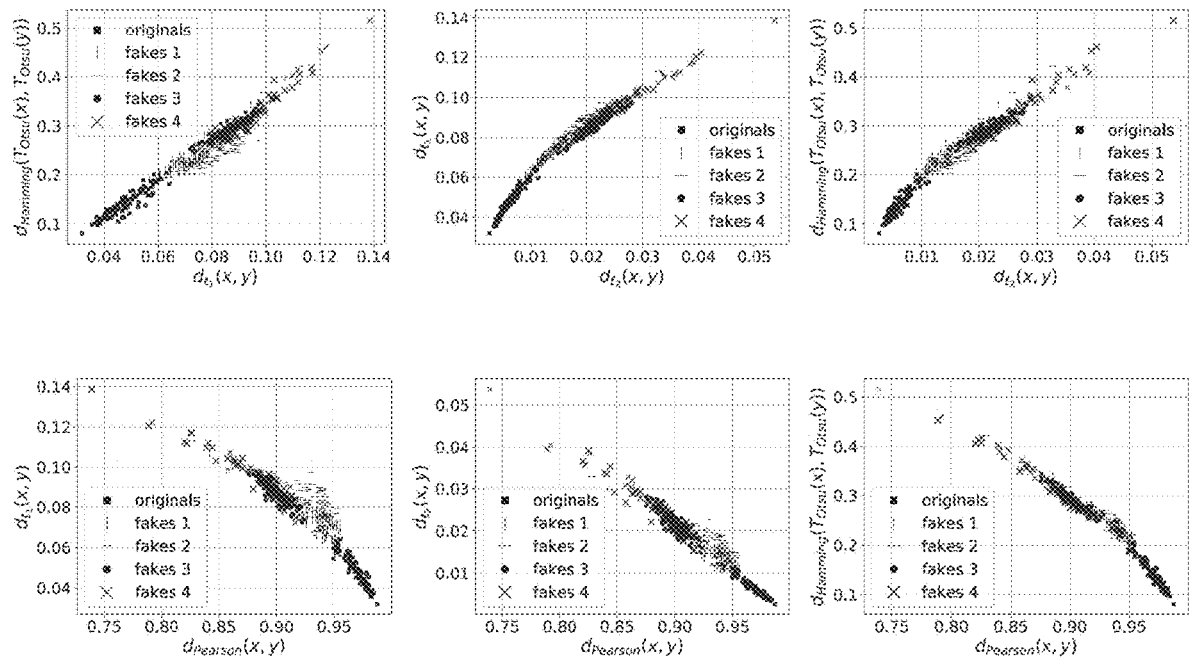
Fig. 7 Multi-metric scores for fingerprints

Fig. 10  Testing of direct system

Fig. 12    Testing of reverse system

Fig. 13    Training of two-way system

Fig. 14  Testing of two-way system

Fig. 19    Generation of original synthentic fingerprints from blueprints
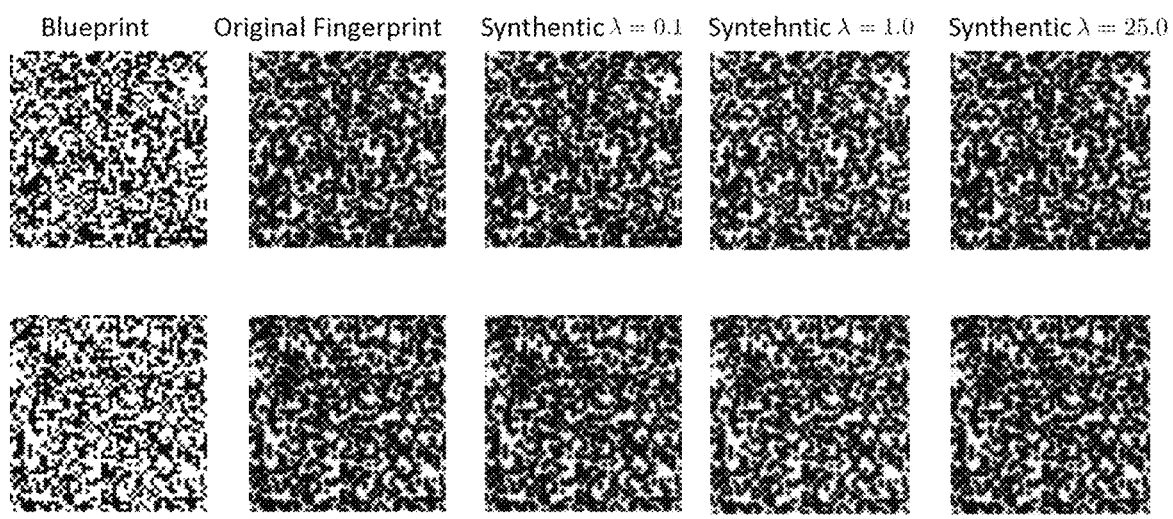

Fig. 20    Generation of fake 1 synthentic fingerprints from blueprints
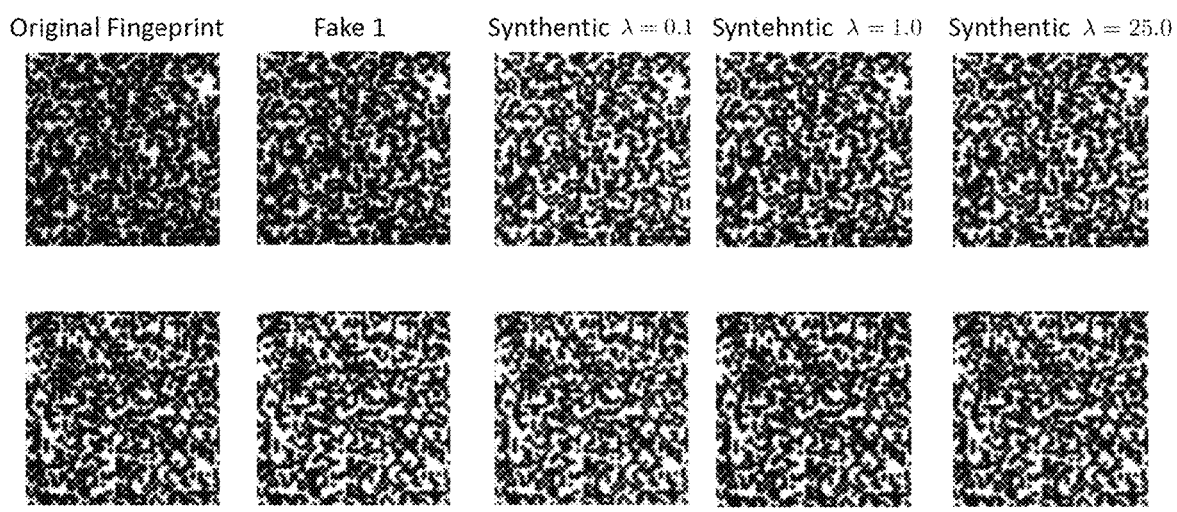

Fig. 21　　Generation of fake 3 synthentic fingeprints from blueprints
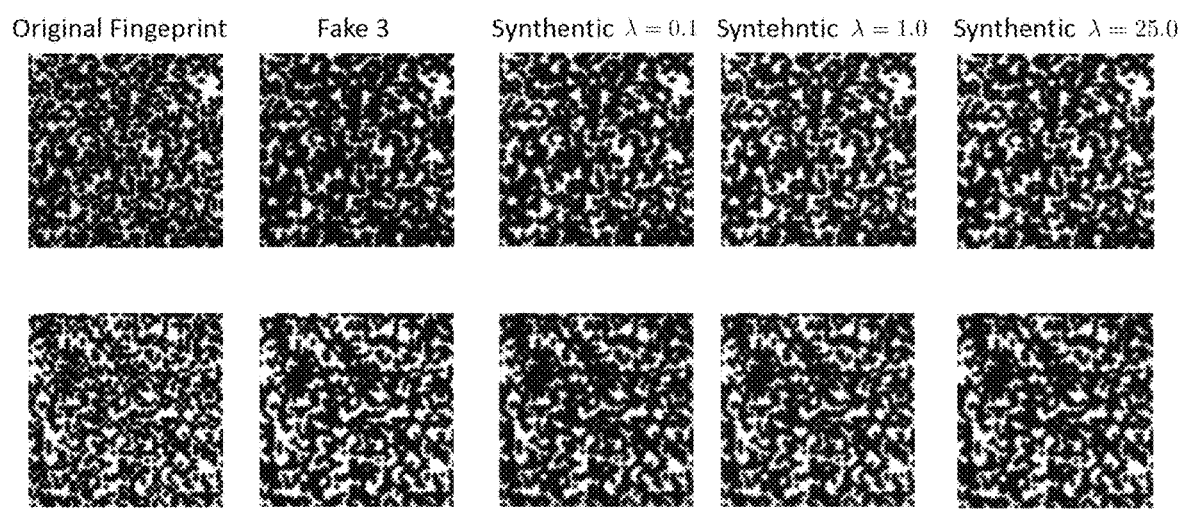

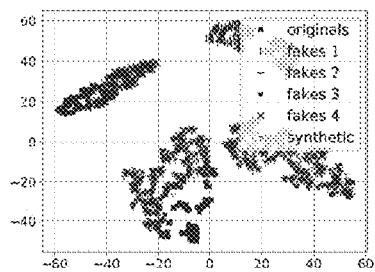 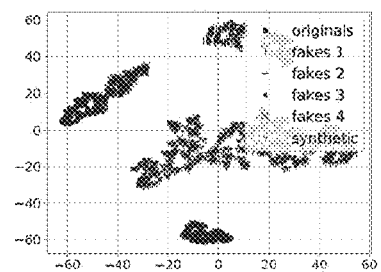 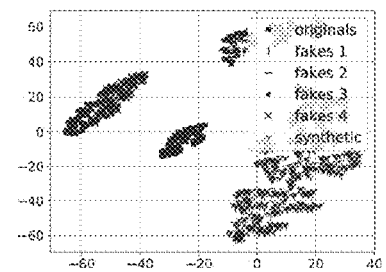
Fig. 22A                    Fig. 22B                    Fig. 22C

OBJECT AUTHENTICATION USING DIGITAL BLUEPRINTS AND PHYSICAL FINGERPRINTS

RELATED APPLICATIONS

The present application claims priority to Swiss Patent Application No. 00676/21, filed Jun. 8, 2021, and European Patent Application No. 21182951.0, filed Jun. 30, 2021, the disclosure of which are hereby incorporated by reference herein in their entirety.

FIELD OF THE INVENTION

The present invention pertains to a method for authentication of objects based on digital blueprints used for production of a physical object and on physical fingerprints acquired from a produced physical object as well as to a device implementing such an authentication method, possibly without having prior examples of fake objects.

BACKGROUND OF THE INVENTION AND STATE OF THE ART

In general, the present invention concerns the problem of authentication of physical objects represented by a probe signal y with a reference to a blueprint $t_i$ and/or fingerprint $x_i$ acquired from the manufactured object in face of lack of information and samples of possible fakes and counterfeited objects.

Besides, there are several other problems related to this context that might include the authentication of people or materials, automatic quality estimation of newly produced objects or anomaly detection during manufacturing, simulation of imaging or production processes. In the following, these latter problems will be referred to as authentication problems.

A listing of certain prior art references is included herein at the end of this Specification, and specific references discussed in this Background of the Invention and State of the Art section are cited by respective reference numbers according to said listing.

Prior Art Related to Physical Object Authentication

The authentication of physical objects is an important problem for many applications in view of growing quality of fakes. The authentication of an original object is based on a verification of correspondence between some features characterizing an original object or a group of original objects from those of fake objects.

The selection of features for the authentication is subject to many technological, economical, marketing, aesthetic, security, scalability and even ergonomic aspects. The authentication should reliably distinguish original objects from fakes, be cheap in protection mechanism and not require big investments and modifications to an existing manufacturing process, not lead to the change of a product look, be scalable to both the amount of products, manufacturing tools and verification means including imaging means and conditions, not require any special training or know-how of verifiers and be adapted to be performed on accessible devices such as existing mobile phones, tablets, cameras, etc. . . . In addition, the authentication should be robust to advanced attacking strategies that include but are not limited to various adversarial examples, sensitivity attacks, copy attacks and cloneability attacks.

The prior art digital authentication techniques can be considered in view of chosen features used for the authentication and data needed at the authentication or testing stage to authenticate a physical object by producing a corresponding decision. Accordingly, the techniques used for the authentication of physical objects such as printed codes, packaging, watches, medical equipment, ID docs, connected devices, banknotes, certificates, cards, various pharmaceutical products, food, cosmetics, health care products, luxury objects, etc. can be divided into four large groups: (i) The methods based on physical uncountable functions (PUFs) that are present on the objects and are similar in spirit to biometric signals acquired from humans, (ii) the methods establishing the correspondence to some reference patterns that are reproduced on the objects and are difficult to clone but easy to verify, (iii) the methods introducing random modulation to the artwork blueprints at the moment of manufacturing the objects to be authenticated, and (iv) the methods that introduce hidden modulation or information hiding to the design of digital artworks representing blueprints prior to the production or add such a modulation to the physical object on top of the reproduced blueprint. The term "blueprint" is used in the present text generically in the sense of a plan, respectively of a template, of an object used for production of physical objects, which typically—but not necessarily—are physical batch objects corresponding to a series of products of a given model produced based on said blueprint and which may also form physical objects produced only in very limited number or which may even be created only as a single piece. Such a blueprint might be represented as a digital artwork, design, or sketch from which this object is reproduced or another modality available for manufacturing or description of a physical object. The term "batch objects" is used in the present text generically in the sense of objects adapted to be produced serially and, in principle, in identical manner, i.e. that all batch objects produced based on a given blueprint are equivalent to each other. However, it should be understood in this context that, on the one hand, these "identical" or rather equivalent batch objects nevertheless may comprise, if so desired and though being called "batch" in the present text, any kind of marker allowing to identify an individual piece within a given series of produced batch objects. Such marker may for example consist in a serial number differentiating each piece within a series of produced pieces corresponding to a given model, an individualized bar—or QR code, a specific pattern or any other type of individual marking means. In general and on the other hand, like mentioned in more detail in the following introduction, physical objects even though being produced based on a blueprint such as defined above moreover typically comprise individual characteristics allowing to distinguish the objects amongst each others even in the case of batch objects, for example due to random surface characteristics of the materials used for production, manufacturing imperfections, or the like. All these characteristics form individual marking means which are voluntarily introduced and/or are inadvertantly present and which may be used as a part of a fingerprint of the objects to be authenticated.

The first group of digital authentication technologies mentioned above, physical object authentication methods based on PUFs, can be divided in natural randomness PUFs or passive methods and hand-made randomness PUFs or active methods. The natural randomness PUFs are based on the acquisition of object micro-structures representing a unique fingerprint $x_i$ for each physical object [1-6] and they do not require any modification or alteration of objects. In contrast, the hand-made randomness or active methods are based on the alteration of the object by an addition of special random elements to the object or by processing of the initial object by some operations that lead to a randomization of object features [7-9]. The need for random elements is explained by a desire to create a considerable difficulty for the counterfeiter to reproduce these elements versus a low complexity for the defender to add these elements. For these reasons these methods are known as the active PUFs.

The PUF based authentication is based on the enrollment of individual fingerprints $x_i$ representing a PUF for each object or the enrollment of a batch fingerprint $x_i$ for a group of objects that might have a random look-alike structure but were actually produced from the same structure multiple times, as for example by molding [2]. Once enrolled, the authentication procedure is based on either a direct usage of the fingerprints $x_i$ or on extraction of some features from it to ensure robustness and invariance to certain imaging conditions that might include but are not limited to synchronization, extraction of local descriptors, mapping to some invariant domains, graph matching, bag-of-word matching, etc. [1, 10-13]. At the test time, the probe representing an object under the authentication is passed via the same processing and the corresponding features are compared in some domain using some metric for example in any similarity metric after the appropriate synchronization or by measuring the number of matching between some features using for example Ransac or optimal transport approaches [12, 14, 15]. Independent of a particular used method, the authentication based on PUFs is solely based on the fingerprint $x_i$ and disregards the knowledge of a blueprint $t_i$, even if such is present due to a physics behind a particular PUF. The blueprint $t_i$ in this case might be considered in broad sense and can include not only a particular molding form from which the objects are produced but also parameters of the technological or manufacturing process that govern the appearance of particular realizations of fingerprints $x_i$. In most cases of authentication based on PUFs, a model linking the blueprints and fingerprints is very complex and generally unknown, which explains the direct usage of fingerprints as complex and uncloneable or unreproducible structures.

The second and third groups of digital authentication technologies mentioned above are based on establishing the correspondence between reference patterns reproduced on the physical objects which are easy to verify but difficult to clone. The second group includes several methods that either add these patterns in some controllable way, in contrast to the active PUFs, such that there is no need in principle to acquire each individual fingerprint $x_i$ but it suffices to keep a blueprint pattern $t_i$ as a reference for the authentication or to use the existing elements of artwork blueprints that are difficult to clone with the desirable precision. It is assumed that the manufacturing is performed at the limit of the achievable precision such as printing, engraving, stamping, etc. such that the reproduction of an exact cope is technologically very challenging. Alternatively, the third group of technologies includes methods that add the same pattern representing a blueprint but the reproduction is performed with some randomization during the manufacturing, i.e., some deviations from the blueprint are introduced in an uncontrolled manner. However in this case, the fingerprints should be registered for each object individually. The difference with the active PUF is that in the active PUF the added randomness is not associated with any blueprint as such while in the case of the third group of technologies the randomness is considered with respect to the blueprint which is treated as a reference.

Examples of controllable patterns include the modulation of various artworks represented by their blueprints such as for example QR-codes [16-20]. At the same time one can directly use suitable elements of existing artwork blueprints as the reference features for authentication. Several studies [21,22] disclose a method where authenticity of an object is established based on measuring the correspondence between the elements of artworks such as text, logos or oven halftone modulation. In this case, the blueprint of the original object combining all these elements is used as a reference and no additional modification of the physical object is required. Additionally, the correspondence between some features of original and fake objects, such as banknotes in the discrete wavelet domain, can be used for the classification for the forensic authentication [23].

Examples of randomized patterns are based on the modulation of blueprints at the manufacturing such as during printing [24]. The printing process randomness is based on the absence of a mathematical model describing the interaction between the printing inks and substrate. In this respect, unique properties result from the unrepeatable statistical aspects of the print process [16, 25, 26].

The authentication of controllable patterns is generally based on a pre-processing of probe y before its comparison with the corresponding blueprint. A special care about an accurate synchronization between them should be taken. A generic comparison is based on a similarity score deduced based on some chosen metric. A knowledge of distortions between the blueprint $t_i$ and probe y representing an original object would be advantageous for an optimal selection of the above similarity metric. In this context, some attempts to create models of the printing process have been done in the past [27, 28]. Alternatively, a classifier can be trained to distinguish original objects from fakes, if samples of originals and fakes are available.

The authentication of randomized patterns requires knowledge of the fingerprint $x_i$ for each item, in contrast to the above approach. Given a fingerprint $x_i$, the difference to the template $t_i$ is registered and encoded based on some synchronization technique. At the authentication stage, given a probe y, the differences to the template $t_i$, are measured and compared to the enrolled ones. A corresponding metric of similarity is applied to measure the proximity between them. These differences can be measured directly on the acquired images representing the probe or in some embedding space or latent space of an auto-encoder [24].

In all the methods mentioned above the authentication is based either on the blueprints or on the fingerprints. Thus, in these methods, there isn't any joint step or score simultaneously describing the proximity of probe y to fingerprint $x_i$ and blueprint $t_i$, even if these were available.

It is important to mention that the protection against counterfeiting is based on the basic assumption that the distortions between the blueprint and the fingerprint representing the original object will be smaller than the distortions between the blueprint and the fingerprint representing the fake [16]. This can be considered from the data processing inequality point of view [29], wherein each processing stage leads to the reduction or in the best case preservation of mutual information, if the concerned samples represent random variables forming a Markov chain. It is also desirable that under the proper synchronization, the variability of fingerprints representing the original objects is as small as possible, i. e. the intra-class variations due to the manufacturing and acquisitions are small, which is quite a challenging requirement in practice. Moreover, if the variations are large, the differences between the original fingerprints and fakes might be very small in practice, such that the above mentioned intra-class variability leads to low authentication accuracy. Finally, these methods should withstand the machine learning based attacks [13, 30, 31] that demonstrate a high cloneability efficiency of the controllable randomness technologies.

The forth group of digital authentication technologies mentioned above is based on the digital modulation of blueprints prior to their reproduction on the physical objects. It includes two sub-groups of technologies known as digital data hiding or watermarking and active content fingerprinting. The main difference between the methods of this group and controllable patterns consists in an invisible nature of the introduced modulation while the controllable patterns not necessarily satisfy this condition. The digital data hiding methods might modulate different types of artworks representing blueprints in a form of images, i.e. pixels [32], or in a form of any graphic or vector representation [33] by embedding an encoded and encrypted message. In recent years, the data hiding of QR codes represented a great interest due to the broad usage of these codes for product identification and there are quite some data-hiding techniques especially proposed for this type of blueprints [34-52].

In general, authentication of a physical object is in this case based on an extraction of hidden data after a proper synchronization, a decoding of the hidden information and a decryption of said message. Authenticity of the physical object is established by measuring the correspondence between the original hidden message and the decoded one by measuring either some similarity score such as a correlation or cosine distance or estimating the Hamming distance. Assuming that the reproduction of the modulated blueprint will cause some degradations to the introduced modulation and likewise the acquisition process will lead to some optical distortions, one selects an error correction code to compensate these distortions on the level of the hidden message. In contrast to the previous methods, these distortions on the level of the hidden message can be easily estimated even for unknown models of manufacturing and image acquisition processes. If the object is cloned, it is assumed that some additional degradations are introduced to the hidden message and the fine-tuned error correction code capacity is not sufficient to decode the hidden message correctly, which leads to a high level of mismatch between the embedded and decoded messages and thus it can be used for the decision about the presence of fake. Many recent methods exploit this idea for application to various forms of artworks representing the blueprints of 1D and 2D codes [47-52]. However, despite of any particular design of a watermarking scheme, the hidden information is orthogonal to the original blueprint and thus can be easily estimated from the fingerprint and copied to new blueprints. This phenomena is well known as a copy attack [53]. Unfortunately, in anti-counterfeiting applications there is no reliable protection against this attack.

Additionally, an invisible modulation can be added on top of the existing objects in an invisible way by printing tiny invisible dots mainly in yellow [54] due to a low visibility or for example making some holes in varnish that is not very visible for a human eye but still can be perceived by a camera of mobile phones or printing with inks that have a very small contrast with a background ink [55]. However, all these techniques are vulnerable to the estimation attack that can estimate the places of introduced modulation and use them to transfer the estimated marks to fake objects even without knowing which information is encoded as such.

The active content fingerprinting [56] is similar in spirit to the digital data hiding but instead of embedding a blueprint independent message, the active fingerprinting modulates the blueprint in an invisible way with the purpose of ensuring that some function applied to the modulated blueprint will reliably produce some output identical to the one extracted from the manufactured objects represented by its fingerprint. The function extracting the desired output with a controllable reliability of output representation or bits can be interpreted as a hash extraction function. Therefore, there is no hidden message as such and the modulation is not independent from the blueprint, which prevents the prediction of the introduced modulation in practice, especially when the extraction function is a key-based one. Therefore, the modulation aims at the robustification of some output dimensions while making some of them sensitive. Such a modulation can be applied to various types of blueprints including the over-modulation of fingerprints. To detect fakes, both the modulation function representing an encoder and the extraction function representing a decoder should be tuned on the samples of original and fake fingerprints. The synchronization or invariance to the acquisition should be ensured as in the previously considered methods.

However, these solutions according to prior art authentication methods present several drawbacks and inconveniences considered below.

The authentication based on blueprints is implemented via the usage of only a digital reference blueprint $t_i$ and does not require to enroll a fingerprint for each new physical object. Besides its obvious advantages in terms of scalability, this type of authentication has a number of shortcomings:

a) The existing methods are subject to a very high intra-class variability of fingerprints $\{x_i^{(1)}, x_i^{(2)}, \ldots, x_i^{(j)}\}$ produced from the same blueprint $t_i$ due to high variations during manufacturing processes, for example laser engraving deviations, printing, molding, etc., imaging conditions even for the same type of phone, and light environments, without talking about the variability of image processing pipelines among different phone models that is often a proprietary and unknown process. All these factors lead to a high intra-class variability that has a strong negative effect for the authentication accuracy;
 b) the lack or rather absence of accurate mathematical models that would allow to simulate the above processes and to take them into account at the derivation of optimal decision criteria;
 c) the inability of existing simple similarity metrics to reliably distinguish classes of original objects and fakes due to the above lack of mathematical models and inherently different spaces of blueprints and fingerprints, when simple methods of re-encoding or re-mapping do not give any satisfactory results. The usage of complex matching metrics is limited to low dimensional spaces that makes them impractical;
 d) the lack of representative fakes or mismatch between the fakes used for decision rule training and in field fakes to derive the optimal yet robust decision rules, which leads to a high vulnerability of decision rules in face of fakes with distinct properties unseen at the training stage;
 e) the relatively high dimensionality of blueprints for practical training of classifiers when the application of dual representations does not help as well to reduce the complexity;
 f) the problems related to the fact that fakes might be closer to the resulting fingerprints than the reference blueprints, which creates a considerable ambiguity of authentication, especially when the mapping from the blueprint to the fingerprint is characterized by higher distortions than the mapping from the fingerprint to fake;

g) the sensitivity of authentication similarity metrics to an accurate synchronization between the blueprints and fingerprints when the blueprints pass via high precision manufacturing and high accuracy authentication is required;

h) the design of blueprints is generally either fixed and represents the artwork or, if it allows some variability, it is based on some heuristic assumptions or knowledge of manufacturing-imaging processes to make cloneability difficult but authentication reliable. However, it rarely includes the consideration of optimal authentication decision rules into a loop due to the indicated lack of accurate models. Altogether, the blueprints in such systems are not optimally matched with the authentication objectives;

i) authentication based on machine learning criteria in contrast requires the presence of fakes that are either absent or not representative as indicated above;

j) at the same time, the authentication methods based on machine learning rules are subject to the adversarial examples [57, 58] that represent a great challenge for the deployment of these techniques in secure- or trust-sensitive applications, k) finally, the estimation of blueprints from their fingerprints as for example in the printed authentication codes [13,30,31] is feasible using machine learning based estimation and re-reproduction attack that demonstrate a high efficiency in practice.

The authentication based on fingerprints is implemented via the usage of a fingerprint $x_i$ independently of whether the fingerprint originates from existing randomness or handmade randomness of some structures or artworks. In general, the direct link between the enrolled fingerprint and the blueprint, if such exists, is in this case not used for the authentication. Instead it is assumed that the fingerprint $x_i$ should be enrolled from each physical object. Even if the fingerprint $x_i$ is created from the blueprint $t_i$ by some randomized manufacturing, as for example in [24], the enrollment of the fingerprint $x_i$ is required from each object to further register and encode the difference between the fingerprints and reference blueprint.

The shortcomings of this type of authentications are:
a) It might be economically and technologically challenging to enroll either one fingerprint $x_i$ or sometimes several fingerprints from each physical object in view of scalability to large volumes;
b) in addition, since a special care about microstructure details or introduced deviations with respect to some reference blueprints should be taken, this might require special enrollment equipment operating at some speed and scale, which certainly represents a great practical challenge;
c) the need of enrolling each fingerprint $x_i$ for each physical object requires, to enroll it directly or to measure a deviation from some reference blueprint, certain management infrastructure for the authentication;
d) some PUF features in the body of fingerprint $x_i$ might be subject to aging, damages in a process of object delivery, circulation or usage, or even to the impact of simple dust that might lead to a considerable mismatch between the actual probe and the enrolled fingerprint in some similarity metric space,
e) the authentication based on fingerprint $x_i$ is subject to even higher sensitivity to the accuracy of synchronization between the probe and fingerprint in comparison to the authentication based on blueprints where the additional elements of synchronization might be added;
f) furthermore, the existing elements of item design or PUF itself might not contain enough details for the accurate synchronization while the addition of special synchro markers is not always technically feasible or desirable due to various aesthetic reasons or standardization reasons. However, at the same time the verifier should be informed and guided at which part of the object the authentication should take place that represents an additional technical challenge and ergonomic inconvenience;
g) the change of imaging conditions such as resolution, type of sensor, method of focusing, ambient light, power or type of torch light, viewing conditions, processing pipeline might lead to considerable deviations between the enrolled fingerprint and probe signal;
h) some microscopic features might require special light or special magnification or depth of focusing that creates additional constraints for a mass deployment and end-user authentication;
i) some authentication techniques might require even some special expertise of the verifier that restricts the authentication only to a group of experts;
j) finally, some randomized modulation of artwork designs might be relatively easily reproducible in view of basic assumptions about a typical design of reference blueprints to which such a modulation is applied, e.g. when the QR- or data-matrix codes are modulated, the attacker knows the technical specs behind these codes and can easily regenerate the blueprint and measure the deviations between the acquired fingerprint and estimated fingerprint and further reproduce it thanks to the growing accuracy and flexibility of modern digital reproduction tools.

The authentication based on the hidden modulation or hidden information or considered extra modulation introduced on top of existing objects or reproduced artworks has its own deficiencies:
a) The introduced modulation or hidden data leads to the modification of the original artwork represented by a blueprint that in turns might lead to visual degradations that is not always acceptable in practice for many reasons;
b) the introduction of additional modulation might require additional technological process that complicates the manufacturing, slows down the process and makes it more expensive;
c) the introduced modulation is relatively strong to ensure reliable decoding on mobile devices of verifiers that are generally characterized by lower resolution of acquisition devices compared to those of attackers, which makes the estimation of introduced modulation and hidden information in both form of direct modulation of blueprint prior to its reproduction on the object surface or structure via printing, engraving, etc. relatively easy. This creates a possibility to apply copy attacks with little knowledge of used modulation or actually hidden information as such.

Prior Art Related to Machine Learning Authentication Methods and their Applicability to Physical Object Authentication A supervised authentication based on machine learning systems is used if training data containing samples of original objects represented by fingerprint features $\{x_i\}_{i=1}^{N}$, acquired from an object, and their fakes or counterfeited counterparts represented by fingerprint features $\{f_i\}_{i=1}^{N} = \{x_i\}_{i=N+1}^{2N}$ are available. In this case, given the training dataset $\{x_i, c_i\}_{i=1}^{2N}$ with the labels $c_i=1$ for $i=1, \ldots, N$ representing labels of original objects and $c_i=0$ for $i=N+1, \ldots, 2N$ representing labels of fakes, one can train a supervised classifier $g_{\theta_c}(\cdot)$ corresponding to some nonlinear family of classifiers like kernel support vector machines (SVM) [60,61] or deep classifiers [62] that can be both generally parameterized by the parameters $\theta c$ by minimizing a cost function:

$$\hat{\theta}_c = \operatorname{argmin}_{\theta_c} \Sigma_{i=1}^{2N} L(l_i, g_{\theta_c}(x_i)) + \gamma \Omega_{\theta_c}(\theta_c), \quad (1)$$

wherein the $g_{\theta_c}(\cdot)$ is a classifier, i.e. $g_{\theta_c}: \mathbb{R}^n \to \{0,1\}$ and it is an encoded class label for the class $c_i$. $L(\cdot)$ denotes a corresponding cost function typically used in classification problems. For reasons of clarity, it is added here that this description refers to the classification problem as a general problem. Several prior art methods suggest to use the supervised learning approach for physical object authentication [23, 63, 64].

Furthermore, in most practical applications it is very rare that fakes are available at the training stage in sufficient amount, if available at all. Moreover, the fakes available at the training stage might considerably differ from those that will be present at the authentication stage due to multiple reasons that include different experience of attackers, usage of different classes of attacks based on different assumptions and prior knowledge about the original manufacturing process, verification devices and methods, their shortcomings, involvement of more powerful machine learning technologies, enhancement of quality and precision of various reproduction technologies, etc. Furthermore, it is very likely that, having an access to the decision of the authentication device, the attacker will try to produce new fakes as a function of authentication algorithms used on the defender's side [13, 30, 31]. These kinds of fakes are unknown at the authentication training stage and hardly imaginable in advance. Thus, the usage of powerful supervised classification algorithms represented by equation (1) is very limited in these cases and might be even dangerous due to the known vulnerability of supervised classifiers in front of adversarial attacks [57, 65]. At the same time, the reliability of existing algorithms for authentication without any knowledge of fakes is very limited, too. Most of such algorithms are generally based on a "proximity" authentication, i.e. encoding of the manifold of original data represented by a set of training examples of fingerprint features $\{x_i\}_{i=1}^{N}$ and measuring the proximity of a probe y to this manifold or a particularly given sample of this manifold $x_i$ in the direct, some projected or latent space which is achieved by some embedding or encoding.

The authentication in the direct domain by a verification of the proximity of a probe y to a set of fingerprint features $\{x_i\}_{i=1}^{N}$ has a number of advantages due to its simplicity, intuitive and interpretable nature and due to the absence of a need of any special training. It can be accomplished by choosing some metric of proximity between the probe y and the set of fingerprint features $\{x_i\}_{i=1}^{N}$ and the decision function to reliably include the probe y to the set of fingerprint features $\{x_i\}_{i=1}^{N}$, if fakes are not available or clearly distinguish the probe y from the set of fakes $\{f_i\}_{i=1}^{N}$, if such are available. At the same time, the direct domain authentication has a number of open issues. An appropriate similarity/distance metric in the direct domain should be chosen. Unfortunately, most of simple metrics such as the L2-norm or Euclidean metric, the L1-norm or generally Lp-norms, inner product, cosine distance, etc. which are based on the assumption of stationarity of data and special properties of data manifolds reflected by the corresponding assumptions behind the metric are not directly applicable to complex data manifolds, and especially those having quite complex occupancy of the manifold. A typical decision function used in the authentication procedure is based on a very simple comparison of the above metrics with a pre-defined threshold according to some rules such as Bayesian, Neyman-Pearson, mini-max or other rules [66, 67]. Unfortunately, the very complex nature of original data manifold and non-stationarity and non-uniformity among the fakes produced by various technologies cannot be addressed by such simple decision rules. The application of one-class classifiers such as kernel SVM [60,61] in the direct domain is also questionable due to the complexity of training procedures in face of high dimensionality of data and the amount of training example.

The authentication in the transform domain with reduced dimensionality of data representation and enforced distributions of projected data or latent variables might be a partial solution to the above problems. The main objectives behind transforming data based on embedding or projection methods is to reduce the complexity of authentication due to the lower dimensionality of the transformed domain and to produce data with statistics suitable for the application of linear metrics such as L2. The differences in the design of embedding approaches reside mainly in use of random projection where the basis vectors of projections are data independent, use of data-depending mapping based on embedding such as linear PCA or non-linear PCA based on kernels, use of auto-encoding based approaches where the latent space of an auto-encoder (AE) is used as an embedding space [60, 61]. At the same time, the authentication in the transform domain still faces a common problem for all these methods. Once the embedding operator of the transform is designed, the selection of an authentication metric is still based on hand-crafted (not learnable) metrics or equivalently an assumption about the channel. This is especially a challenging task for the data with high variability in both original samples and fakes and nested regions between both. Finally, it is very often that the latent space of the AEs is either non-controlled at all or constrained to be often Gaussian as in the case of Variational Auto-encoders (VAE) [68], Adversarial Auto-encoders [69] or similar methods of this family [62]. Such a data independent selection of latent space distribution, i.e. data distribution is denoted as $x \sim p_D(x)$ and latent space distribution denoted as $z \sim p_\theta(z)$ that is mostly motivated by a simplicity of future generative models, has a number of implications bounding the application of the latent space of these AEs for the authentication purposes.

Considering the authentication in the transform domain, which might be useful for both reduced dimensionality and complexity as pointed out above, one might target to learn the manifold of original data $\{x_i\}_{i=1}^{N}$ and "bound" its perimeter by a decision boundary of one-class classifiers or encoding of data manifold $\{x_i\}_{i=1}^{N}$ via the AE to verify of the proximity of y to this manifold by some specific rules. In the the group of one-class (OC) classifiers one can distinguish methods based on OC-SVM [60] and OC-deep [70] classifiers. OC-SVM methods generally require to use some non-linear kernels but are characterized by relatively high complexity in the case of multiple training samples and high data dimensionality so that known kernel tricks and dual problem formulation do not give any essential complexity reduction. In contrast OC-deep classifiers can represent an alternative lower complexity solution. OC-deep classifier targets to project the data manifold $\{x_i\}_{i=1}^{N}$ to the predefined fixed vector cat the training stage and then measure the proximity of the probe y to c in the latent space. The selection of vector cis a free parameter problem. In terms of mapping, it is clear that the whole data manifold $\{x_i\}_{i=1}^{N}$ is encoded just into one vector c that might create certain issues in the case of complex data manifolds. In contrast to that, the authentication based on the AE approach [71, 72] is based on the encoder-decoder pairs trained to provide the reconstruction of $\{x_i\}_{i=1}^{N}$ according to some specified fidelity metrics of the reconstruction under specific constraints on the latent space. The architectures of such AE can be various and are generally based on the bottleneck architectures, ResNet or U-net architectures with and without constraints on the latent space [73, 74]. Unfortunately, such AE based systems fail to authenticate fakes that are in the close proximity to the originals in practice. The recent results of anomaly detection in the industrial setting with visibly recognizable anomalies demonstrate quite low accuracy of detection [75]. Thus the problem for the high quality fake detection remains largely unsolved.

Finally, the above mentioned disclosures mostly only present specific techniques or mathematic models which are adapted to be used, in isolated manner, at a particular stage in the context of classification and anomaly detection, but do not form itself an authentication method that would allow to overcome the above mentioned problems.

SUMMARY OF THE INVENTION

In view of the above described shortcomings of prior art approaches, it is an objective of the present invention to overcome these challenges and to realise a method for reliable authentication of physical objects. Within the same context, it is a further objective of the present invention to realise a method adapted to perform the authentication under the prior ambiguity about the type of fakes produced by counterfeiters. Moreover, it is an objective of the present invention to avoid, as far as possible, a need of expensive enrolment of fingerprints from each physical object under various imaging conditions to reduce the enrolment time and cost and also to considerably simplify the authentication management infrastructure. Furthermore, it is an objective of the present invention to optimally control the system parameters used for authentication. It is another objective of the present invention to also optimize the training step of the authentication method. Additionally, it is another objective of the present invention to create a method for authentication offering an alternative and innovative construction of a latent space that has a physically meaningful yet optimal representation for the authentication task and is related to the data priors and that contributes to both reliable authentication and interpretability, which are essential elements of trust in secure and trust-sensitive applications.

Moreover, in case the object is represented not only by the fingerprint features $\{x_i\}_{i=1}^{N}$ but also by a blueprint $\{t_i\}_{i=1}^{N}$, which might represent a digital artwork, design, sketch from which this object is reproduced or another modality available for the physical object manufacturing or description, one may need to measure the proximity of probe y not only to the fingerprint features $\{x_i\}_{i=1}^{N}$ but simultaneously also to the blueprint $\{t_i\}_{i=1}^{N}$, which questions the uniqueness and optimality of a defined proximity measure of the probe y to the blueprint $\{t_i\}_{i=1}^{N}$, respectively of such embedding as discussed above in the context of prior art methods. It is important to point out that the nature, statistics and form of representation of blueprint might be considerably different from those of the corresponding fingerprints and probe.

Furthermore, only a limited number of training pairs $\{x_i, t_i\}_{i=1}^{N}$ is available in practice at the training stage and the authentication stage will have only an access to probe y and its blueprint $t_i$, and rarely to the pairs $(x_i, t_i)$ that have not been available at the training stage. However, if such pairs are available at the authentication stage, it is another objective of the present invention to allow to benefit from this knowledge without a need to modify an authentication algorithm for each particular practical case. An additional practical challenge comes from a fact that for the same blueprint $t_i$ one might have several fingerprints $\{t_i, x_i^j\}_{j=1}^{J}$. This is due to the variability of manufacturing process and enrollment/imaging of produced objects. Therefore, it is another objective of the present invention to provide an authentication algorithm which properly handles it both at the training and testing times. Finally, it is very challenging to distinguish original objects from fakes based on known criteria by measuring just a proximity to a given blueprint $t_i$ and/or fingerprint $x_i$ while the optimal embedding criteria for a joint authentication are not formulated. Thus, it is another objective of the present invention to provide a special transformation domain where these differences should be more obvious and where the latent space would have some meaningful yet optimal representation for the authentication task.

The solution according the present invention, in view of the above mentioned shortcomings of prior art, is to perform authentication of a physical batch object based either on a pair of a fingerprint and a blueprint $(x_i, t_i)$ of said physical object, or on its blueprint $t_i$, or on its fingerprint $x_i$ available at the verification stage, in the absence of any information about fakes of the physical object and under high variability of manufacturing and imaging parameters and without a need to modify or re-train the whole architecture for each case of interest, i.e. for each potential application.

To this effect, the present invention proposes a method for authentication of physical objects based on a blueprint and/or a fingerprint of a physical object to be authenticated, said method distinguishing from prior art by the features enumerated in claim 1 and allowing to achieve the objectives identified above.

In general, the method according to the present invention is based on the fact that between the blueprints t and fingerprints x of physical batch objects there exists a statistical dependence such that any pair (t, x) can be considered to be generated from a joint distribution p(t, x). In contrast to prior art methods, where this model is not exploited directly due to a very complex statistical dependence p(t, x)=p(t)p(x|t)=p(x)p(t|x) in part of the simulation of a direct channel p(x|t) and a reverse channel p(t|x) and due to lack of knowledge of marginals p(x) and p(t) or oversimplified assumptions and mostly linear models, such as for example in the case of relatively simple printing channel and flatbed scanner acquisition [27,28,59], the present invention realizes a method for authentication of physical objects wherein the statistical relation between the blueprints t and fingerprints x can be established in a parametrized and learnable way, for any application and any image processing pipeline, solely based on data represented by the samples of blueprint-fingerprint pairs $\{t_i, x_i\}_{i=1}^N$ or even from the unpaired data represented by the sets $\{t_i\}_{i=1}^N$ and $\{x_i\}_{i=1}^N$. In this context, it is important to note that: (a) No knowledge of the physical manufacturing process or the data acquisition as such is required for such an approach, (b) the method is easily adaptable for new cases via the training of model parameters, (c) various variability of unseen data can be simulated from the disclosed model by changing model hyper-parameters, (d) different factors such as manufacturing imperfections or deficiencies in imaging, fingerprint aging, damaging, etc. are easily handled, (e) the synchronization sensitivity is also easily handled by proper training procedures based on controllable augmentations. As an outcome of such model reflecting the correct statistical relationship between the blueprints t and fingerprints x, which are even in different spaces of different dimensionality, the method according to the present invention allows to predict blueprints t from fingerprints x very accurately and likewise to simulate fingerprints x from blueprints t. The last is very important due to opening the possibility to generate and predict never seen fingerprints x from the available blueprints t. Moreover, since the disclosed model is stochastic, it is possible to generate multiple fingerprints x for a given blueprint t, which is very important for the simulation of intra-class variability and analysis of the security of various existing and future randomization techniques introduced into the manufacturing for the unique fingerprint generation. In addition, such a prediction of fingerprints x from blueprints t, without a need of enrolling the fingerprint x from each physical object that as described above might be prohibitively costly or time consuming or not feasible, is economically and technologically very attractive for large scale applications. Furthermore, the availability of the direct channel p(x|t), the reverse channel p(t|x) and the marginal distribution p(x) allows to target a design of the optimal decision rules in some lower dimensional space to avoid the above problems with training of a classifier. Moreover, the decision rules can be trained, without any knowledge about real fakes as such, either in a form of an attacking strategy or by using presence of fake samples and under potentially various types of attacks ranging from simple hand crafted attacks to sophisticated adversarial attacks and machine learning based attacks considered above. The classification process is based on the augmentations allowing to produce the desirable result even under imperfect synchronization of blueprints t and fingerprints x with the probe signal y. Moreover, the proposed authentication is backward compatible with existing security features and can be applied to any situation when both blueprints t and fingerprints x, or either blueprints t or fingerprints x are available at the authentication stage, without a need to change the authentication pipeline with the maximum change consisting in a change of pre-trained low-complexity one-class classifiers. Finally, the method according to the present invention can be applied to any type of blueprint-fingerprint pairs $\{t_i, x_i\}_{i=1}^N$ and it is not restricted by a special modulation, encoding and design.

In particular, the method according to the present invention distinguishes by the fact that it uses a mapper which is adapted to produce an estimate $\bar{t}_1$ of blueprint $t_i$ based on fingerprint $x_i$ and said classifier is a one-class classifier, and by the fact that the method further comprises,
at said training stage, the steps of
acquiring said set of blueprints $\{t_i\}_{i=1}^N$,
providing a set of similarity scores for said blueprints (230),
performing a joint training of said mapper and one-class classifier on said set of training signals $\{x_i\}_{i=1}^N$ and said set of blueprints $\{t_i\}_{i=1}^N$ to obtain a jointly learned mapper (200) and/or a jointly learned one-class classifier,
as well as, at said authentication stage, the steps of
applying jointly the mapper and one-class classifier, at least one of which is learned, to the probe signal y,
said output of the one-class classifier, allowing a decision about authenticity of the object represented by the probe signal y, being produced based on fingerprints $x_i$ and/or blueprints $t_i$.

According to a first aspect of the present invention, in a first embodiment of a corresponding authentication method, the training step may be performed jointly on blueprints and fingerprints of the physical objects to be authenticated and without any reference to samples representing fingerprints of fake objects, in contrast to prior art authentication methods. This allows to provide a universal method for authentication by performing a cross-modal mapping of the blueprints to the fingerprints and of the fingerprints to the blueprints, without any actual knowledge of any printing process and image acquisition models, and allows to provide an improved authentication in contrast to methods based solely on blueprints or fingerprints as well as in contrast to supervised machine learned methods requiring fakes at the training stage. Furthermore, this allows to achieve higher robustness to unseen fakes produced by advanced machine learning attacks and adversarial examples.

Moreover, a preferred embodiment of the method distinguishes by the fact that the multi-metrics originating from the information-theoretic formulation are used as an input for the classifier, which contributes to both interpretable formulation, reduced complexity of classifier training and automatic selection of a sub-space allowing to optimally distinguish originals and fakes. Additionally, the metrics based on blueprints and/or fingerprints are automatically selected for each targeted use case, printing or generally manufacturing technology and imaging device, its settings and imaging conditions.

According to a second aspect of the present invention, a second embodiment of the proposed method allows to make a decision on authenticity of the physical objects to be authenticated based on multi-metrics using either blueprints, or fingerprints, or jointly blueprints and fingerprints without a need to re-train the whole system.

According to a third aspect of the present invention, a third embodiment of a method according the present invention comprises a step of encoder-decoder training allowing for the generation of synthetic samples of fake objects with a varying degree of proximity to the manifold of the training data. As compared to prior art methods, this allows to overcome problems related to the lack of fast, accurate and scalable models allowing to both simulate original data and create synthetic fakes. Such a procedure allows to enhance the authentication accuracy in view of intra-class variability even within the same class of objects produced on the same or identical type of equipment or acquired on the same or identical imaging equipment.

According to a forth aspect of the present invention, in a forth embodiment of a corresponding authentication method, the generated synthetic fakes are used for the contrastive learning of a proposed classifier based on the mutual information maximization among the original samples represented by the blueprints and fingerprints and minimized mutual information cost for the corresponding synthetic fakes.

According to a fifth aspect of the present invention, in a fifth embodiment of a corresponding authentication method, the training step of the encoder and decoder can be based either on paired data $\{x_i, t_i\}_{i=1}^N$ and/or on unpaired data $\{t_i\}_{i=1}^N$ and $\{x_i\}_{i=1}^N$, which allows to considerably increase the scalability of the authentication system to various practical situations.

According to a six aspect of the present invention, in a six embodiment of a corresponding authentication method, the training step of said encoder and decoder can be performed by using directly the training data or by using encoding parameters of printing/production systems and imaging devices.

According to a seventh aspect of the present invention, in a seventh embodiment of a corresponding authentication method, the training step of said encoder and decoder can be based on multi-metrics integrating various similarity measures and discriminators while the testing step uses a subset of these multi-metrics providing the best authentication performance of the system.

The present invention also concerns use of such a method, a device adapted for the implementation of such a method as well as computer program means stored in a computer readable medium adapted to implement this method.

Other features and advantages of the present invention are mentioned in the dependent claims as well as in the description disclosing in the following, with reference to the figures, the invention in more details.

BRIEF DESCRIPTION OF THE DRAWINGS

The attached figures exemplary and schematically illustrate the principles as well as several embodiments of the present invention.

FIG. 2 illustrates the authentication process based on two possible approaches when either the fingerprint $x_i$ (FIG. 2A) or the blueprint $t_i$ (FIG. 2B) of the original object are available at the test stage. It is also assumed that the fake samples are available for training in both cases.

FIG. 5 exemplifies samples of the authentication test based on anti-copy patterns. The original blueprint is represented by a randomized or encoded pattern as shown in FIG. 5A and the scanned original print representing the fingerprint $x_i$ and produced fakes fs are exemplified in FIGS. 5B to 5F, respectively.

FIG. 6 schematically illustrates the inability of classical metrics used for the authentication architectures presented in FIGS. 3 and 4 for a fixed non-trainable mapper.

FIG. 7 further extends the experimental study of the setup presented in FIG. 6 to the case where the physical reference based on the fingerprint $x_i$ was used instead of the blueprint $t_i$ for a fixed mapper.

FIG. 19 presents an example of synthetic generation of fingerprints from given blueprints for various parameters controlling the proximity to the original data.

FIG. 20 illustrates the generation of fakes of type 1 from digital blueprints.

FIG. 21 shows the same results for fakes of type 3 that have different appearance as compared to fakes of type 1.

FIGS. 22A to 22C illustrate various augmentation strategies for the synthetic sample generation by the system according to the present invention.

DETAILED DESCRIPTION OF THE INVENTION

In the following, the invention shall be described in detail with reference to the above mentioned figures.

The present invention relates to a method of physical object authentication based on blueprints and/or fingerprints. As already mentioned before, the following description, in general, will concentrate on the consideration of the method according to the present invention when used for the above mentioned authentication problem under the lack of training samples representing a class of fakes, and will only highlight and exemplify the differences and extensions to the classification in the presence of the synthetic fakes. However, the method according to the present invention may also comprise a training step using training samples representing a class of fakes, such that this conventional use case, of course, is possible also within the proposed method, though not described in detail.

According to the present invention, the authentication method typically comprises a mapper which is preferably realized by an encoder, optionally a decoder, multi-metrics and a classifier, which are trained in a way described in the following to achieve accurate and efficient authentication. Accordingly, the method according to the present invention comprises two main stages: A first stage includes joint training of the mapper, respectively of the encoder-decoder pair, according to the specified objectives to produce a vector of multi-metric features used for the classifier, which is trained on these features. The training stage also includes enrollment of new objects. A second stage includes an authentication step of the enrolled objects, represented by their blueprints $t_i$ and/or fingerprints $x_i$. Said authentication step forms a testing stage comprising production of a decision about the authenticity of an object to be authenticated and represented by a probe signal y acquired from this object using some imaging device with respect to a reference blueprint $t_i$, a reference fingerprint $x_i$ and/or jointly a blueprint-fingerprint pair $(t_i, x_i)$ representing an enrolled authentic physical object.

The blueprint $t_i$ may, for example, be provided by the party manufacturing and/or commercialising the objects to be authenticated or, alternatively, may also be acquired by the party supposed to provide for or to perform the authentication, possibly by examining the objects to be authenticated and preferably in non-invasive manner, e.g. by determining/measuring the parameters/features/dimensions of original objects to be authenticated without disassembling these objects. The fingerprint $x_i$, like mentioned already in the introduction, typically represents individual marking means which are voluntarily introduced and/or are inadvertantly present in the objects to be authenticated.

Figure 1:
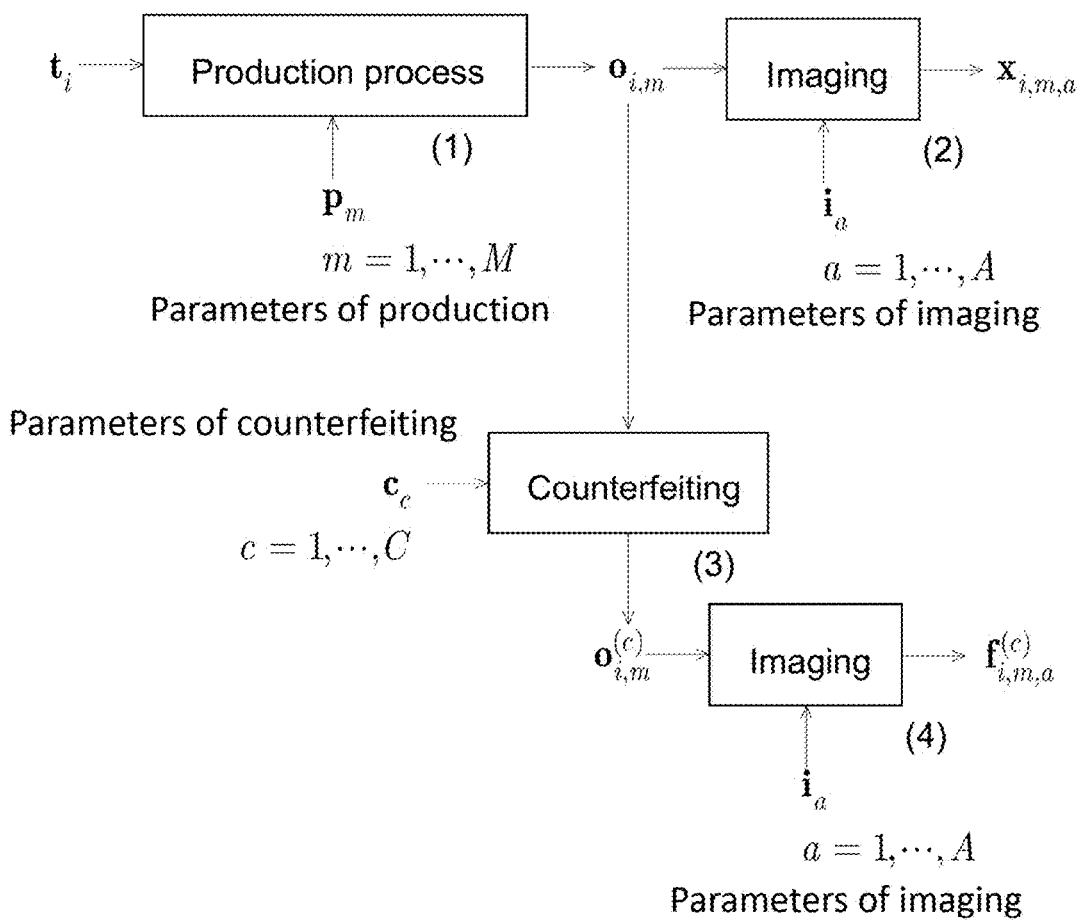
FIG. 1 presents a generic architecture of an object authentication method comprising use of a digital blueprint $t_i$ used to produce physical batch objects, an imaging system allowing acquisition of an image from a given physical object, a counterfeiting process producing a counterfeited object and imaging of this counterfeited object.

FIG. 1 illustrates a general setup representing the operational scenario under consideration in the present invention. The generic architecture shown corresponds to an object authentication method comprising use of a digital blueprint or template $t_i$ which is used to produce physical (batch) objects $o_{i,m}$ based on some production system $P_m$, 1, . . . , M, an imaging system characterized by the parameters $i_a$, $a=1, \ldots, A$ and allowing acquisition of an image $x_{i,m,a}$ from a given physical object $o_{i,m}$, a counterfeiting process with the parameters $c_m$, 1, . . . , C producing a counterfeited object $o_{i,m}^{(c)}$ and imaging of this counterfeited object resulting into the image $f_{i,m,a}^{(c)}$ of said fake/counterfeited object $o_{i,m}^{(c)}$. The blueprint $t_i$ is linked with the fingerprints $x_{i,m,a}$ that are parameterized by the parameters m of manufacturing/printing equipment and the parameters a of acquisition equipment. The parameters m of the manufacturing/printing equipment at least partly reflect the above mentioned individual marking means which are voluntarily introduced and/or are inadvertently present in the objects to be authenticated, whilst the parameters a of the acquisition equipment reflect modulation of these individual marking means and thus of the link between the blueprint $t_i$ and the fingerprints $x_{i,m,a}$ during acquisition of information from the objects to be authenticated. The fakes are represented by $f_{i,m,a}^c$, where c denotes the parameters of applied faking technology.

In a general case, the authentication of a physical object can be performed based on the verification of correspondence between the features of original objects and those of fakes ones. Assuming a special case where the original objects are represented by the fingerprints $\{x_i\}_{i=1}^N$ and the fakes by the fingerprints $\{f_i\}_{i=1}^N$ for a particular application of interest with the fixed parameters, one can train a supervised classifier to address the authentication problem. It is important to note that: (a) the class of originals and the class of fake objects are represented by the corresponding sets and there is no direct correspondence between a pair $x_i$ and $f_i$, i.e. the classifier does not use the information from which fingerprint $x_i$ the fake $f_i$ is produced from and (b) the classification is not based on a verification of proximity of the probe y to a particular claimed object with the index i represented by its fingerprint $x_i$ and blueprint $t_i$. At the authentication stage, the trained classifier should decide whether the probe y is closer to the class of the originals or fakes. This sort of authentication might be considered as a sort of generic forensic verification as considered in [63].

Furthermore, in case the defender that trains the classifier knows the correspondence between the triplets $\{x_i, x'_i, f_i\}_{i=1}^N$, the authentication process can be organized as shown in FIG. 2A. FIG. 2A illustrates the authentication based on the fingerprint approach. The training stage of the authentication system is based on the available triplets $\{x_i, x'_i, f_i\}_{i=1}^N$ of the pair of original fingerprints $x_i$, $x'_i$ acquired from the authentic object with the index i and corresponding fingerprints $f_i$ extracted from the fake objects imitating the object with the same index. Once the system is trained, the authentication can be applied to new fingerprints of enrolled objects that were not available at the training stage. The training is based on the minimization of a distance $d(a_{x_i}, a'_{x_i})$ between the embeddings $a_{x_i} = g_{\theta_x}(x_i)$ and $a'_{x_i} = g_{\theta_x}(x'_i)$ representing the mapping of fingerprint $x_i$ and its second view fingerprint $x'_i$ via the embedding operator $g_{\theta_x}(\cdot)$ (100). Simultaneously, the system maximizes the distance to the projected representation of corresponding fake $f_i$, i.e., $d(a_{x_i}, a_{f_i})$. The trained embedding is used for the training of the classifier. Alternatively the minimization/maximization of distances can be extended to the maximization/minimization of corresponding mutual information such as will be explained in more detail in the following description. This system resembles a triplet loss architecture [86] that is well known for example in biometrics applications and content retrieval systems. In addition, the training can also incorporate not only pairwise distances between the pairs of fingerprints representing original and fakes but also more general cases, when the distance between a particular fingerprint and several examples of fakes are used or between a particular fingerprint and several fakes corresponding to other fingerprints close to $x_i$. The examples of training strategies of such kind of systems can be based on multi-class N-pair loss [87] or NT-Xent loss [88] also extended to the supervised case [89].

Once the embedding operator $g_{\theta_x}(\cdot)$ is trained, which is denoted in FIG. 2A as $g^*_{\theta_x}(\cdot)$ one can project the original fingerprints and fakes via $g^*_{\theta_x}(\cdot)$ along with the reference $x_i$ and use the operator $\psi(a_{x_i}, a_y)$ (101) to concatenate the embeddings or to compute some distance between them. The output of said operator (101) is fed to the classifier (102) that can be trained in the supervised way as in the previous case. Alternatively, considering the operator $\psi(a_{x_i}, a_y)$ as a distance, one can apply a decision in (102) to this distance directly without a need to train a classifier. Finally, one can also envision a scheme when both the embedder and classifier are trained jointly in the end-to-end way.

FIG. 2B extends the previous setup to a case where the authentication is based on the blueprint $t_i$ instead of the fingerprint. In particular, FIG. 2B shows a similar architecture like FIG. 2A, wherein the blueprint $t_i$ is used for the authentication instead of the fingerprint $x_i$. At the training stage, it is assumed that the triplets $\{x_i,t_i,f_i\}_{i=1}^{N}$ are available. The fingerprints are mapped via the embedding operator $g_{\theta_x}(\cdot)$ (100) and the blueprint $t_i$ is projected via the mapper $g_\theta(\cdot)$ (103). The training and testing are similar to the above described case of FIG. 2A. One particular case of the considered system might also include a case when the mapper $g_\theta(\cdot)$ is an identity operator. In this case, the operator $g_{\theta_x}(\cdot)$ is trained to produce the best possible estimate of blueprint $t_i$ from fingerprint $x_i$ according to the metric $d(a_{t_i},a_{x_i})$ while maximizing the distance to fake $d(a_{f_i},a_{x_i})$ with $a_{t_i}=t_i$. The system is similar but the template $t_i$ has its own embedding operator.

Such authentication process is intuitively simple, but represents at the same time a number of practical restrictions and faces several issues:
1) The fakes are rarely available at the training stage and the training on the original fingerprints only while interpreting them as opposite to fakes might lead in some cases to a wrong embedding space and vulnerability to fakes that are closer to the originals than the supposed original opponents;
2) even if some fakes of original objects were available at the training time, the actual fakes produced by the counterfeiter might be considerably different at test time from those used for the training;
3) the considered authentication is solely based on the availability of the fingerprint $x_i$ for each physical object which might be not the case in real applications due to high cost of the fingerprint enrollment for large scale applications, infrastructure and database management or other technical constraints;
4) the scheme presented in FIG. 2B is based on the authentication from the blueprint and partially resolves the above issues but in this case the available fingerprints are not taken into account at the authentication stage even if such were available, which surely is not optimal;
5) in both cases, the presence of paired blueprint-fingerprint and fakes is required although it is very impractical and costly to provide these.

Therefore, both systems considered in FIG. 2 represent a possible solution to the authentication problem when the corresponding fakes are available at the training stage. Since this case represents mostly a theoretical interest due to the lack of fakes, it can be of interest to estimate the achievable system performance in a fully informed scenario. Thus it's practical usage is limited.

To resolve these challenges, the method of physical object authentication according to the present invention is based on the fact that the presence of paired fake examples $\{x_i,f_i\}_{i=1}^{N}$ or even unpaired examples $\{x_i\}_{i=1}^{N}$ and $\{f_i\}_{i=1}^{N}$ is not required at the training stage. This makes the proposed method better applicable to practical requirements and makes it more robust to potential broad variability and classes of fakes and attacks. Furthermore, to make the authentication better adaptable to the real cases where only blueprints $\{t_i\}_{i=1}^{N}$ are available for the authentication, which does not require complex enrollment of fingerprints from each physical object under the protection, or both some paired blueprints and fingerprints $\{t_i,x_i\}_{i=1}^{N}$, if such an option exists in some medium and small scale applications, or even unpaired sets of blueprints $\{t_i\}_{i=1}^{N}$ and some number of fingerprints $\{x_j\}_{j=1}^{J}$ are available at the training, an authentication is considered that can incorporate all these situations as particular cases without a need to change the authentication architecture for each particular case. This makes the proposed architecture universal and scalable to various practical use cases.

To this effect, at first place, an authentication method according to the present invention based only on the blueprint $t_i$ will be described in the following and, at second place, it will then be extended to the above cases, along with the introduction of the corresponding architecture and by addressing each case in details.

Figure 3:
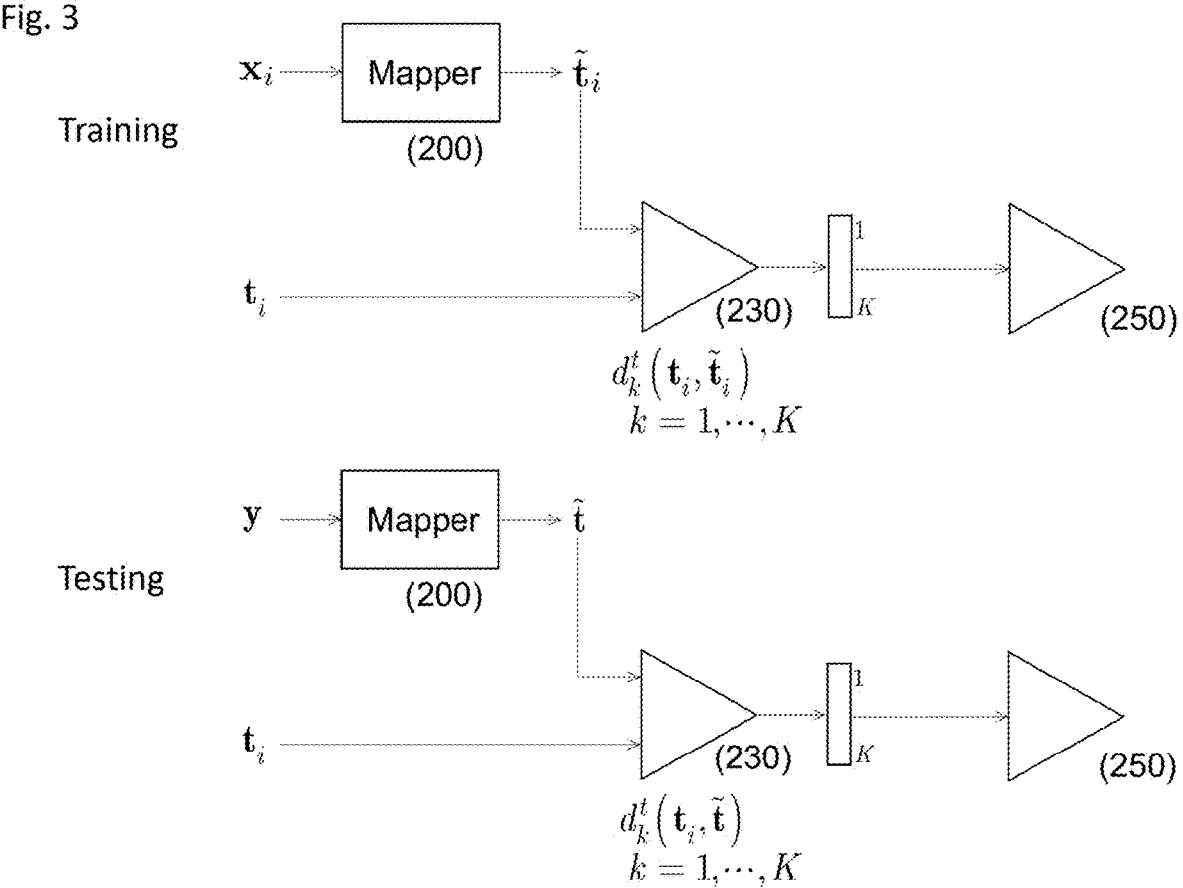
FIG. 3 schematically illustrates a generalized authentication architecture according to the present invention of a physical object based on a blueprint and an acquired image, referred to in the following also as a probe. The system is trained without fake samples.

FIG. 3 schematically illustrates a generalized authentication architecture according to the present invention of a physical object with the index i based on an acquired image y, referred to in the following also as a probe. The training is based on the pair $\{t_i,x_i\}_{i=1}^{N}$ and no fakes are used for the training in comparison to the system presented in FIG. 2. The authentication only requires the reference blueprint $t_i$ to authenticate the probe y. We will consider two setups where the mapper (200) is a hand-crafted mapper, i.e., it is a data independent and untrainable, and learnable mapper, i.e., it is learned in a function of imposed constrained. Assuming the hand-crafted case, at the training stage, a hand-crafted mapper (200) produces an estimate $\tilde{t}_i$ of the blueprint from the fingerprint $x_i$, a multi-metric scoring module (230) computing various metrics such as $l_p$ distances, correlation, Hamming distance, moment matching or some embedded space distances, etc. between $t_i$ and $\tilde{t}_i$. The multi-metric scores are combined into a feature vector that is used as an input to the OC-classifier (250) and the classifier is trained accordingly. The mapper (200) represents hand-crafted operations ranging from the identity mapping, binarization using various deblurring, denoising, thresholding strategies, morphological processing operations, etc. The fingerprints $x_i$ and probe y can be in a format of raw data converted to RGB, YUV or any color format or just a concatenation of raw color channels such as for example RG1G2B or any color sampling matrices of CCD or CMOS sensors. The OC-classifier (250) can be any classifier considered in the following description.

It should be pointed out that the mapper (200) resembles some similarity with the mapper (100) in FIG. 2B, where the mapper (103) is an identity operation. At the same time, the difference resides in the resulting goal of training, given that the operator (100) of the method of FIG. 2B is trained in a contrastive way with respect to the fakes while the operator (200) of the method of FIG. 3 is trained to ensure an estimate of the blueprint from the fingerprint according to the defined metrics (230).

In the case of learnable mapper (200) one can target to minimize the multi-metric (230) at the training stage and then to use the trained mapper to train the classifier (250). The testing stage is the same as described above. The role and importance of mapper (200) training will be further demonstrated in FIGS. 6 and 7, where the mapper (200) will be chosen in a hand-crafted way as the best estimator of the blueprints from the fingerprints.

Figure 4:
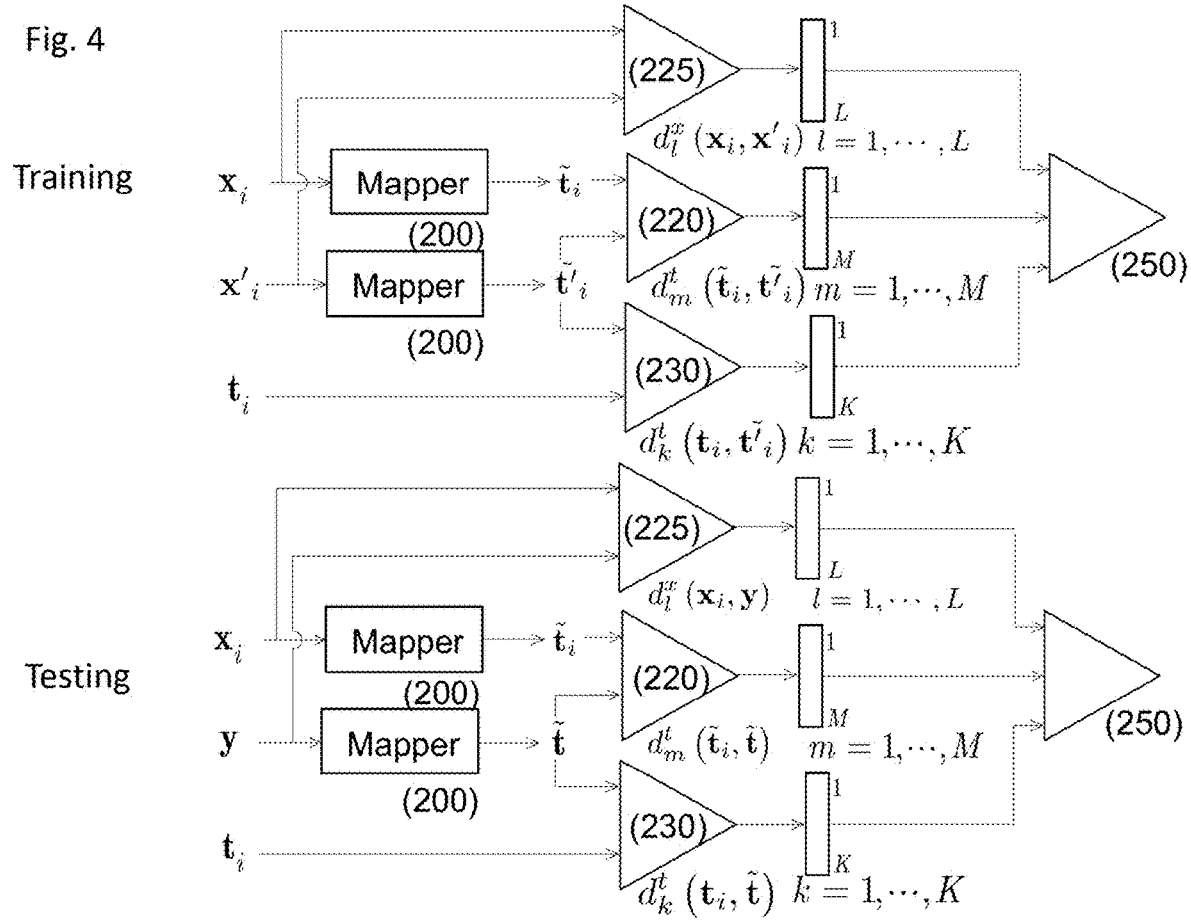
FIG. 4 schematically illustrates a generalized architecture for authentication according to the present invention of a physical object based on a probe, the object's blueprint and an enrolled fingerprint of said physical object.

FIG. 4 schematically illustrates a generalized architecture for authentication according to the present invention of a physical object with the index i based on the probe y, and the object's blueprint $t_i$ and enrolled fingerprint $x_i$ of said physical object using a hand-crafted or learnable mapper (200), a multi-metric scoring module (230) computing various metrics such as $l_p$ distances, correlation, Hamming distance, moment matching, or some embedded space distances, etc. between blueprint $t_i$ and estimate $\tilde{t}_i$ of the fingerprint $x_i$ and between $\tilde{t}_i$ and $\tilde{t}_j$, a multi-metric module (220) computing similar metrics between fingerprint $x_i$ and second view fingerprint $x'_i$ and the OC-classifier (250). The mapper (200) and the OC-classifier (250) are implemented in the same way as in the authentication architecture of FIG. 3. The main difference between the authentication considered in FIG. 4 and those in FIG. 3 consists in the additional usage of the fingerprint $x_i$ of the original object along with the blueprint $t_i$ at the authentication step. At the training stage, the pair of fingerprints $x_i$ and $x'_i$ acquired from the object along with the blueprint $t_i$ is used to produce the scores between the estimates of blueprints $d_k^t(\tilde{t}_i, \tilde{t}_j)$, k=1, . . . , K and between the fingerprints $d_l^x(x_i, x'_i)$, l=1, . . . , L. The scores are combined and the one-class classifier (250) is trained similarly to the method shown if FIG. 3. At the test stage, given the defined mapper (200) and the trained classifier, a probe y which might originate from the original fingerprint $x_i$ or from some unknown fake f, the described multi-metric scores are computed and the classifier produces the decision on authenticity based on said multi-metric scores.

To emphasize the importance of the mapper (200) and the role of multi-metrics in the methods according to FIGS. 3 and 4, several results on real data shall be presented. For this purpose, a case of printed security features is considered where the blueprint $t_i$ represents a random copy detection pattern of some specified density of black symbols such as shown in FIG. 5. The produced copy detection codes were printed on the industrial printed HP Indigo 5500 DS with the symbol size 5×5 at the resolution 812 dpi. Four types of fakes were produced using two copy machines: Fakes 1 white: RICOH MP C307 on white paper, Fakes 2 gray: RICOH MP C307 on gray paper, Fakes 3 white: Samsung CLX-6220FX on white paper and Fakes 4 gray: Samsung CLX-6220FX on gray paper. The verification is done using iPhone XS with the native camera application. The scanned original print representing the fingerprint $x_i$ and produced fakes $f_s$ are exemplified in FIG. 5B to 5F, respectively. The setting of copy machines were chosen with the embedded pre-processing to reduce the printed dot gain and to obtain perceptually similar appearance of fakes to the originals.

The authentication with respect to the reference blueprint $t_i$ is shown in FIG. 6 and with respect to the reference fingerprint $x_i$ in FIG. 7.

FIG. 6 schematically illustrates the inability of classical metrics used for the authentication architectures presented in FIGS. 3 and 4 and hand-crafted mapper (200) to reliably distinguish the originals from fakes based on the blueprint reference $t_i$. The experimental results are based on the samples shown in FIG. 5. None of the considered metrics is capable to reliably authenticate the object. Otsu's binarization [76] was used as a typical example of a mapper (200) from the fingerprint to the blueprint. The results presented in this figure clearly demonstrate that none of the considered metrics is capable to reliably differentiate the originals from fakes based on measuring the proximity to the reference blueprint. Moreover, the results confirm that a basic mapper based on Otsu's binarization, as a representative of the natural hand-crafted mapper for the estimation of binary blueprints from the printed fingerprints, as well as different manually tuned thresholds used in most of state-of-the-art methods do not achieve perfect distinguishability between the considered classes of originals and fakes. The presented results clearly demonstrate that the sole usage of multi-metrics with the hand-crafted mapper (200) is not sufficient to obtain a good separability between the classes. That is why the mapper (200) should properly trained in a way explained below.

FIG. 7 further extends the experimental study of the setup presented in FIG. 6 to the case where the physical reference based on the fingerprint $x_i$ was used instead of the blueprint $t_i$. In contrast to the common belief that the data processing inequality should ensure higher mutual information between the nearest vectors forming the Markov chain, the obtained results presented in FIG. 7 do not provide such confirmation, which is in accordance with the results presented in FIG. 6. Among the different reasons, one can clearly see in FIG. 7 the main misconception between the interpretation of mutual information and used metrics. More particularly, the used metrics reflect only the second order statistical relationship between the observations while the mutual information reflects the relation on the level of distributions that include all moments. For this reason, one of the main differences of an authentication method according to the present invention to prior art methods resides in that the correct estimation of mutual information can provide considerable enchantment of the authentication accuracy. FIG. 7 underlines that none of the considered classical prior art metrics is capable to reliably authenticate the object. Furthermore, similarly to the results presented in FIG. 6, the use of handcrafted mapper (200) in a form of the Otsu binarization is not sufficient and the mapper (200) should be trained.

Figure 8:
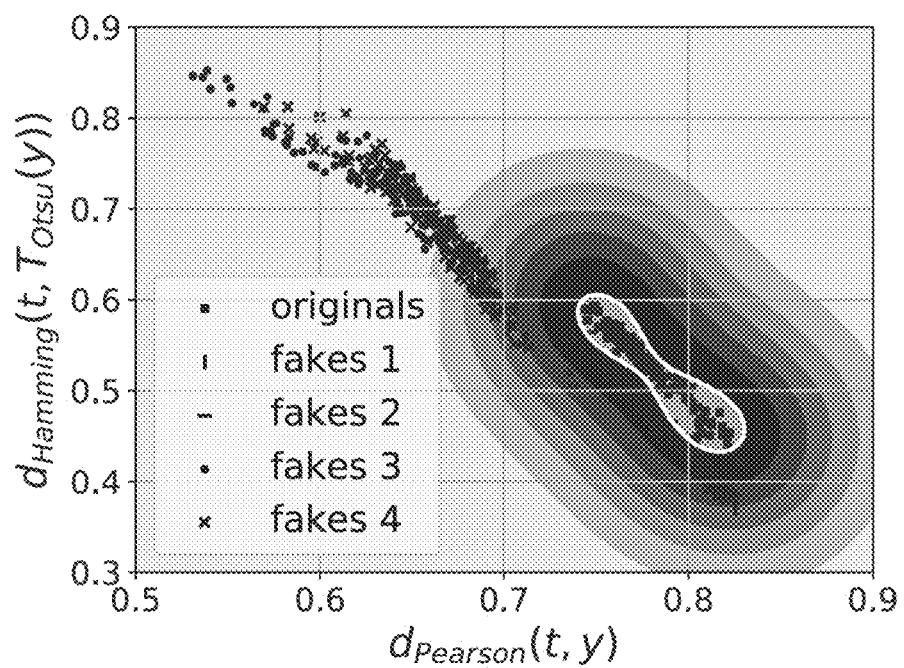
FIG. 8 illustrates the decision boundary of the OC-classifier based on the RBF-SVM trained only on the original data for the setup considered in FIG. 6.

Several multi-metrics were used and the 2D plots demonstrate the achieved separability between the classes of the original objects and four types of considered fakes in these metrics. Even under simple copy machine fakes none of pairs of the considered metrics is capable to produce a reliable separability between the classes for both the authentication based on the reference blueprint and fingerprint. In this particular case, it was found experimentally, that the pair of the Pearson correlation between the blueprint $t_i$ and probe y and the Hamming distance between the blueprint $t_i$ and binary quantized probe $T_{Otsu}(y)$ with the mapper (200) implemented via the Otsu thresholding selection produced the best among all considered cases yet imperfect separability between the classes. That is why this pair was chosen to exemplify the decision boundaries of the OC-classifier (250) trained on the pair of these metrics as shown in FIG. 8. FIG. 8 illustrates the decision boundary of the OC-classifier based on the RBF-SVM [77] trained only on the original data. As a metric space for the multi-metric scores the Pearson correlation between the fingerprint and blueprint and the Hamming distance between the blueprint and binarized fingerprint presented in FIG. 6 was used, for which one obtains the best possible separation between the classes of originals and fakes. One can clearly observe the overlapping between the class of the original objects with the classes of the fakes in the space of decision boundaries of the RBF-SVM one-class classifier. Therefore, at least for the considered example, the the obtained results demonstrate inability of the fixed mapper to provide reliable classification. The results shown in FIG. 8 as well as in FIGS. 6 to 7 explain the need to construct a trainable mapper (200) allowing to reliably distinguish originals from fakes.

To resolve the problem of inability of the above considered classification criteria to reliably distinguish the fakes from the originals, the present invention discloses a method where the mapping between the fingerprints and blueprints is based on a trainable model. Moreover, instead of a simple minimization of multi-metrics between the estimated and reference blueprints to train the mapper, we will consider a generalized approach where the above strategy is just a particular case. Along this way, it is assumed that the blueprints and fingerprints are statistically dependent and governed from a joint distribution p(t, x). This assumption is easily justified in practice due to the processing chain presented in FIG. 1. This chain demonstrates that the fingerprints $x_i$ are produced from the blueprints $t_i$ via a complex process of manufacturing and imaging, the exact and accurate models of which are unknown as such. Instead of trying to build such a model in contrast to prior art for example models of printing [27, 28] or models of imaging sensors [90] that is a very complex task requiring a lot of know-how in manufacturing and imaging as well as adaption to each particular use case and device, we proceed with a machine learning approach where the physical model knowledge is not needed. In general, one can distinguish three system designs according to the present invention to achieve the above goal depending on the order of processing: (a) A so called direct path system, (b) a so called reverse path system and (c) a so called two-way path system that combines the direct and reverse paths systems. Each system is based on the mappings of the fingerprint/blueprint to blueprint/fingerprint, respectfully. To ensure that the mapping is correct and corresponds to the joint prior p(t, x) represented in practice by the training samples examples $\{t_i, x_i\}_{i=1}^N$ and marginals represented by the unpaired examples $\{t_i\}_{i=1}^N$ and $\{x_i\}_{i=1}^N$, it is assumed that the mapping should satisfy two constraints. The first constrain ensures that the produced estimates of blueprint/fingerprint should corresponds to their paired versions, if such are available, or otherwise follow the corresponding marginal distributions or satisfy both conditions simultaneously. The second constrain should ensure that the produced estimates contain enough information to reconstruct the corresponding original counterparts from them.

Direct Path System

Figure 9:
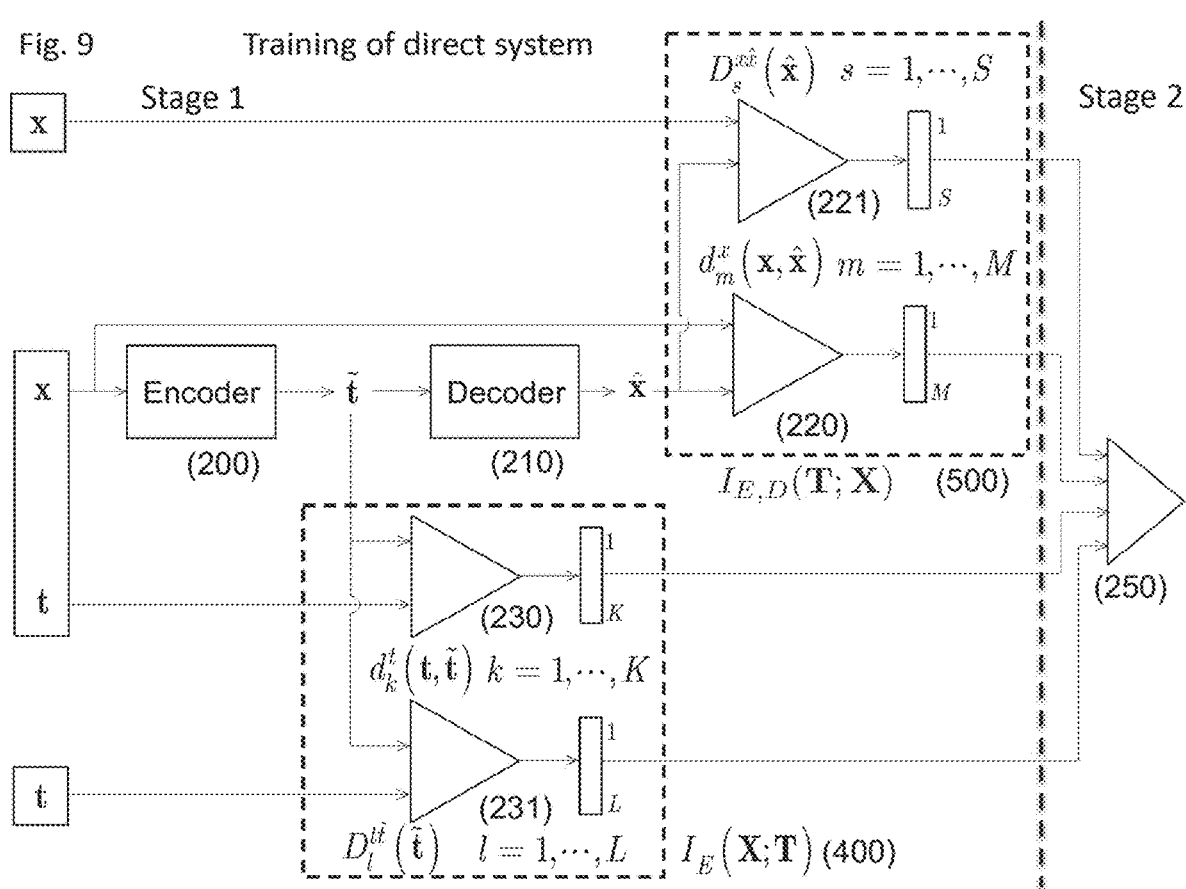
FIG. 9 schematically illustrates a generalized principle of training in a direct path system for physical object authentication according to the present invention based on N pairs of blueprints and fingerprints $\{t_i, x_i\}_{i=1}^N$, and J unpaired data samples of blueprints $\{t_j\}_{j=1}^J$ and fingerprints $\{x_j\}_{j=1}^J$.

The direct path authentication system is shown in FIG. 9 which, in particular, schematically illustrates a generalized principle of training in a direct approach for physical object authentication according to the present invention based on N pairs of blueprints and fingerprints $\{t_i, x_i\}_{i=1}^N$, and J unpaired data samples of blueprints $\{t_j\}_{j=1}^J$ and fingerprints $\{x_j\}_{j=1}^J$. The paired and unpaired data are symbolized in FIG. 9 as being grouped by corresponding rectangles at the input of the system. The direct system comprises an encoder-decoder pair trained generally based on both paired and unpaired data. The encoder (200) produces an estimate $\tilde{t}$ of the blueprint from the fingerprint x and the decoder (210) encodes it back to the estimate of the fingerprint $\hat{x}$ to ensure the fidelity of the whole model. It should be pointed out that the printing model and imaging setup are unknown as such and the training is based on the training data only. Furthermore, fakes are not taken into account at the training of the OC-classifier (250). At the training stage 1, the training process is performed according to the loss function defined by the decomposition of the terms of mutual information as described in the following description to train the encoder-decoder pair. The estimate $\tilde{t}$ of the blueprint is performed according to the metrics defined in the module (400) based on mutual information term $I_E(X; T)$. This module contains a set of multi-metric similarity distances (230) and discriminators (231) obtained from the variational decomposition of the mutual information as shown in the following description. Additionally, one can also use the existing mutual information estimators like those based on Donsker-Varadhan bound, e.g. just to mention for example mutual information neural estimator (MINE) [78]. It is proceeded with the variational decomposition presented in [79], since it allows to obtain an intuitive interpretability of obtained estimators and also technically tractable implementation. The similarity distance module (230) is based on the paired metrics while the discriminator (231) integrates an estimation of samples from two distributions that are generally unpaired. Examples of paired distances include but are not limited to the L2-norm, L1-norm, Lp-norm, inner product, cosine distance, Hamming distance, Pearson correlation, etc. The discriminator estimates the proximity of two distributions represented by the samples $\{\tilde{t}_j\}_{j=1}^J$ and $\{t_j\}_{j=1}^J$ and can be implemented based on: (a) class probability estimation based on the density ratio estimation [80, 81], (b) divergence minimization [82] and (c) ratio matching [83, 84] or alternatively based on moment matching implemented based on kernels and known as the maximum mean discrepancy [85].

The reconstruction of the fingerprint is performed according to the metrics defined in the module (500) that consists of similar paired similarity metrics (221) and unpaired discriminators (220) defining the approximation to mutual information term $I_{E,D}(T; X)$. The implementation of the metrics is similar as above.

At the stage 2, the outputs of all paired and unpaired metrics are concatenated into a feature vector that serves as an input to the OC-classifier (250). It should be pointed out that complexity of the training of the OC-classifier based on the proposed feature vector in the proposed system is considerably lower as compared to training in methods based on the direct classification of samples in the high-dimensional space of input data. The training of classifiers in the input space is highly complex, even when using the dual form of representation in systems based on the OC-SVM. Therefore, by considering the input of the OC-classifier (250) as a concatenated vector of multi-metric scores, one can considerably reduce the complexity of the classifier training in the domain where the classes are better separable.

The direct system is based on the encoder (200) and the decoder (210) that are trained jointly based on the maximization of two mutual information terms $I_E(X; T)$ and $I_{E,D}(T; X)$. The first term $I_E(X; T)$ represented by (400) and denotes the mutual information between the fingerprint and blueprint considered via the encoder (200) and decomposed as [79]:

$$I_E(X;T) := -D_{KL}(p_{Data}(t) \| p_E(t); E) - H_E(T|X), \qquad (2)$$

where $D_{KL}(p_{Data}(t) \| p_E(t); E) = D^{\tilde{t}}(\tilde{t})$ denotes the Kullback-Leibler divergence (KLD) between the blueprint data distribution $p_{Data}(t)$ and encoded one $P_E(t)$. We will refer to the KLD as a discriminator between two distributions $p_{Data}(t)$ and $P_E(t)$. The discriminator estimates the proximity of two distributions represented by the samples $\{\tilde{t}_j\}_{j=1}^J$ and $\{t_j\}_{j=1}^J$ generated from these distributions and can be implemented based on: (a) class probability estimation based on the density ratio estimation [80], (b) divergence minimization [82] and (c) ratio matching [83] or alternatively based on moment matching implemented based on kernels and known as the maximum mean discrepancy [101].

The term $H_E(T|X) = -E_{p(t,x)}[\log q_E(t|x)]$ denotes the conditional entropy, where $E_{p(t,x)}[\cdot]$ denotes the mathematical expectation with respect to the distribution p(t, x). We define $q_E(t|x) \propto e^{-\lambda_{\tilde{t}} d^t(t,\tilde{t})}$ with $\lambda_{\tilde{t}}$ to be a normalization parameter and $d^t(t, \tilde{t})$ denotes a particular metric of similarity between t and $\tilde{t}$ and $\tilde{t} = f_E(x)$ represents the deterministic part of encoder mapping. Therefore, $H_E(T|X) \propto -\lambda_{\tilde{t}} d^t(t, \tilde{t})$. The corresponding blocks of (400) are denoted as (230) and (231). The subsidences of (230) and (231) corresponds to the different selection of multi-metric scores.

The second term $I_{E,D}(T; X)$ represented by (500) denotes the mutual information between the encoded blueprint and targeted fingerprint considered via the encoder (200) and decoder (210) and decomposed as:

$$I_{E,D}(T;X):=-D_{KL}(p_{Data}(x)\|p_D(x);E,D)-H_{E,D}(X|T), \quad (3)$$

where $D_{KL}(p_{Data}(x)\|p_D(x); E, D)=D^{x\hat{x}}(\hat{x})$, denotes the Kullback-Leibler divergence between the image fingerprint distribution $p_{Data}(x)$ and its reconstructed counterpart $p_D(x)$. The second term in the above decomposition is $H_{E,D}(X|T)=-E_{p_{Data}(x)}[E_{qE(t|x)}[\log p_D(x|t)]]$. Assuming $p_D(x|t) \propto e^{-\lambda_{x\hat{x}} d^x(x,\hat{x})}$, with $\lambda_{x\hat{x}}$ denoting the normalization parameter and $d^x(x,\hat{x})$ denoting some distance between x and $\hat{x}=g_D(\tilde{t})$ with $\tilde{t}=f_E(x)$, one can re-write $H_{E,D}(X, T) \propto -\lambda_{x\hat{x}} d^x(x, \hat{x})$. The corresponding blocks of (500) are denoted as (221) and (220).

The direct path architecture training problem is based on maximization problem:

$$(\hat{E}, \hat{D}) = \operatorname*{argmax}_{E,D} I_E(X; T) + \lambda I_{E,D}(T; X), \quad (4)$$

that consists in finding the parameters of the encoder and decoder $(\hat{E}, \hat{D})$ with $\lambda$ denoting the Lagrangian multiplier controlling the trade-off between the two terms.

The maximization problem (4) is reduced to a minimization problem using (2) and (3):

$$(\hat{E}, \hat{D}) = \operatorname*{argmin}_{E,D} \Lambda^x(E, D), \quad (5)$$

where $\Lambda^x(E,D)=[D^{\tilde{t}t}(\tilde{t})+\lambda_{t\tilde{t}}d^t(t, \tilde{t})]+\lambda[D^{x\hat{x}}(\hat{x})+\lambda_{x\hat{x}}d^x(x,\hat{x})]$.

The discriminators (231) and (221) are fixed at the above training. Once the parameters of the encoder and decoder are estimated at this stage the discriminators are updated and the next epoch of training is repeated.

Once the encoder-decoder and discriminators are trained, the multi-metrics scores are used for the OC-classifier (250) training that finalizes the training of the direct path.

Figure 10:
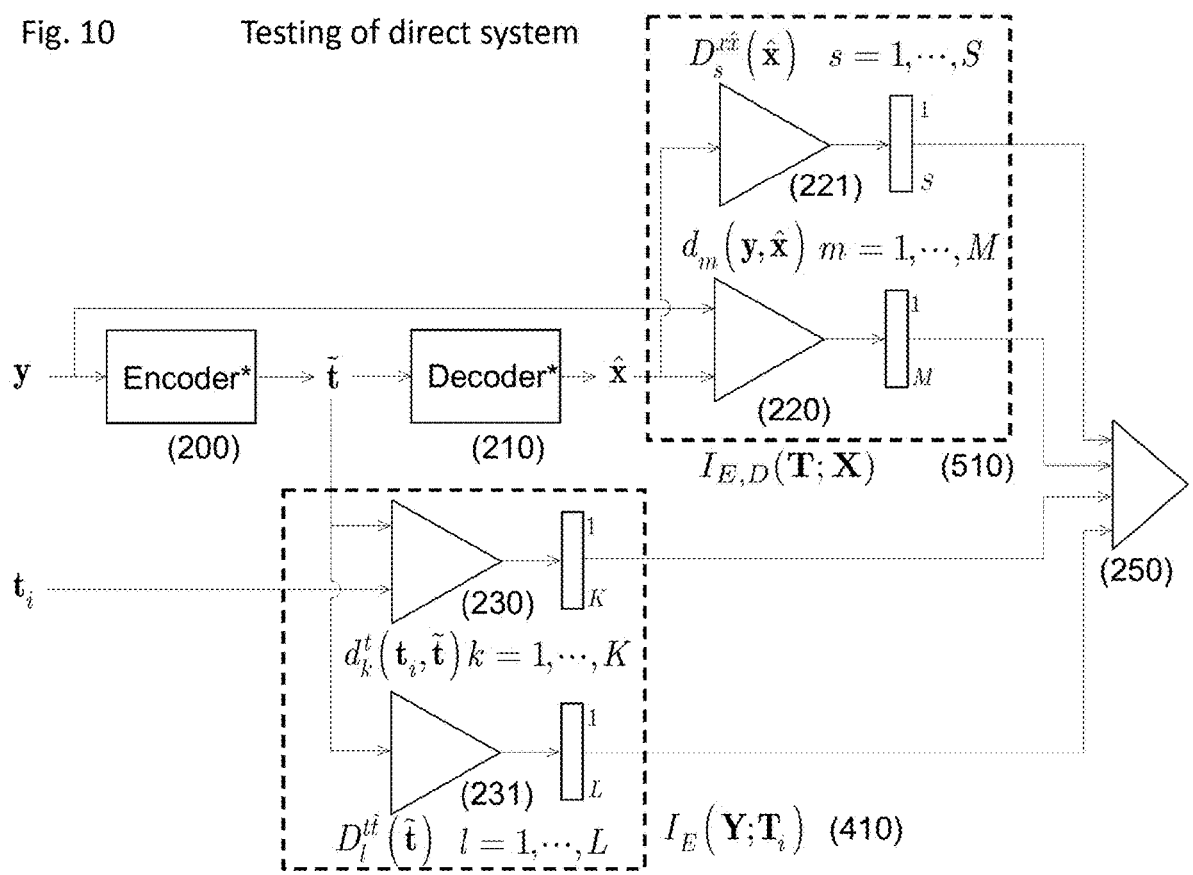
FIG. 10 schematically illustrates a generalized principle of a testing or authentication stage in the direct path system for authentication of a physical object i according to the present invention based on the probe y and blueprint $t_i$ of the object under the authentication.

At the testing stage of the direct path such as shown in FIG. 10, the system authenticates the probe y representing the fingerprint of an object to be authenticated with respect to the blueprint $t_i$. For this purpose the probe y is encoded and decoded and the produced multi-metric scores are validated via the OC-classifier. FIG. 10 schematically illustrates a generalized principle of a testing or authentication stage in the direct path for authentication of a physical object i according to the present invention based on the probe y and blueprint $t_i$ of the object under the authentication. The authentication uses as an input the probe y and the reference blueprint $t_i$ and produces the output about the authenticity of y with respect to $t_i$. The authentication architecture comprises the pre-trained encoder (200) and decoder (210), pre-training of said encoder and decoder being symbolized in FIG. 10 with the star sign, the multi-metric scoring (230) and (231) for the reconstructed template $\tilde{t}_i$ and multi-metric scoring (220) and (221) for the reconstructed image $\hat{x}$ and the OC-classifier (250) producing a decision based on the concatenated multi-metric feature vector. All components of the considered architecture are implemented as described in the context of FIG. 9.

It should be pointed out that the direct system presented is a generalization of system presented in FIG. 3, where the mapper (200) corresponds to the encoder (200) in FIG. 9. At the same time, the training of the encoder in FIG. 9 is regularized by the need to ensure a reliable reconstruction of the fingerprint from the estimated blueprint whereas such a constraint is absent in the system shown in FIG. 3. In addition, the system explained in FIG. 9 is trained based on the above decomposition of the mutual information, which includes both the similarity metrics and discriminators, whereas the system explained in FIG. 3 uses just one term for the paired data whilst the unpaired data are not included in the training of FIG. 3.

Reverse Path System

Figure 11:
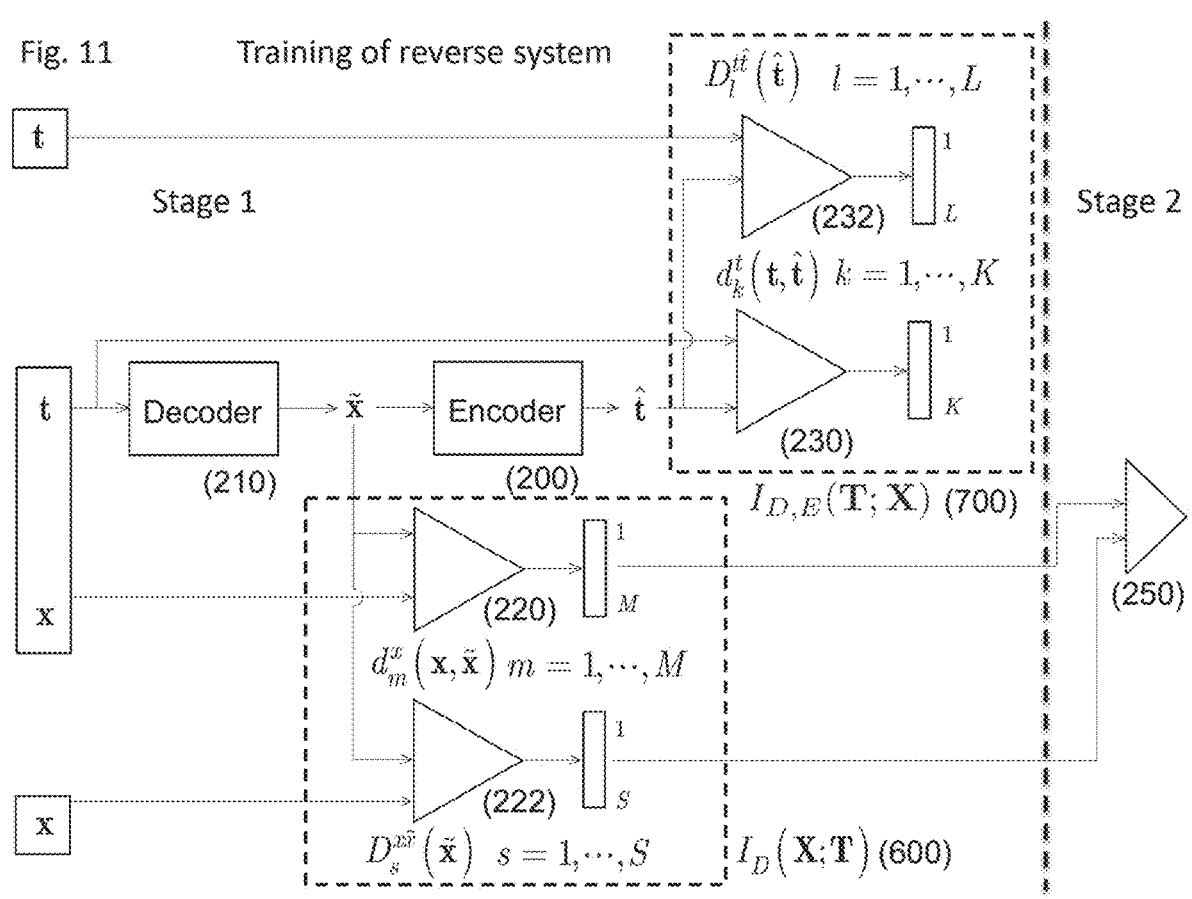
FIG. 11 schematically illustrates a reverse path authentication system according to the present invention comprising an encoder-decoder pair trained based on both paired and unpaired data.

FIG. 11 schematically illustrates a reverse system according to the present invention comprising an encoder-decoder pair trained based on both paired and unpaired data. The order of processing is reverse with respect to the direct system. The decoder (210) produces an estimate $\tilde{x}$ of the fingerprint from the blueprint t and the encoder (200) encodes it back to the estimate $\hat{t}$ of the blueprint to ensure the fidelity of the whole model. The OC-classifier (250) produces a decision based on the feature vector. The training of the reverse system is similar to the direct one. At stage 1, the training process is performed according to the loss function defined by the decomposition of the terms of mutual information to train the decoder-encoder pair. The estimate $\tilde{x}$ of the fingerprint is performed according to the metrics defined in the module (600) that serves as an approximation to mutual information term $I_D(X; T)$. This module contains a set of multi-metric similarity distances (220) and discriminators (222). The reconstruction of the blueprint $\hat{t}$ is performed according to the metrics defined in module (700) that comprises similar paired similarity metrics (230) and unpaired discriminators (232) defining the approximation to mutual information term $I_{D,E}(T; X)$. The implementation of metrics is similar as described above. At stage 2, the outputs of all paired and unpaired metrics are concatenated into a feature vector that serves as an input to the OC-classifier (250).

The reverse system is based on the encoder (200) and the decoder (210) that are trained jointly based on the maximization of two mutual information terms $I_D(X; T)$ and $I_{D,E}(T;X)$. It represents a reversed version of the direct system. The first term $I_D (X; T)$ represented by (600) denotes the mutual information between the fingerprint and blueprint considered via the decoder (210) and decomposed as [79]:

$$I_D(X;T):=-D_{KL}(p_{Data}(x)\|p_D(x);D)-H_D(X|T), \quad (6)$$

where $D_{KL}(p_{Data}(X)\|p_D(x); D)=D^{x\tilde{x}}(\tilde{x})$ denotes the Kullback-Leibler divergence between the fingerprint data distribution $p_{Data}(x)$ and decoded one $p_D(x)$. The term $H_D(X|T)=-E_{p(t,x)}[\log p_D(x|t)]$ denotes the conditional entropy, where $E_{p(t,x)}[\cdot]$ denotes the mathematical expectation with respect to the distribution p(t, x). We define $P_D(x|t) \propto e^{-\lambda_{x\tilde{x}} d^x(x,\tilde{x})}$ with $\lambda_{x\tilde{x}}$ is a normalization parameter, $d^x(x, \tilde{x})$ denotes a particular metric of similarity between x and $\tilde{x}$ and $\tilde{x}=g_D(t)$. Therefore, $H_D(X|T) \propto -\lambda_{x\tilde{x}} d^x(x,\tilde{x})$.

The second term $I_{D,E}(T; X)$ represented by (700) denotes the mutual information between the decoded fingerprint and targeted blueprint considered via the decoder (210) and encoder (200) and decomposed as:

$$I_{D,E}(T;X):=-D_{KL}(p_{Data}(t)\|p_E(t);E,D)-H_{D,E}(T|X), \quad (7)$$

where $D_{KL}(p_{Data}(t)\|p_E(t); E, D)=D^{t\hat{t}}(\hat{t})$, denotes the Kullback-Leibler divergence between the image fingerprint distribution $p_{Data}(t)$ and its reconstructed counterpart $P_E(t)$ with $\hat{t}=f_E(g_D(t))$.

The second term $H_{D,E}(T|X)=-E_{p_{Data}}^{(t)}[E_{p_D}^{(x|t)}[\log q_E(t|x)]]$ denotes the conditional entropy and corresponds to the estimation of the blueprint from the synthetic fingerprint produced by the decoder. Assuming $q_E(t|x) \propto e^{-\lambda_{t\hat{t}} d^t(t,\hat{t})}$, with $\lambda_{\hat{t}\hat{t}}$ denoting the normalization parameter, $d^r(t, \hat{t})$ denoting some distance between $t$ and $\hat{t}=f_E(\tilde{x})$, with $\tilde{x}=g_D(t)$, we re-write $H_{D,E}(T,X) \propto -\lambda_{\hat{t}\hat{t}} d^r(t,\hat{t})$.

The reverse path training problem is based on maximization problem:

$$(\hat{E}, \hat{D}) = \underset{E,D}{\operatorname{argmax}} I_D(T; X) + \lambda I_{D,E}(X; T). \tag{8}$$

The maximization problem (8) is reduced to a minimization problem using (6) and (7):

$$(\hat{E}, \hat{D}) = \underset{E,D}{\operatorname{argmin}} \Lambda^r(E, D), \tag{9}$$

where $\Lambda^r(E,D) = [D^{x\tilde{x}}(\tilde{x}) + \lambda_{x\tilde{x}} d^x(x,\tilde{x})] + \alpha[D^{\hat{t}\hat{t}}(\hat{t}) + \lambda_{\hat{t}\hat{t}} d^r(t, \hat{t})]$, where $\alpha$ is a Lagrangian coefficient.

Once the encoder-decoder and discriminators are trained, the multi-metrics scores are used for the OC-classifier (250) training that finalizes the training of the reverse path.

Figure 12:
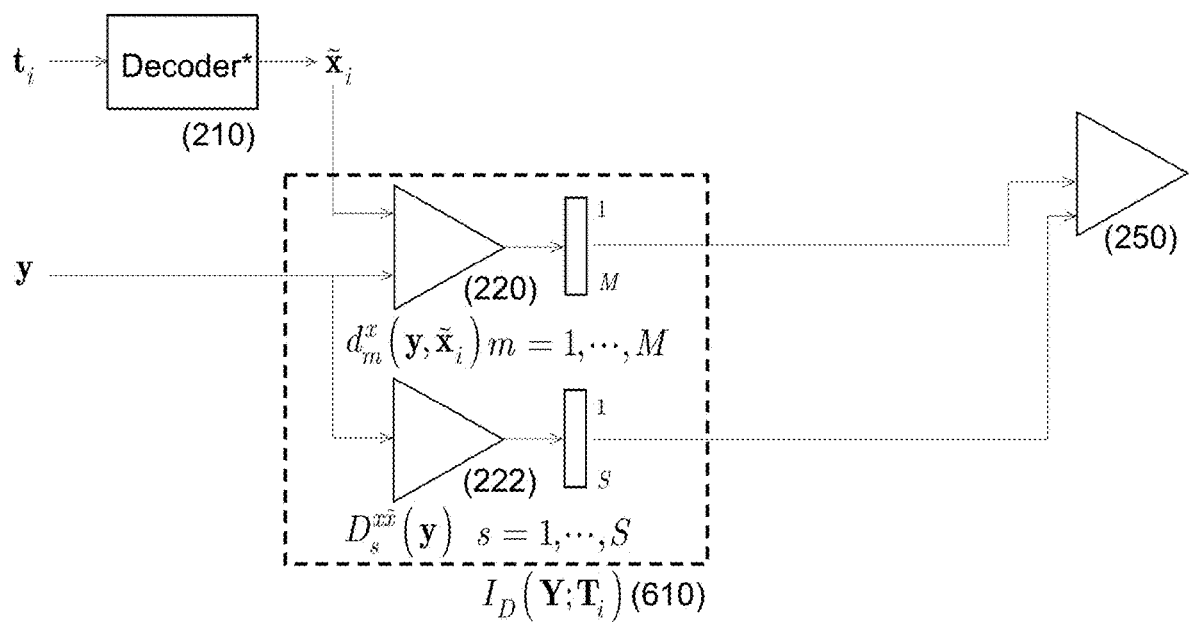
FIG. 12 schematically illustrates a generalized principle of a testing or authentication stage in the reverse system according to the present invention.

At the testing stage of the direct path such as shown in FIG. 12, the system authenticates the probe y representing the fingerprint of an object to be authenticated with respect to the blueprint $t_i$. For this purpose the blueprint $t_i$ is decoded in the estimated fingerprint $\tilde{x}_I$ that is compared with the probe y via the produced multi-metric scores that are validated via the OC-classifier. FIG. 12 schematically illustrates a generalized principle of a testing or authentication stage in the reverse system according to the present invention. The authentication uses as an input the probe y and the reference blueprint $t_i$ and produces the output about the authenticity of probe y with respect to blueprint $t_i$ similar to the direct system. The authentication architecture comprises the pre-trained encoder (200) and decoder (210), pre-training of said decoder being symbolized in FIG. 12 with the star sign, the multi-metric scoring (220) and (222) for the reconstructed fingerprint $\tilde{x}_I$ and the OC-classifier producing a decision based on the concatenated multi-metric feature vector. All components of the considered architecture are implemented as described in the context of FIG. 9.

Two-Way System

Figure 13:
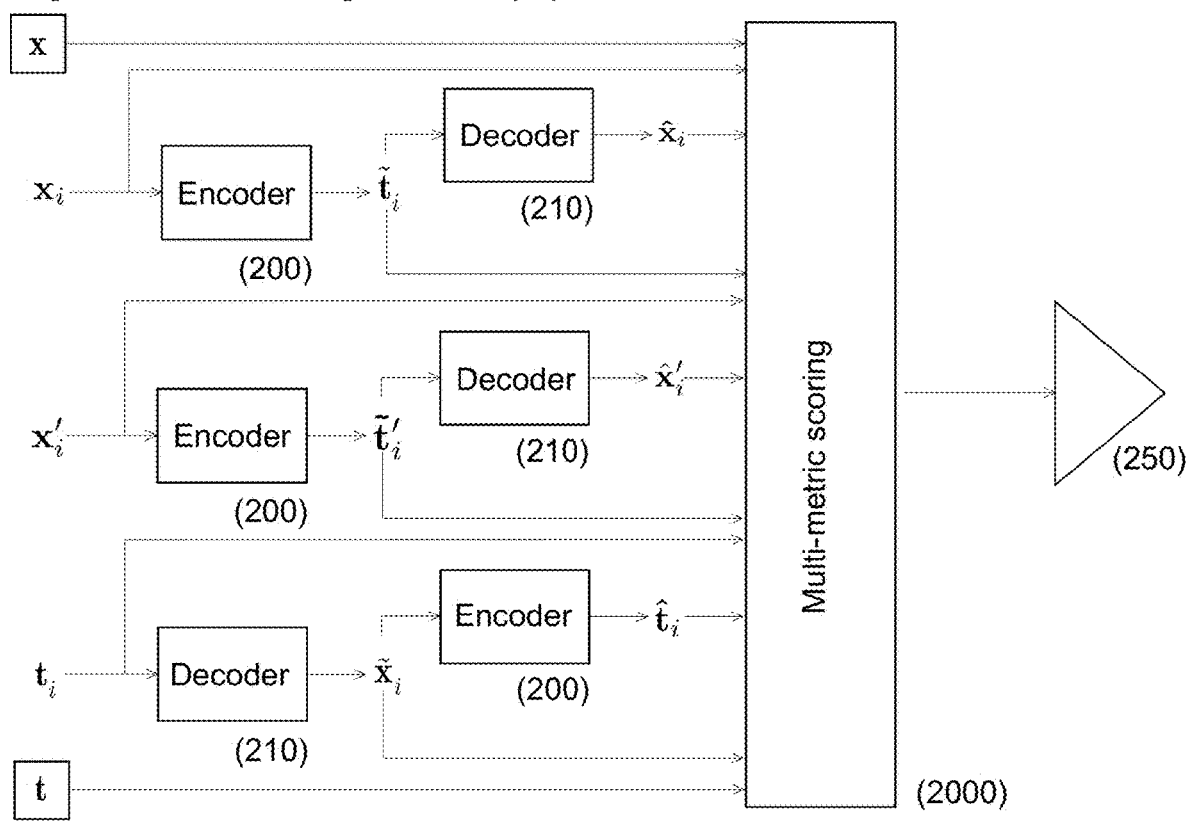
FIG. 13 schematically illustrates a generalized principle of training in a two-way approach for physical object authentication according to the present invention based on N pairs of blueprints and fingerprints $\{t_i, x_i\}_{i=1}^N$, and J unpaired data samples of $\{t_j\}_{j=1}^J$ and $\{x_j\}_{j=1}^J$.

The two-way system is based on the direct and reverse paths and shown in FIG. 13 which, in particular, schematically illustrates a generalized principle of training in a two-way approach for physical object authentication according to the present invention based on N pairs of blueprints and fingerprints $\{t_i, x_i\}_{i=1}^N$, and J unpaired data samples of $\{t_j\}_{j=1}^J$ and $\{x_j\}_{j=1}^J$. The paired and unpaired data are symbolized in FIG. 9 as being grouped by corresponding rectangles. The training is based on decomposition of 6 mutual information terms to cover the multi-metric scores based on the similarity metrics and discriminators computed between: (a) x and $\tilde{x}$, (b) x and $\hat{x}$, (c) $\tilde{x}$ and $\hat{x}$, (d) t and $\hat{t}$, (e) t and $\hat{t}$ and (f) $\hat{t}$ and $\hat{t}$. All these metrics are computed in block (2000). The training of the two-way system can be performed as an alternation procedure between the direct path represented by the chain $x \to \tilde{t} \to \hat{x}$ and the reverse path represented as $t \to \tilde{x} \to \hat{t}$ or two-ways simultaneously with the corresponding metrics and discriminators. The block (2000) outputs a multidimensional feature vector combining all the above multi-metric scores. At the second stage, the OC-classifier (250) is trained using the above feature vector as an input. The training of two-way system is based on N pairs of blueprints and fingerprints $\{t_i, x_i\}_{i=1}^N$, and J unpaired data samples of $\{t_j\}_{j=1}^J$ and $\{x_j\}_{j=1}^J$. The training procedure consists of two stages. At the first stage, given the training pairs $\{t_i, x_i\}_{i=1}^N$ and unpaired samples $\{t_j\}_{j=1}^J$ and $\{x_j\}_{j=1}^J$, the encoder and decoder pair is trained jointly with the discriminators in the direct and reverse cycles. Alternatively, one can formulate the common loss:

$$\Lambda^{Two-way}(E,D) = \Lambda^x(E,D) + \beta \Lambda^r(E,D), \tag{10}$$

where $\beta$ denotes the Lagrangian multiplier, as a combination of the direct and reverse objectives. At the same time, the two-way system is not just a sole combination of the previous objectives. It also includes the cross terms from two modalities. It can be formalized as a decomposition of 6 terms of mutual information as pointed out above. Therefore, the mutual information includes: four terms considered in the direct and reverse parts, i.e. $I_E(X; T)$, $I_{E,D}(T; X)$, $I_D(X; T)$ and $I_{D,E}(T; X)$, and two cross-terms between the direct and reverse parts denoted as $I_{E,D,D}(T; X)$ and $I_{D,E,E}(T; X)$. Each mutual information is decomposed into two terms including the paired similarity metric and discriminator term computed using multi-metric approximations similar to the direct and reverse systems.

Figure 14:
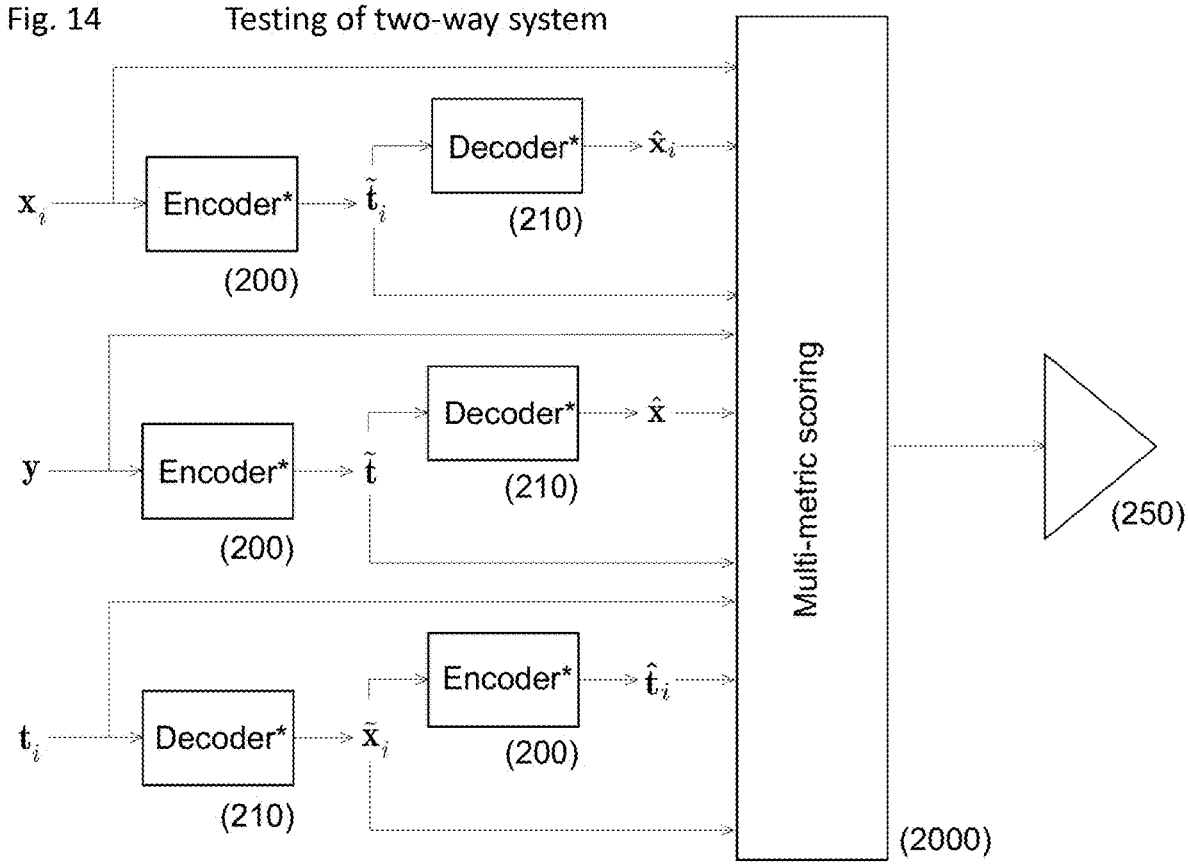
FIG. 14 schematically illustrates a testing or authentication stage based on the two-way trained system according to FIG. 13.

The authentication stage represents the testing and is shown in FIG. 14. Given the trained encoder-decoder pair, the discriminators, chosen the similarity metrics and OC-classifier according the description provided above, the authentication is based on the authentication of probe y versus the reference blueprint $t_i$ and fingerprint $x_i$. The multi-metrics are computed in (2000) and the feature vector comprising scores produced by these metrics is fed to the OC-classifier (250). It is important to note that the considered system represents an important countermeasure against both hand-crafted (HC) and machine learning (ML) based attacks by producing a trade-off between the decision produced from the reference blueprint $t_i$ and reference fingerprint $x_i$. This trade-off is based on the following considerations.

Assuming that a fake originates from the HC and ML attacks targeting the estimation of $t_i$ from $x_i$ with the further accurate reproduction of the estimated blueprint and thus creating a fake object, the defender is interested to introduce some distortions during the reproduction of blueprint $t_i$ into a physical object $x_i$. These distortions will prevent the HC and ML attacks from an accurate estimation of $\hat{t}_1$. However, at the same time, this creates a considerable difference between the blueprint $t_i$ and its fingerprint $x_i$ even for the authentic objects that makes the distinction between the originals and fakes challenging. That is why the usage of a sole direct system based authentication might be insufficient in view of low accuracy of prediction of $\hat{t}$ from y. At the same time, the usage of a sole reverse system based authentication is based on the generation of $\tilde{t}_I$ from $t_i$ and its comparison with the probe y. If the level of distortions is high and the distortions are produced at random, the accuracy of prediction might also reduce. That is why the two-way system has several additional options when $x_i$ is compared with y directly and $\tilde{x}_I$ is compared with $\hat{x}_I$ and with $x_i$. The same is valid for the fingerprint part. The advantage of the two-way system is that all possible combinations are present at the multi-metric feature vector and the OC-classifier can automatically choose such a metric or dimension representing the most informative component for a particular case of interest.

To demonstrate the advantages of such multi-metric system in practice, a simple setup of the direct path:

$$\Lambda^x(E,D) = d_{t_1}(t,\tilde{t}) + \lambda d_{t_1}(x,\hat{x})$$

was trained, i.e. based on only similarity metrics and no discriminators. Once the encoder-decoder pair was trained, the feature vector combining several multi-metrics was constructed.

Figure 17:
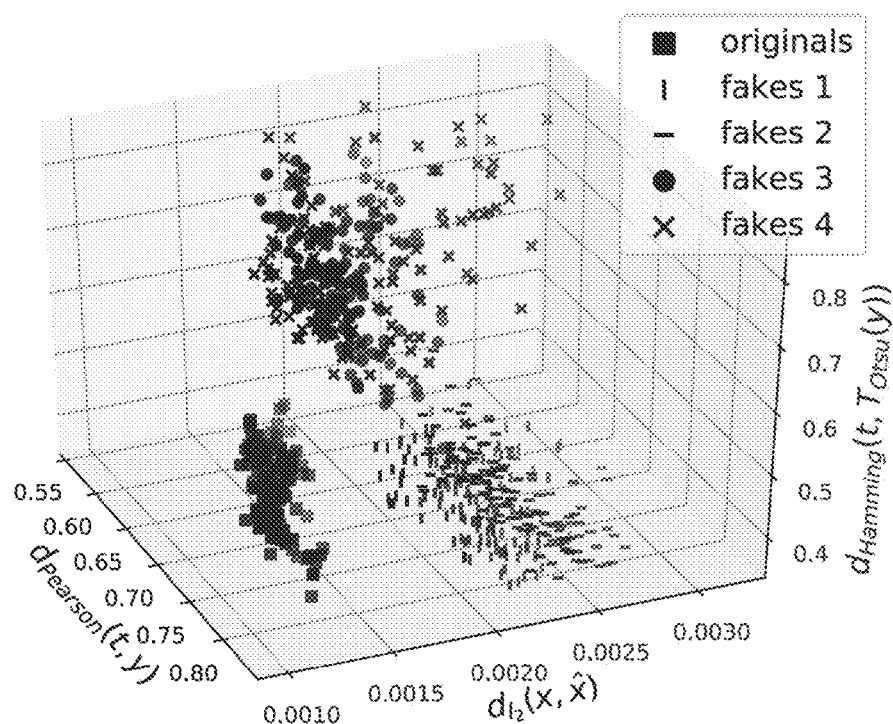
FIG. 17 presents a 3D visualization of class separability for the reverse system according to the present invention in a multi-metric space.

FIG. 17 presents a 3D visualization of class separability for the direct system in multi-metric space of: $d_{Pearson}(y, t_i)$—Pearson metric computed between the probe and blueprint, $d_{l_2}(y, \hat{x})$—the Euclidian metric between the probe and encoded-decoded probe via the trained system and $d_{Hamming}(T_{Otsu}(y), t_i)$—the Hamming distance between the binarized probe via the Otsu's thresholding of probe and blueprint.

Figure 18:
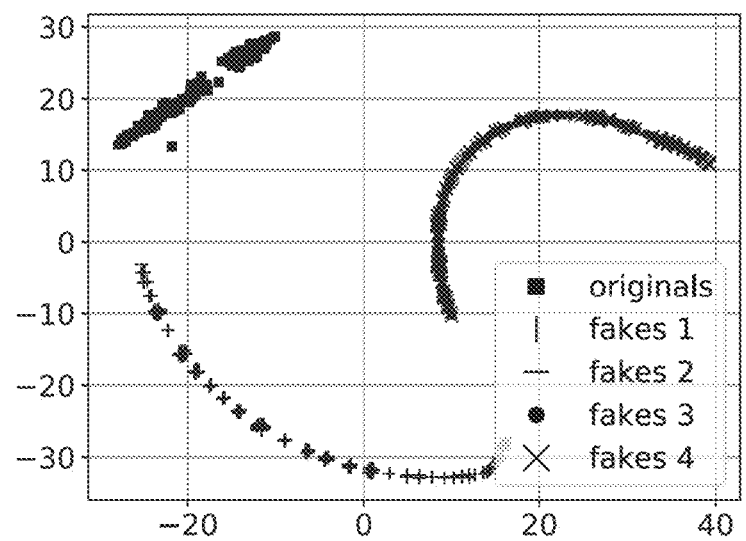
FIG. 18 shows a t-SNE computed from a concatenation of four multi-metrics.

FIG. 18 shows a t-SNE computed from a concatenation of four multi-metrics: the three from FIG. 17 and additionally $d_{l_1}(y, t_i)$ representing the L1-norm between the probe and the blueprint $d_{Hamming}(t_i, \hat{t})$. In both cases, one can observe errorless separability between the classes of originals and fakes. As in the previous case of FIG. 17, this is achieved although no information about the fakes has been used and the encoder-decoder was trained only on the original data, all authentication being performed only with respect to the blueprint.

Furthermore, the method according to the present invention can be also trained not only on the original paired data but also on the unpaired data. To exemplify this possibility, we will consider the reverse path whereas the direct path is applied symmetrically as demonstrated above. The methods representing the reverse path of the proposed method for the unpaired data are presented in FIGS. 15 and 16. The selection of the reverse path for the demonstration purposes has two objectives. First, the option of unpaired training as such with its straightforward application to the authentication problem will be demonstrated. Secondly, it will be demonstrated that one can use either paired or unpaired reverse systems to generate synthetic samples of original fingerprints and fakes from the blueprints only. Such a generation of synthetic samples for any new blueprint creates a lot of practical advantages that will be discussed below in details.

Figure 15:
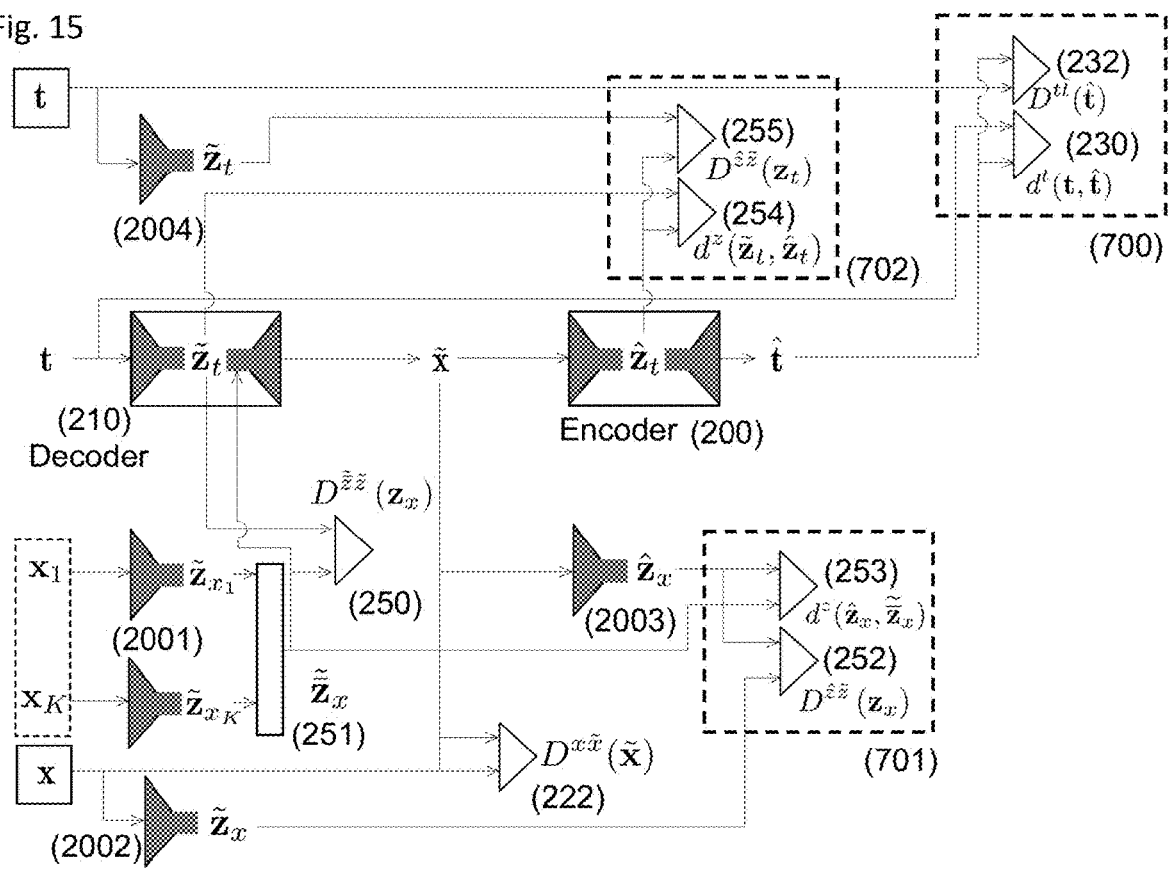
FIG. 15 schematically illustrates a reverse system training based on unpaired blueprint t and several fingerprints $x_1, \ldots, x_K$ defining a targeted fingerprint $\tilde{x}$ which should represent the input blueprint t on the output of the decoder (210).

FIG. 15 schematically illustrates a reverse system training based on unpaired blueprint t and several fingerprints $x_1, \ldots, x_K$ defining a targeted fingerprint $\tilde{x}$ which should represent the input blueprint t on the output of the decoder (210). These fingerprints, respectively images $x_1, \ldots, x_K$ define the expected appearance of the blueprint t in the targeted fingerprint $\tilde{x}$. The encoder (200) regenerates the blueprint $\hat{t}$ from the targeted fingerprint $\tilde{x}$ and the corresponding metrics are applied to ensure the similarity of generated $\tilde{x}$ to the wished class and also the correctness of decoding of the blueprint $\hat{t}$. The features determining the appearance of the blueprint are extracted by a set of encoders (2001) that consists of several downsampling convolutional layers and several ResNet layers [73]. The output of these encoders are fused in a common vector in block (251). The decoder (210) and encoder (200) have latent representations $\tilde{z}_t$ and $\hat{z}_t$. Both the encoder and decoder share a similar structure that can be implemented either in a form of U-net where $\tilde{z}_t$ and $\hat{z}_t$ represent the bottleneck layers or as internal encoder-decoder pairs. The internal encoders of (210) and (200) can be implemented as downsampling CNNs followed by several ResNet modules or FLOWs while the internal decoders of (210) and (200) can be implemented as ResNet modules or Flows followed by the upsampling CNN modules. The internal decoder of (210) also performs a function of fusion of both latent representations $\tilde{z}_t$ and $\tilde{z}_x$ that can be implemented either by the concatenation, product or centring and normalization by $\tilde{z}_t$ and then adding mean of $\tilde{z}_x$ and scaling by the standard deviation output of $\tilde{z}_x$. Thus, the role of the internal decoder of (210) is to fuse two presentations and to generate a new synthetic fingerprint $\tilde{x}$. To validate the correctness of generated instance $\tilde{x}$, the proposed system has several levels of control based on observable data and latent data. These levels of control should validate that the generated $\tilde{x}$ contains the information about particular t, resembles the statistics of general fingerprints and at the same time the features of particular group $x_i$ and resembles the statistics of of general x. To ensure that $\tilde{x}$ contains the correct information about a particular t that serves as the input to (210), the encoder (200) re-estimates $\hat{t}$ from $\tilde{x}$. The fidelity of this generation in the observation space is ensured by the similarity metric (230) with respect to the input t and also by block (232) with respect to the statistics of general t both combined in the module (700). At the same time the fidelity of t with respect to the latent space representation $\tilde{z}_t$ from $\hat{z}_t$ and it decoded from $\tilde{x}$ is ensured by the similarity metric (254) and with respect to the latent representation of generic t extracted in (2004) in the discriminator (255). The fidelity of generated synthetic $\tilde{x}$ with respect to the general class of x in the observation space is validated by the discriminator (222) while in the latent space the discriminator (252) ensures the similarity of latent representations $\hat{z}_t$ extracted in (2003) from $\tilde{x}$ and $\tilde{z}_x$ extracted from generic x in the encoder (2002). Finally, the fidelity to a targeted set of $x_i$ is ensured by the similarity metric (253) that requires that the integral vector $\tilde{z}_x$ is close to $\hat{z}_x$, i.e., a new generated instance $\tilde{x}$ contains the desired appearance and statistics extracted from a set $x_i$. It is important to point out that discriminator (250) ensures the maximization of differences in the latent representation $z_t$ and $\tilde{z}_x$, i.e. that the vectors should not contain the same features.

Figure 16:
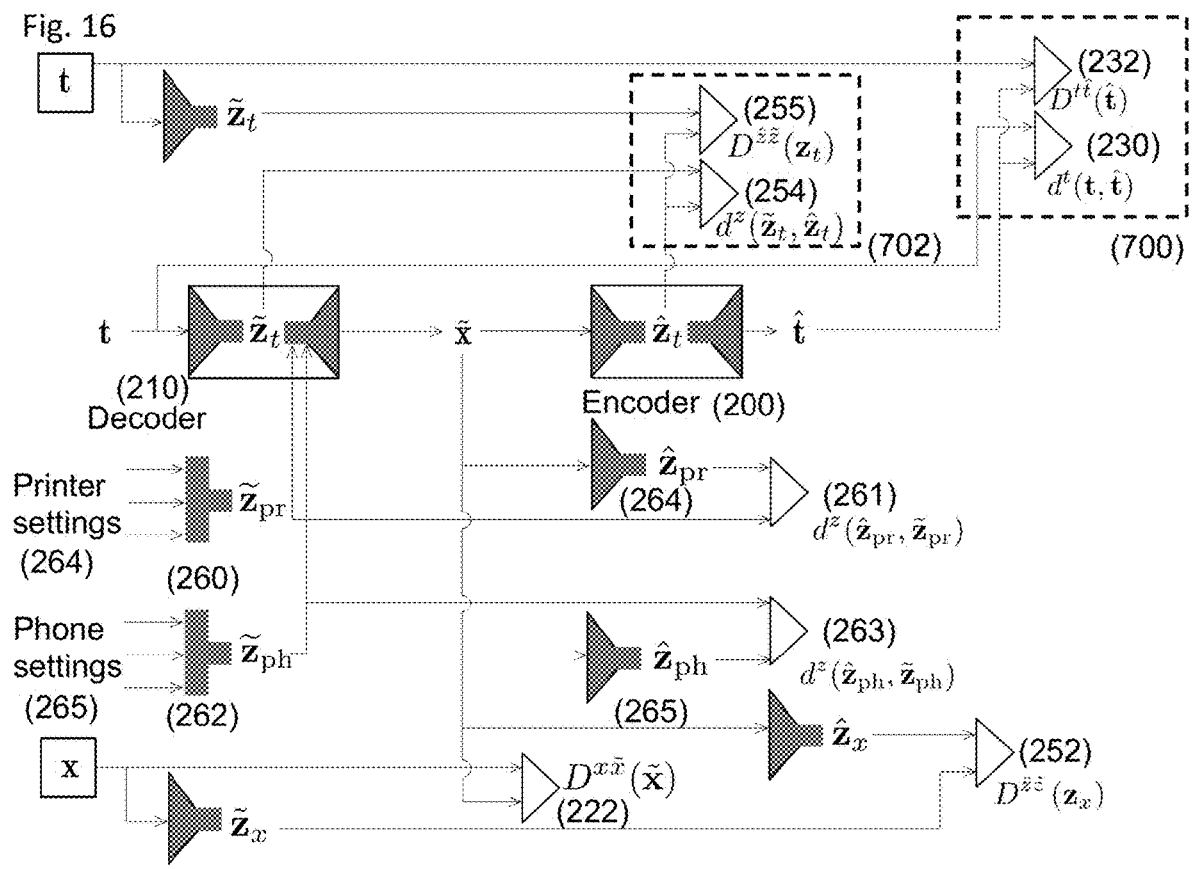
FIG. 16 schematically illustrates a reverse system training based on a blueprint t and a set of parameters determining the appearance of a targeted fingerprint $\tilde{x}$ according to printer settings (264) and phone settings (265).

FIG. 16 schematically illustrates a reverse system training based on the encoding of the blueprint t and a set of parameters determining the appearance of a targeted fingerprint $\tilde{x}$ according to printer settings (264) and phone settings (265). The scheme is similar to the one presented in FIG. 15. The main difference consists in that the feature vectors determining the appearance of targeted fingerprint k are defined in form of parameters whereas in the scheme according to FIG. 15 the feature vectors are defined in a form of fingerprints $x_1, \ldots, x_K$. In particular, in the scheme according to FIG. 16, the targeted fingerprint $\tilde{x}$ are encoded from (264) by block (260) consisting of a fully connected layers and optimally resent layers producing a feature vector $\tilde{z}_{pr}$ for the printing setting and from (265) encoded in (262) into $\tilde{z}_{ph}$ for the phone settings. Blocks (261) and (263) denotes the similarity metrics between the corresponding feature vectors ensuring the fidelity of data encoding, i.e. that a new generated vector $\tilde{x}$ contains the desired features of printer and phone settings. Blocks (222) and (252) are optional depending on the availability of the corresponding examples for the desired printer and phone settings. If such are no present, these blocks are excluded.

Generation of Synthetic Examples

A system according to the present invention can also be used for the generation of synthetic samples of both original fingerprints and fakes. The availability of synthetic samples might be of a great advantage to enhance the accuracy of authentication as it will be explained below. For example, the trained decoder (210) of systems presented in FIGS. 12, 14, 15 and 16 can be used for this purpose for the mapping t→$\tilde{x}$. The trained system can be trained either on the original fingerprints or also on a small amount of fakes. Typically about 100 examples would greatly suffice to train such a system. The system can be also trained on different original samples taken by different models of imaging devises and in various imaging conditions to simulate the variability and impact of these factors onto the intra-class variability. Furthermore, the variability of manufacturing can be easily simulated to investigate the factor of equipment aging, deviations between different types of equipment, or even within the same class of equipment or impact of other various factors including the human impact factor. Finally, the original fingerprints can be also simulated as fakes ones, even if the direct pairs are not available. Since this situation is quite rare in practice, we will focus on the case when the generation of synthetic examples is performed from the blueprints.

At the same time, the parameters determining the training of the system such as the above mentioned Lagrangian coefficients can be chosen depending on the wished proximity of the produced synthetic samples to the reference ones. To exemplify these possibilities, we will use the two-way system represented by the direct path:

$$\Lambda^x(E,D) = d_{l_1}(t,\tilde{t}) + \lambda d_{l_1}(x,\hat{x})$$

and by the reverse path:

$$\Lambda^t(E,D) = d_{l_1}(t,\hat{t}) + \lambda d_{l_1}(x,\tilde{x}).$$

The encoder and decoder of this system are implemented as U-NET architecture for the demonstration purposes. This is a very simple system with the fast convergence and we train it on the originals and four types of fakes presented in FIG. 5 with three parameters $\lambda=0.1, \lambda=1.0, \lambda=25.0$. No knowledge about printing and imaging equipment was used and the system was trained from 120 samples of each group using basic augmentations such as flipping, slight rotations and non-linear contrast modifications. The trained decoder (210) is used to produce new synthetic fingerprints for the blueprints unseen at the training stage.

Several examples of generated synthetic originals are shown in FIG. 19 and fake 1 and fake 3 in FIGS. 20 and 21, respectively. In particular, FIG. 19 presents an example of synthetic generation of fingerprints from given blueprints for various parameters controlling the proximity to the original data. The generated synthetic fingerprints are compared to original fingerprints enrolled from the physical objects and FIG. 19 shows that the synthetically generated fingerprints closely resemble the original ones. FIG. 20 illustrates the generation of fakes of type 1 from digital blueprints. The direct system was trained on the blueprints and fakes of type 1. The synthetic samples of fakes are compared to the original fingerprints and their real fakes. FIG. 21 shows the same results for fakes of type 3 that have different appearance as compared to fakes of type 1. It is demonstrated that the system can also very closely simulate fakes of this type, which can be applied to any new blueprint. The generation was performed for the test datasets and the used physical references were not used at the training stage and presented only for the validation purpose. The generated samples resembles very close visual similarity to the true physical data.

Usage of Generation of Synthetic Examples

The generated synthetic samples simulating both originals and fakes can be used in several ways for the enhanced authentication. To demonstrate these possibilities without sake of generality we will assume that only original fingerprints are available while collecting real fakes from physical objects represents a great challenge in view of the large variability of possible attacking strategies. At the same time, to acquire 100-200 images from the produced objects does not represent any significant time or cost engagement in view of the existing quality control stages at many manufacturing processes. Furthermore, we will only consider the paired setup in view of the above whereas the consideration of the unpaired system is also straightforward according to the above considerations.

Therefore, given the training dataset $\{t_i,x_i\}_{i=1}^N$, the above described synthetic sample generation system is trained only on the originals with three parameters $\lambda=1, \lambda=10, \lambda=25$. New unseen at the training stage samples are passed via the trained decoders to map $t \to \tilde{x}$. To visualize the effect of training, the latent space of a fully supervised classifier trained to classify the originals and four types of fakes was used. That is why the latent space of this classifier reflects the relative location of the manifolds of considered classes. The synthetic samples for three values of $\lambda=1, \lambda=10, \lambda=25$ are passes via this classifier and the latent space representing the pre-final layer before the soft-max output is visualized in a from of t-SNE diagram in FIGS. 22A to 22C which illustrate various augmentation strategies for the synthetic sample generation by the system according to the present invention. All of these figures reproduce the t-SNE visualization of original samples, four types of considered fake samples and several types of synthetic samples generated: (a) within the manifold of original samples to simulate the intra-class variability of fingerprints due to the manufacturing and acquisition, (b) between the original samples and four types of fake samples and (c) yet representing another st and-alone class of fake samples. The t-SNE is computed from the latent space vector of a supervised classifier trained on the original and four types of fake samples. Thus, three possible operational cases how the synthetic samples can be used to enhance the authentication performance are described hereafter.

The first operational case is shown in FIG. 22A. It corresponds to the situation when $\lambda=1$, i.e., the generated synthetic samples are close to the manifold of the originals. It should be pointed out that the fake samples have not been used at all for the training of this generator and were only used for the visualization purposes to highlight the geometry of classes in the considered latent space. Therefore, the generated synthetic fakes complement the class of original fingerprints and can be used to simulate the intra-class variability due to the various mentioned factors. Varying the parameter $\lambda$. one can generate a lot of examples even for the same blueprints. Once the set of physical and synthetically generated originals are ready, the described authentication system can be trained on this joint set. In this way the OC-classifier will be informed to include all these samples into a common decision region. The overall effect of training is two fold. The informed encoder-decoder pair will better handle the distinguishably between the augmented original class and future fakes and deduce the corresponding feature vector. The informed OC-classifier will operate on this vector and minimize the probability of miss.

The second operational case is shown in FIG. 22B. It is obtained for $\lambda=10$ and schematically demonstrates a case when the synthetically generated samples are located between the manifold of originals and all considered fakes. Varying the above parameter, one can situate the synthetic samples very close to the originals. In this case, one can assume that the generated samples represent the "worst case" fakes to the originals.

Finally, the third operational case shown in FIG. 22C corresponds to the case when λ=25. This selection demonstrates an extreme case, when the generated samples are far away from the originals and can be considered as a stand-alone group of fakes. Obviously, varying λ, one can populate the manifold with the controlled level of proximity of synthetic samples to the originals.

The two last cases represent several possibilities how the synthetic samples can be used for the authentication enhancement.

As the first option one can use the physical original fingerprints and generated "fakes" to train a supervised binary classifier. Assuming that the fakes are generated closely to the manifold of the originals and considered as the worst case fakes in the sense of proximity, the classifier decision boundary trained on these two classes will also reliably distinguish the other types of fakes that are on the large "distance" from this decision boundary. The experimental results validate that such a classifier can robustly reject all fakes even without knowing the origin of the physical fakes and without having seen them at training stage.

As the second option one can train the triple loss system shown in FIG. 2 on the triplets of original fingerprints representing two views $x_i$ and $x'_i$ acquired from the physical objects and synthetic fakes represented as $f_i = \tilde{x}_i$. Furthermore, to simultaneously include the intra-class variability for the originals the class representing second view $x'_i$ can be augmented as described in FIG. 22A. Additionally, the class of fakes can contain several fakes per item and the tripple loss network can trained as for example based on multi-class N-pair loss [87] or NT-Xent loss [88].

Figure 23:
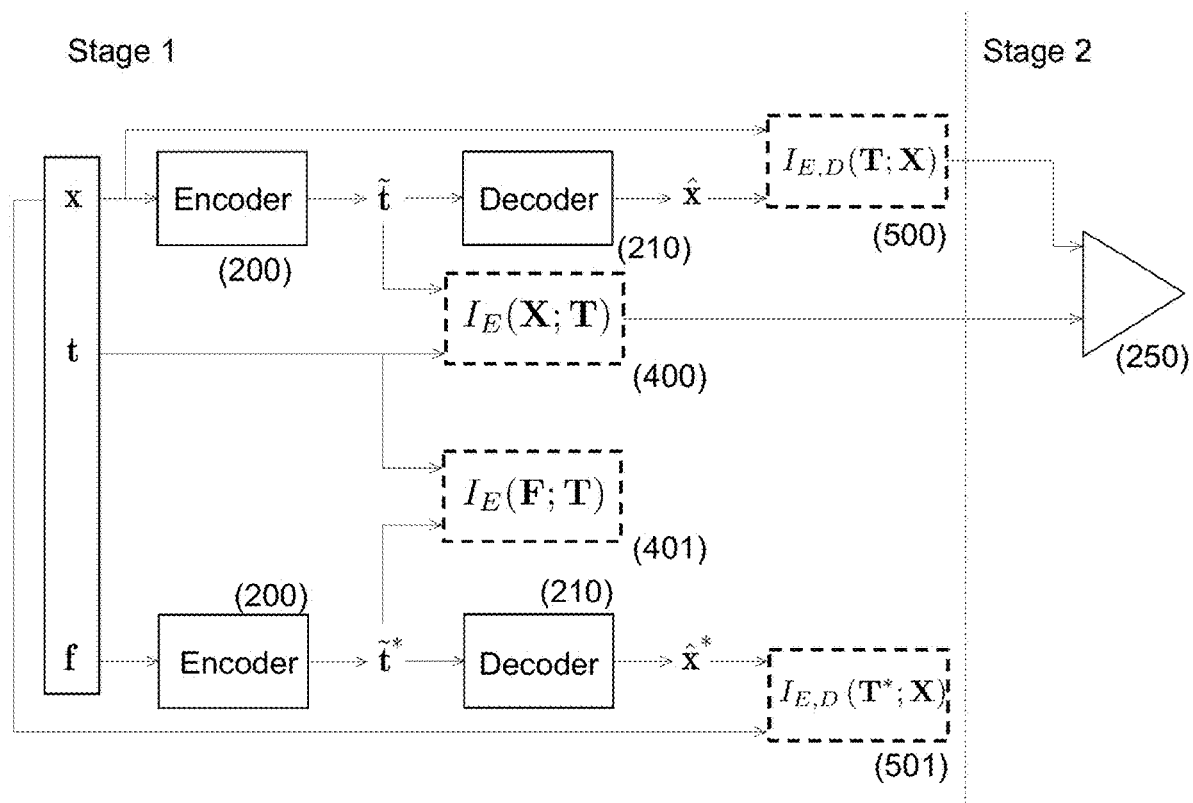
FIG. 23 schematically illustrates the training step of a system according to the present invention on original and fakes samples.

As another embodiment, one can use the synthetic examples and train the direct, reverse or two-way system in a contrastive way. An example of such a contrastive training of the direct system is schematically shown in FIG. 23 which schematically illustrates the training step of a system according to the present invention on original and fakes samples. The fakes samples can originate from physical acquisitions, if such are present, or from synthetically generated samples. At stage 1, the training of the authentication system based on contrastive learning with real or synthetically generated fakes is performed based on the maximization of terms $I_E(X; T)$(400) and $I_{E,D}(T; X)$(500) with the minimization of terms simultaneously minimizing the mutual information term $I_E(F; T)$(401) between the estimates of fingerprints produced from the fakes and the mutual information term $I_{E,D}(T^*; X)$(501) between generated images from fakes and original fingerprints. Finally, at stage 2, the OC-classifier (250) is trained on the outputs of blocks (500) and (400), which form a feature vector used for the authentication. Obviously, if the physical fakes are available, they can be included into the training as well without a need to change an architecture. At the stage 1, the encoder-decoder pair and corresponding discriminators are trained based on contrastive learning with real or physically augmented fakes. The training process assumes the presence of paired training examples of blueprints t, fingerprints x and fakes f. The unpaired situation is also included in this generalized setup. The training process is based on the maximization of mutual information terms $I_E(X; T)$(400) and $I_{E,D}(T; X)$(500) according to the decomposition considered in part of the direct system while simultaneously minimizing the information $I_E(X; T)$ between the estimates of fingerprints produced from the fakes and $I_{E,D}(T^*; X)$ between generated images from fakes and original fingerprints. All mutual information term are decomposed as above on the corresponding conditional entropies and KLD terms.

It is important to point out that the maximization and minimization of the above mutual information terms is performed on the shared encoder (200) and decoder (210). Therefore, both the encoder and decoders are trained to provide the maximum close reconstruction to the original class, if the input resembles to be an original and otherwise to the class of fakes. Finally, at the stage 2, the outputs of blocks (500) and (400) form a feature vector that is used for the training of the OC-classifier (250).

Security and Fingerprint-Based Authentication

In addition, it should be noted that the considered pairs $(t_i, x_i)$ can come from either a physical distribution $p(t, x)$ or from the pair-wise assignments when each physical fingerprint $x_i$ is assigned to some blueprint $t_i$. In this case, the assigned blueprint $t_i$ might be generated from some distribution and can represent some sort of a random key. This additionally creates a sort of security and protection against the ML attacks when the attacker might have an access only to the fingerprints $x_i$ acquired from the authentic objects while the blueprints can be kept in secret. The attacker can generally proceed with the uncoupled training, if the distribution from which the blueprints are generated is known as opposed to the defender who trains the authentication system in the supervised way based on the available pairs $(t_i, x_i)$. The supervised training will produce higher accuracy and lead to the information advantage of the defender over the attacker.

In another embodiment of the method according to the present invention, one can consider a triple of blueprint, secrete key and fingerprint as a combination of the above disclosed methods.

In another embodiment of the method according to the present invention, the authentication system might have an access to the fingerprints only. Such a situation is typical for example in biometrics or natural randomness based PUFs applications.

In still another embodiment of the method according to the present invention, the authentication system might have an access to the blueprint only. In any of these embodiments disclosed above, the blueprint may additionally be secured and kept secret by any kind of securing means adapted for this purpose, given that manufacturers usually don't wish to disclose in detail templates used for production of their products. For example, at the stage of generating, providing or acquiring the blueprint $t_i$, the latter may be modulated by use of a secret key k, by use of a secret mapping, by use of a space of secret carriers of a transform domain or the like, such as to produce a modulated blueprint $t^s_i$ which isn't easily accessible to any potential attacker and addresses security issues on the side of the manufacturers of the objects to be authenticated.

Encoder and Decoder Architectures

The encoder and decoder in the considered authentication problem can be implemented based on the same architectures. The encoder receives as an input the fingerprint and outputs the blueprint and the decoder receives as an input the blueprint and outputs the fingerprint. Therefore, to proceed with a general consideration we will assume that the input to the encoder/decoder is a and the output is b.

The encoder/decoder structure can be deterministic, i.e. perform one-to-one mapping of a to b, or stochastic when for one input a the encoder/decoder might generate multiple $b_s$. In the deterministic case, the encoder/decoder can be implemented based on for example U-NET architecture [74], several CNN downsampling layers followed by several ResNet layers acting as a transformer of distribution and several CNN upsampling layers [98], where the ResNet transformation layers can be also replaced by other transformation models such as normalizing FLOW [102], neural network FLOWS [103] or similar architectures. All these structured can be summarized as the architectures consisting of conv-layers, transformation layers and decov-layers with the particularities how to implement each of them for a a particular problem of interest. The training of the encoder/decoder is also based on an element of stochasticity introduced by the permutations of input data based on sample-wise non-linear transformations, addition of noise, etc., filtering as well as geometrical transformations.

The stochastic encoder/decoder structure is additionally complemented by a source of randomness that can be injected at the input, in the latent space or at the decoder by concatenation, addition, multiplication, etc. operations.

The discriminators can be considered on the global level considered in the blueprint-fingerprint as whole or on the local level applied to parts of blueprint-fingerprint with the corresponding fusion of local discriminators' outputs.

The proposed method can be used in a number of applications. Without pretending to be exhaustive in the following overview, just a few of them will be named by assuming that similar setups are easily recognized by a person skilled in the art.

The authentication of watches is an example of use of the method for authentication of physical objects described above and, in particular, typically represents an application of the method to authentication of batch objects, but may also represent an application of the method to authentication of individually created objects, like may be the case for certain types of luxury watches produced only in very limited numbers or even only as a single piece, even though production is of course based on a blueprint. In general, the authentication of watches and of any other type of (high value or luxury) products is based on the measurement of the proximity of the manufactured watch/product to the blueprint, where the blueprint is considered as a common design for the batch of watches/products of a given model, preferably in combination with individual features of each watch/product which are present in the fingerprint and which correspond to the physical unclonebale features of an individual watch/product within said batch of watches/products. These features might be of both natural and/or artificial origin, such as mentioned in the introduction of the present patent application in the context of describing four basic groups of prior art approaches. Authentication of watches may be performed from the front and/or back sides of the watch and/or of its components, for example such as seen through the watch glass or through a skeleton back side of a watch, where the blueprint represents the artwork design given in any suitable encoding form and the fingerprint represents signals acquired from a physical object. The method can be applied to watches and/or its components indifferently from which materials these are produced. Preferably, the authentication concerns the elements of the watch design where both the blueprint-fingerprint pairs are available in any form suitable for easy and robust verification. The authentication can also link the joint authentication of elements of the watch and of the watch packaging or the watch and a corresponding watch certificate. If so required, some extra synchronisation based on the watch design might be added. Imaging of the watch may be realized by a mobile phone equipped with a camera, a portable microscope, or any other device adapted for this purpose. Furthermore, the imaging modalities of the acquisition device may be adapted to provide for acquisition of probe signals through the watch glass without the necessity to disassemble the watch for performing the authentication.

The authentication of packaging in any applications requiring the security features against counterfeiting and brand protection when the blueprint represents the design of artwork encoded in any graphical format and the fingerprint represents signals acquired from the printed packaging. The packaging can be considered but not limited to a primary packaging such a syringe, a capsule, a bottle, etc., and a secondary packaging such as a box, a special shipment box or a container.

The authentication of banknotes in any form of printing including the embedded security features.

The authentication of elements of designs represented by various encoded modalities such as 1D and 2D codes, elements of design including the halftone patterns represented in any form of reproduction in black and white and color representation, security elements representing various special patterns difficult to clone or reproduce ranging from simple random patterns to complex guilloche ones, or special security taggants.

The authentication of printed text, logos and stamps reproduced on any documents such as contracts, certificates, forms, etc. . . .

The authentication of holograms in any form of reproduction.

The authentication of payment cards in any part of graphical and embedded elements of text, design, chips, etc. . . .

The authentication of identity documents includes but not limited to identification documents such as $I_D$ cards, passports, visas, etc. when the blueprint can be represented by human biometrics stored in printed form or on storage device and the fingerprint representing signals acquired from person.

At the same time, the above examples do not exclude that the proposed methods are applicable to many kinds of products, which are (but are not limited to) the following: anti-counterfeiting labels or packaging, boxes, shipping invoices, tax stamps, postage stamps and various printed documents associated with the product for authentication and certification of its origin; medical prescriptions; medicines and pharmaceutical products including but not limited to cough drops, prescription drugs, antibiotics, vaccines, etc.; adulterated food, beverages, alcohol as well as coffee and chocolate; baby food and children toys; clothing, footwear and sportswear; health, skin care products, personal care and beauty aids items including perfume, cosmetics, shampoo, toothpaste, etc.; household cleaning goods; luxury goods including watches, clothing, footwear, jewellery, glasses, cigarettes and tobacco, products from leather including handbags, gloves, etc. and various objects of art; car, helicopter and airplane parts and electronic chipsets for computers, phones and consumer electronics; prepaid cards for communications or other services using similar protocol of credit recharging; computer software, video and audio tapes, CDs, DVDs and other means of multimedia data storage with music, movies and video games.

The proposed authentication should also provide a secure link to the blockchain records.

The invention should be considered as comprising all possible combinations of every feature described in the instant specification, appended claims, and/or drawing figures, which may be considered new, inventive and industrially applicable. In particular, other characteristics and embodiments of the invention are described in the appended claims.

The following list enumerates all references which are cited in the above description:

[1] Sviatoslav Voloshynovskiy, Oleksiy Koval, and Thierry Pun, "Secure item identification and authentication system based on unclonable features," Patent, 22 Apr. 2014, U.S. Pat. No. 8,705,873.

[2] Frederic Jordan, Martin Kutter, and Cline Di Venuto, "Means for using microstructure of materials surface as a unique identifier," Patent, 15 Mar. 2007, WO2007/028799.

[3] Kariakin Youry, "Authentication of articles," Patent, 10 Jul. 1997, WO1997/024699.

[4] Russell Paul Cowburn, "Methods and apparatuses for creating authenticatable printed articles and subsequently verifying them," Patent, 22 Sep. 2005, WO2005/088517.

[5] Chau-Wai Wong and Min Wu, "Counterfeit detection based on unclonable feature of paper using mobile camera," IEEE Transactions on Information Forensics and Security, vol. 12, no. 8, pp. 1885-1899, 2017.

[6] Rudolf Schraml, Luca Debiasi, and Andreas Uhl, "Real or fake: Mobile device drug packaging authentication," in Proceedings of the 6th ACM Workshop on Information Hiding and Multimedia Security, New York, N.Y., USA, 2018, IHMMSec18, pp. 121-126, Association for Computing Machinery.

[7] Paul Lapstun and Kia Silverbrook, "Object comprising coded data and randomly dispersed ink taggant," Patent, 5 Mar. 2013, U.S. Pat. No. 8,387,889.

[8] Riikka Arppe and Thomas Just Srensen, "Physical unclonable functions generated through chemical methods for anti-counterfeiting," Nature Reviews Chemistry, vol. 1, no. 4, 2017.

[9] Miguel R. Carro-Temboury, Riikka Arppe, Tom Vosch, and Thomas Just Sorensen, "An optical authentication system based on imaging of excitation-selected lanthanide luminescence," Science Advances, vol. 4, no. 1, 2018.

[10] Ali Valehi, Abolfazl Razi, Bertrand Cambou, Weijie Yu, and Michael Kozicki, "A graph matching algorithm for user authentication in data networks using image-based physical unclonable functions," in 2017 Computing Conference, 2017, pp. 863-870.

[11] Sviatoslav Voloshynovskiy, Maurits Diephuis, and Taras Holotyak, "Mobile visual object identifcation: from SIFT-BoF-RANSAC to SketchPrint," in Proceedings of SPIE Photonics West, Electronic Imaging, Media Forensics and Security V, San Francisco, USA, Jan. 13, 2015.

[12] Maurits Diephuis, Micro-structure based physical object identification on mobile platforms, Ph.D. thesis, University of Geneva, 2017.

[13] F. Beekhof, S. Voloshynovskiy, and F. Farhadzadeh, "Content authentication and identification under informed attacks," in Proceedings of IEEE International Workshop on Information Forensics and Security, Tenerife, Spain, Dec. 2-5 2012.

[14] Maurits Diephuis, "A framework for robust forensic image identification," M.S. thesis, University of Twente, 2010.

[15] Maurits Diephuis, Svyatoslav Voloshynovskiy, Taras Holotyak, Nabil Stendardo, and Bruno Keel, "A framework for fast and secure packaging identification on mobile phones," in Media Watermarking, Security, and Forensics 2014, Adnan M. Alattar, Nasir D. Memon, and Chad D. Heitzenrater, Eds. International Society for Optics and Photonics, 2014, vol. 9028, pp. 296-305, SPIE.

[16] Justin Picard, "Digital authentication with copy-detection patterns," in Optical Security and Counterfeit Deterrence Techniques V, Rudolf L. van Renesse, Ed. International Society for Optics and Photonics, 2004, vol. 5310, pp. 176-183, SPIE.

[17] Justin Picard and Paul Landry, "Two dimensional barcode and method of authentication of such barcode," Patent, 14 Mar. 2017, U.S. Pat. No. 9,594,993.

[18] Iuliia Tkachenko and Christophe Destruel, "Exploitation of redundancy for pattern estimation of copy-sensitive two level QR code," in 2018 IEEE International Workshop on Information Forensics and Security (WIFS), 2018, pp. 1-6.

[19] Ken ichi Sakina, Youichi Azuma, and Kishi Hideaki, "Two-dimensional code authenticating device, two-dimensional code generating device, two-dimensional code authenticating method, and program," Patent, 6 Sep. 2016, U.S. Pat. No. 9,436,852.

[20] Zbigniew Sagan, Justin Picard, Alain Foucou, and Jean-Pierre Massicot, "Method and device superimposing two marks for securing documents against forgery with," Patent, 27 May 2014, U.S. Pat. No. 8,736,910.

[21] Svyatoslav Voloshynovskiy and Maurits Diephuis, "Method for object recognition and/or verification on portable devices," Patent, 7 Oct. 2018, U.S. Pat. No. 10,019,646.

[22] Thomas Dewaele, Maurits Diephuis, Taras Holotyak, and Sviatoslav Voloshynovskiy, "Forensic authentication of banknotes on mobile phones," in Proceedings of SPIE Photonics West, Electronic Imaging, Media Forensics and Security V, San Francisco, USA, Jan. 14-18, 2016.

[23] Volker Lohweg, Jan Leif Homann, Helene Drksen, Roland Hildebrand, Eugen Gillich, Jrg Hofmann, and Johannes Georg Schaede, "Authentication of security documents and mobile device to carry out the authentication," Patent, 17 Apr. 2018, U.S. Pat. No. 9,947,163.

[24] Sergej Toedtli, Sascha Toedtli, and Yohan Thibault, "Method and apparatus for proving an authentication of an original item and method and apparatus for determining an authentication status of a suspect item," Patent, 24 Jan. 2017, U.S. Pat. No. 9,552,543.

[25] Guy Adams, Stephen Pollard, and Steven Simske, "A study of the interaction of paper substrates on printed forensic imaging," in Proceedings of the 11th ACM Symposium on Document Engineering, New York, N.Y., USA, 2011, DocEng '11, p. 263266, Association for Computing Machinery.

[26] Stephen B. Pollard, Steven J. Simske, and Guy B. Adams, "Model based print signature profile extraction for forensic analysis of individual text glyphs," in 2010 IEEE International Workshop on Information Forensics and Security, 2010, pp. 1-6.

[27] Yanling Ju, Dhruv Saxena, Tamar Kashti, Dror Kella, Doron Shaked, Mani Fischer, Robert Ulichney, and Jan P. Allebach, "Modeling large-area influence in digital halftoning for electrophotographic printers," in Color Imaging XVII. Displaying, Processing, Hardcopy, and Applications, Reiner Eschbach, Gabriel G. Marcu, and Alessandro Rizzi, Eds. International Society for Optics and Photonics, 2012, vol. 8292, pp. 259-267, SPIE.

[28] Renato Villan, Sviatoslav Voloshynovskiy, Oleksiy Koval, and Thierry Pun, "Multilevel 2-d bar codes: Toward high-capacity storage modules for multimedia security and management," IEEE Transactions on Information Forensics and Security, vol. 1, no. 4, pp. 405-420, 2006.

[29] Thomas M Cover and Joy A Thomas, Elements of information theory, John Wiley & Sons, 2012.

[30] Olga Taran, Slavi Bonev, and Slava Voloshynovskiy, "Clonability of anti-counterfeiting printable graphical codes: a machine learning approach," in IEEE International Conference on Acoustics, Speech and Signal Processing (ICASSP), Brighton, United Kingdom, May 2019.

[31] Rohit Yadav, Iuliia Tkachenko, Alain Trémeau, and Thierry Fournel, "Estimation of copy-sensitive codes using a neural approach," in 7th ACM Workshop on Information Hiding and Multimedia Security, Paris, France, July 2019.

[32] Burt Perry, Scott Carr, and Phil Patterson, "Digital watermarks as a security feature for identity documents," in Optical Security and Counterfeit Deterrence Techniques III, Rudolf L. van Renesse and Willem A. Vliegenthart, Eds. International Society for Optics and Photonics, 2000, vol. 3973, pp. 80-87, SPIE.

[33] Frederic Deguillaume, Sviatoslav Voloshynovskiy, and Thierry Pun, "Character and vector graphics watermark for structured electronic documents security," Patent, 5 Jan. 2010, U.S. Pat. No. 7,644,281.

[34] Pillai Praveen Thulasidharan and Madhu S. Nair, "QR code based blind digital image watermarking with attack detection code," AEU-International Journal of Electronics and Communications, vol. 69, no. 7, pp. 1074-1084, 2015.

[35] Guangmin Sun, Rui Wang, Shu Wang, Xiaomeng Wang, Dequn Zhao, and Andi Zhang, "High-definition digital color image watermark algorithm based on QR code and DWT," in 2015 IEEE 10th Conference on Industrial Electronics and Applications (ICIEA), 2015, pp. 220-223.

[36] Yang-Wai Chow, Willy Susilo, Joseph Tonien, and Wei Zong, "A QR code watermarking approach based on the DWT-DCT technique," in Information Security and Privacy, Josef Pieprzyk and Suriadi Suriadi, Eds. 2017, pp. 314-331, Springer International Publishing.

[37] Xiaofei Feng and Xingzhong Ji, "A blind watermarking method with strong robust based on 2d-barcode," in 2009 International Conference on Information Technology and Computer Science, 2009, vol. 2, pp. 452-456.

[38] Weijun Zhang and Xuetian Meng, "An improved digital watermarking technology based on QR code," in 2015 4th International Conference on Computer Science and Network Technology (ICCSNT), 2015, vol. 01, pp. 1004-1007.

[39] Sartid Vongpradhip and Suppat Rungraungsilp, "QR code using invisible watermarking in frequency domain," in 2011 Ninth International Conference on ICT and Knowledge Engineering, 2012, pp. 47-52.

[40] Li Li, Ruiling Wang, and Chinchen Chang, "A digital watermark algorithm for QR code," International Journal of Intelligent Information Processing, vol. 2, no. 2, pp. 29-36, 2011.

[41] Jantana Panyavaraporn, Paramate Horkaew, and Wannaree Wongtrairat, "QR code watermarking algorithm based on wavelet transform," in 2013 13th International Symposium on Communications and Information Technologies (ISCIT), 2013, pp. 791-796.

[42] Ming Sun, Jibo Si, and Shuhuai Zhang, "Research on embedding and extracting methods for digital watermarks applied to QR code images," New Zealand Journal of Agricultural Research, vol. 50, no. 5, pp. 861-867, 2007.

[43] Rongsheng Xie, Chaoqun Hong, Shunzhi Zhu, and Dapeng Tao, "Anti-counterfeiting digital watermarking algorithm for printed QR barcode," Neurocomputing, vol. 167, pp. 625-635, 2015.

[44] Pei-Yu Lin, Yi-Hui Chen, Eric Jui-Lin Lu, and Ping-Jung Chen, "Secret hiding mechanism using QR barcode," in 2013 International Conference on Signal-Image Technology Internet-Based Systems, 2013, pp. 22-25.

[45] Ari Moesriami Barmawi and Fazmah Arif Yulianto, "Watermarking QR code," in 2015 2nd International Conference on Information Science and Security (ICISS), 2015, pp. 1-4.

[46] Thach V. Bui, Nguyen K. Vu, Thong T.P. Nguyen, Isao Echizen, and Thuc D. Nguyen, "Robust message hiding for QR code," in 2014 Tenth International Conference on Intelligent Information Hiding and Multimedia Signal Processing, 2014, pp. 520-523.

[47] Iuliia Tkachenko, William Puech, Christophe Destruel, Olivier Strauss, Jean-Marc Gaudin, and Christian Guichard, "Two-level QR code for private message sharing and document authentication," IEEE Transactions on Information Forensics and Security, vol. 11, no. 3, pp. 571-583, 2016.

[48] Iu. Tkachenko, W. Puech, O. Strauss, C. Destruel, and J.-M. Gaudin, "Printed document authentication using two level or code," in 2016 IEEE International Conference on Acoustics, Speech and Signal Processing (ICASSP), 2016, pp. 2149-2153.

[49] Yugiao Cheng, Zhengxin Fu, Bin Yu, and Gang Shen, "A new two-level QR code with visual cryptography scheme," Multimedia Tools and Applications, vol. 77, no. 16, pp. 2062920649, 2018.

[50] H. Phuong Nguyen, Agns Delahaies, Florent Retraint, D. Huy Nguyen, Marc Pic, and Frederic Morain-Nicolier, "A watermarking technique to secure printed QR codes using a statistical test," in 2017 IEEE Global Conference on Signal and Information Processing (GlobalSIP), 2017, pp. 288-292.

[51] Hoai Phuong Nguyen, Florent Retraint, Frdric Morain-Nicolier, and Angs Delahaies, "A watermarking technique to secure printed matrix barcode application for anti-counterfeit packaging," IEEE Access, vol. 7, pp. 131839-131850, 2019.

[52] Tailing Yuan, Yili Wang, Kun Xu, Ralph R. Martin, and Shi-Min Hu, "Two-layer QR codes," IEEE Transactions on Image Processing, vol. 28, no. 9, pp. 4413-4428, 2019.

[53] Martin Kutter, Sviatoslav V. Voloshynovskiy, and Alexander Herrigel, "Watermark copy attack," in Security and Watermarking of Multimedia Contents II, Ping Wah Wong and Edward J. Delp III, Eds. International Society for Optics and Photonics, 2000, vol. 3971, pp. 371-380, SPIE.

[54] Frederic Jordan, Martin Kutter, and Nicolas Rudaz, "Method to apply an invisible mark on a media," Patent, 21 Jun. 2011, U.S. Pat. No. 7,965,862.

[55] Alastair Reed, Tom'aA.°, Filler, Kristyn Falkenstern, and Yang Bai, "Watermarking spot colors in packaging," in Media Watermarking, Security, and Forensics 2015, March 2015, vol. 9409 of Society of Photo-Optical Instrumentation Engineers (SPIE) Conference Series, pp. 940-906.

[56] Svyatoslav Voloshynovskiy, "Method for active content fingerprinting," Patent, 17 Oct. 2017, U.S. Pat. No. 9,794,067.

[57] Sandy Huang, Nicolas Papernot, Ian Goodfellow, Yan Duan, and Pieter Abbeel, "Adversarial attacks on neural network policies," 2017.

[58] Nicholas Carlini and David Wagner, "Towards evaluating the robustness of neural networks," in 2017 IEEE Symposium on Security and Privacy (SP), 2017, pp. 39-57.

[59] Anh Thu Phan Ho, Bao An Hoang Mai, Wadih Sawaya, and Patrick Bas, "Document Authentication Using Graphical Codes: Impacts of the Channel Model," in ACM Workshop on Information Hiding and Multimedia Security, Montpellier, France, June 2013, pp. ACM 978-1-4503-2081-8/13/06.

[60] Christopher M. Bishop, Pattern Recognition and Machine Learning (Information Science and Statistics), Springer-Verlag, Berlin, Heidelberg, 2006.

[61] Kevin P. Murphy, Machine learning: a probabilistic perspective, MIT Press, Cambridge, Mass. [u.a.], 2013.

[62] Ian J. Goodfellow, Yoshua Bengio, and Aaron Courville, Deep Learning, MIT Press, Cambridge, MA, USA, 2016, url http://www.deeplearningbook.org.

[63] Olga Taran, Slavi Bonev, Taras Holotyak, and Slava Voloshynovskiy, "Adversarial detection of counterfeited printable graphical codes: Towards "adversarial games" in physical world," in ICASSP 2020-2020 IEEE International Conference on Acoustics, Speech and Signal Processing (ICASSP), 2020, pp. 2812-2816.

[64] Ashlesh Sharma, Lakshminarayanan Subramanian, and Yiduth Srinivasan, "Authenticating physical objects using machine learning from microscopic variations," Patent application, 2 Feb. 2017, U.S. patent application Ser. No. 15/302,866.

[65] Alexey Kurakin, Ian J. Goodfellow, and Samy Bengio, "Adversarial examples in the physical world," CoRR, vol. abs/1607.02533, 2016.

[66] Neil. A. Macmillan and C. Douglas. Creelman, Detection Theory: A user's guide, Lawrence Erlbaum Associates, Mahwah, New Jersey, London, 2005.

[67] H. Vincent Poor, An Introduction to Signal Detection and Estimation, Springer-Verlag, Berlin, Heidelberg, 2013.

[68] Diederik P. Kingma and Max Welling, "Auto-encoding variational bayes," in 2nd International Conference on Learning Representations, ICLR 2014, Ban, AB, Canada, Apr. 14-16, 2014, Conference Track Proceedings, 2014.

[69] Alireza Makhzani, Jonathon Shlens, Navdeep Jaitly, and Ian J. Goodfellow, "Adversarial autoencoders," CoRR, vol. abs/1511.05644, 2015.

[70] Lukas Ruff, Robert Vandermeulen, Nico Goernitz, Lucas Deecke, Shoaib Ahmed Siddiqui, Alexander Binder, Emmanuel Muller, and Marius Kloft, "Deep one-class classification," in Proceedings of the 35th International Conference on Machine Learning, Jennifer Dy and Andreas Krause, Eds. 10-15 Jul. 2018, vol. 80 of Proceedings of Machine Learning Research, pp. 4393-4402, PMLR.

[71] Mohammad Sabokrou, Mohammad Khalooei, Mahmood Fathy, and Ehsan Adeli, "Adversarially learned one-class classifier for novelty detection," in CVPR. 2018, pp. 3379-3388, IEEE Computer Society.

[72] Mohammadreza Salehi, Ainaz Eftekhar, Niousha Sadjadi, Mohammad Hossein Rohban, and Hamid R. Rabiee, "Puzzle-AE: Novelty detection in images through solving puzzles," CoRR, vol. abs/2008.12959, 2020.

[73] Kaiming He, Xiangyu Zhang, Shaoqing Ren, and Jian Sun, "Deep residual learning for image recognition," in 2016 IEEE Conference on Computer Vision and Pattern Recognition (CVPR), 2016, pp. 770-778.

[74] Olaf Ronneberger, Philipp Fischer, and Thomas Brox, "U-net: Convolutional networks for biomedical image segmentation," Medical Image Computing and Computer-Assisted Intervention MICCAI 2015, May 2015.

[75] Paul Bergmann, Kilian Batzner, Michael Fauser, David Sattlegger, and Carsten Steger, "The mvtec anomaly detection dataset: A comprehensive real-world dataset for unsupervised anomaly detection," International Journal of Computer Vision, vol. 129, no. 4, pp. 1038-1059, 2021.

[76] Nobuyuki Otsu, "A threshold selection method from gray-level histograms," IEEE Transactions on Systems, Man, and Cybernetics, vol. 9, no. 1, pp. 62-66, 1979.

[77] Yunqiang Chen, Xiang Sean Zhou, and T.S. Huang, "One-class SVM for learning in image retrieval," in Proceedings 2001 International Conference on Image Processing (Cat. No.01CH37205), 2001, vol. 1, pp. 34-37 vol. 1.

[78] Mohamed Ishmael Belghazi, Aristide Baratin, Sai Rajeshwar, Sherjil Ozair, Yoshua Bengio, Aaron Courville, and Devon Hjelm, "Mutual information neural estimation," in Proceedings of the 35th International Conference on Machine Learning, Jennifer Dy and Andreas Krause, Eds. 10-15 Jul. 2018, vol. 80 of Proceedings of Machine Learning Research, pp. 531-540, PMLR.

[79] Slava Voloshynovskiy, Mouad Kondah, Shideh Rezaeifar, Olga Taran, Taras Hotolyak, and Danilo Jimenez Rezende, "Information bottleneck through variational glasses," in NeurIPS Workshop on Bayesian Deep Learning, Vancouver, Canada, December 2019.

[80] Ian J. Goodfellow, Jean Pouget-Abadie, Mehdi Mirza, Bing Xu, David Warde-Farley, Sherjil Ozair, Aaron Courville, and Yoshua Bengio, "Generative adversarial nets," in Proceedings of the 27th International Conference on Neural Information Processing Systems —Volume 2, Cambridge, MA, USA, 2014, NIPS' 14, p. 26722680, MIT Press.

[81] Masashi Sugiyama, Taiji Suzuki, and Takafumi Kanamori, Density Ratio Estimation in Machine Learning, Cambridge University Press, USA, 1st edition, 2012.

[82] Sebastian Nowozin, Botond Cseke, and Ryota Tomioka, "f-gan: Training generative neural samplers using variational divergence minimization," 2016.

[83] Masashi Sugiyama, Taiji Suzuki, and Takafumi Kanamori, "Density-ratio matching under the Bregman divergence: a unifed framework of density-ratio estimation," Annals of the Institute of Statistical Mathematics, vol. 64, no. 5, pp. 1009-1044, October 2012.

[84] Martin Arjovsky, Soumith Chintala, and Lon Bottou, "Wasserstein Generative Adversarial Networks," 2017, cite arxiv:1701.07875.

[85] Kacper Chwialkowski, Aaditya Ramdas, Dino Sejdinovic, and Arthur Gretton, "Fast two-sample testing with analytic representations of probability measures," in Proceedings of the 28th International Conference on Neural Information Processing Systems—Volume 2, Cambridge, MA, USA, 2015, NIPS'15, p. 19811989, MIT Press.

[86] Kilian Q Weinberger, John Blitzer, and Lawrence Saul, "Distance metric learning for large margin nearest neighbor classification," in Advances in Neural Information Processing Systems, Y Weiss, B. Scholkopf, and J. Platt, Eds. 2006, vol. 18, MIT Press.

[87] Kihyuk Sohn, "Improved deep metric learning with multi-class N-pair loss objective," in Advances in Neural Information Processing Systems, D. Lee, M. Sugiyama, U. Luxburg, I. Guyon, and R. Garnett, Eds. 2016, vol. 29, Curran Associates, Inc.

[88] Ting Chen, Simon Kornblith, Mohammad Norouzi, and Geoffrey Hinton, "A simple framework for contrastive learning of visual representations," in Proceedings of the 37th International Conference on Machine Learning, Hal Daum III and Aarti Singh, Eds. 13-18 Jul. 2020, vol. 119 of Proceedings of Machine Learning Research, pp. 1597-1607, PMLR.

[89] Prannay Khosla, Piotr Teterwak, Chen Wang, Aaron Sarna, Yonglong Tian, Phillip Isola, Aaron Maschinot, Ce Liu, and Dilip Krishnan, "Supervised contrastive learning," in Advances in Neural Information Processing Systems, H. Larochelle, M. Ranzato, R. Hadsell, M. F. Balcan, and H. Lin, Eds. 2020, vol. 33, pp. 18661-18673, Curran Associates, Inc.

[90] Alessandro Foi, Mejdi Trimeche, Vladimir Katkovnik, and Karen Egiazarian, "Practical poissonian-gaussian noise modeling and fitting for single-image raw-data," IEEE Transactions on Image Processing, vol. 17, no. 10, pp. 1737-1754, 2008.

[91] Arthur Gretton, Karsten M. Borgwardt, Malte J. Rasch, Bernhard Scholkopf, and Alexander Smola, "A kernel two-sample test," J. Mach. Learn. Res., vol. 13, no. null, pp. 723773, March 2012.

[92] George Papamakarios, Eric T. Nalisnick, Danilo Jimenez Rezende, Shakir Mohamed, and Balaji Lakshminarayanan, "Normalizing flows for probabilistic modeling and inference," CoRR, vol. abs/1912.02762, 2019.

[93] Conor Durkan, Artur Bekasov, Iain Murray, and George Papamakarios, "Neural spline flows," in Advances in Neural Information Processing Systems. 2019, vol. 32, Curran Associates, Inc.

The invention claimed is:

1. A method for authentication of physical objects, in particular of physical batch objects, adapted to be produced based on a set of blueprints $\{t_i\}^N_{i=1}$ comprising, at a training stage, the steps of:
   acquiring a set of training signals representing fingerprints $\{x_i\}^N_{i=1}$ of said physical objects;
   providing a mapper adapted to perform an operation on said fingerprints $\{x_i\}^N_{i=1}$ and a classifier adapted to be applied to at least one similarity score;
   training said mapper and/or said classifier on said set of training signals $\{x_i\}^N_{i=1}$ to obtain a learned mapper and/or a learned classifier;
   enrolling objects to be protected; and
   at an authentication stage, the steps of:
   acquiring a probe signal y from a physical object to be authenticated;
   applying the mapper and classifier, at least one of which is learned, to the probe signal y;
   producing a decision about authenticity of the physical object represented by the probe signal y based on output of the classifier,
   wherein said mapper is adapted to produce an estimate $\tilde{t}_i$ of blueprint $t_i$ based on fingerprint $x_i$ and said classifier is a one-class classifier, and
   the method further comprises, at said training stage, the steps of:
   acquiring said set of blueprints $\{t_i\}^N_{i=1}$ comprising at least one blueprint $t_i$,
   providing a set of similarity scores for said blueprints;
   performing a joint training of said mapper and one-class classifier on said set of training signals $\{x_i\}^N_{i=1}$ and said set of blueprints $\{t_i\}^N_{i=1}$ to obtain a jointly learned mapper and a jointly learned one-class classifier; and
   at said authentication stage, the method further comprises the steps of:
   applying jointly the mapper and one-class classifier to the probe signal y; and
   said output of the one-class classifier allowing a decision about authenticity of the object represented by the probe signal y, being produced based on fingerprints $x_i$ and/or blueprints $t_i$.

2. The method according to the claim 1, wherein:
   said fingerprints $\{x_i\}^N_{i=1}$ and blueprints $\{t_i\}^N_{i=1}$ represent paired data,
   said mapper is realized by a hand-crafted mapper or by a learnable mapper, and
   said output of the one-class classifier allowing a decision about authenticity of the object represented by the probe signal y, being produced based on blueprints $t_i$.

3. The method according to claim 1, further comprising, at said training stage, the step of providing a set of similarity scores for said fingerprints, and wherein:
   said fingerprints $\{x_i\}^N_{i=1}$ and blueprints $\{t_i\}^N_{i=1}$ represent paired data,
   said mapper is realized by a hand-crafted mapper or by a learnable mapper, and
   said output of the one-class classifier allowing a decision about authenticity of the object represented by the probe signal y, being produced based on fingerprints $x_i$ and blueprints $t_i$.

4. The method according to claim 1, wherein said mapper is realized by an encoder adapted to produce an estimate $\tilde{t}_i$ of blueprint $t_i$ based on fingerprint $x_i$ and the method further comprises, at said training stage, the steps of:
   providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data;
   providing a decoder adapted to produce an estimate $\hat{x}_i$ of fingerprint $x_i$ based on blueprint $t_i$, a set of similarity scores for said fingerprints, fingerprint discriminators and blueprint discriminators;
   performing a joint training of said encoder, decoder, fingerprint discriminators and blueprint discriminators and one-class classifier on said set of pairs of blueprints and fingerprints $\{t_i, x_i\}^N_{i=1}$ and said unpaired blueprints $\{t_j\}^J_{j=1}$ and fingerprints $\{x_j\}^J_{j=1}$, to obtain a jointly learned encoder, decoder, fingerprint and blueprint discriminators and one-class classifier, with said encoder and decoder being trained in a direct way $x \rightarrow \tilde{t} \rightarrow \hat{x}$ from fingerprints $x_i$ of said set of pairs of blueprints and fingerprints $\{t_i, x_i\}^N_{i=1}$; and at said authentication stage, the steps of:
applying jointly the learned encoder, decoder, fingerprint discriminators and blueprint discriminators and one-class classifier to the probe signal y;
said output of the one-class classifier, allowing a decision about authenticity of the object represented by the probe signal y, being produced based on blueprints $t_i$.

5. The method of claim 1, wherein said mapper is realized by an encoder adapted to produce an estimate $\tilde{t}_j$ of blueprint $t_i$ based on fingerprint $\tilde{x}_j$, and the method further comprises, at said training stage, the steps of:
providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data;
providing a decoder adapted to produce an estimate $\hat{x}_i$ of fingerprint $x_i$ based on blueprint $t_i$, a set of similarity scores for said fingerprints, fingerprint discriminators and blueprint discriminators,
performing a joint training of said encoder, decoder, fingerprint discriminators and blueprint discriminators and one-class classifier on said set of pairs of blueprints and fingerprints $\{t_i, x_i\}^N_{i=1}$ and said unpaired blueprints $\{t_j\}^J_{j=1}$ and fingerprints $\{x_j\}^J_{j=1}$, to obtain a jointly learned encoder, decoder, fingerprint and blueprint discriminators and one-class classifier, with said encoder and decoder being trained in a reverse way $t \to \tilde{x} \to \hat{t}$ from blueprints $t_i$ of said set of pairs of blueprints and fingerprints $\{t_i, x_i\}^N_{i=1}$, and
at said authentication stage, the steps of:
applying jointly the learned decoder, fingerprint discriminators and one-class classifier to the probe signal y,
said output of the one-class classifier, allowing a decision about authenticity of the object represented by the probe signal y, being produced based on blueprints $t_i$.

6. The method according to claim 1, wherein said mapper is realized by an encoder adapted to produce an estimate $\tilde{t}_j$ of blueprint $t_i$ based on fingerprint $x_i$ and the method further comprises, at said training stage, the steps of:
providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data,
providing a decoder adapted to produce an estimate $\hat{x}_j$ of fingerprint $x_i$ based on blueprint $t_i$, a set of similarity scores for said fingerprints, fingerprint discriminators and blueprint discriminators,
performing a joint training of said encoder, decoder, fingerprint discriminators and blueprint discriminators and one-class classifier on said set of pairs of blueprints and fingerprints $\{t_i, x_i\}^N_{i=1}$ and said unpaired blueprints $\{t_j\}^J_{j=1}$ and fingerprints $\{x_j\}^J_{j=1}$ to obtain a jointly learned encoder, decoder, fingerprint and blueprint discriminators and one-class classifier, with said encoder and decoder being trained in two ways combining a direct way $x \to \hat{t} \to \hat{x}$ from fingerprints $x_i$ of said set of pairs of blueprints and fingerprints $\{t_i, x_i\}^N_{i=1}$ and a reverse way $t \to \tilde{x} \to \hat{t}$ from blueprints $t_i$ of said set of pairs of blueprints and fingerprints $\{t_i, x_i\}^N_{i=1}$, and at said authentication stage, the steps of:
applying jointly the learned encoder, decoder, fingerprint discriminators, and blueprint discriminators and one-class classifier to the probe signal y,
said output of the one-class classifier, allowing a decision about authenticity of the object represented by the probe signal y, being produced based on fingerprints $x_i$ and/or blueprints $t_i$.

7. The method according to claim 1, wherein said authentication is performed only from the blueprint $t_i$ or only from the fingerprint $x_i$ or jointly from the blueprint-fingerprint pair $(t_i, x_i)$ representing an object with the index i.

8. The method according to claim 1, wherein said sets of similarity scores for said fingerprints and/or for said blueprints are each sets of multi-metric similarity scores measuring similarity and comprising each at least two metrics chosen from the group comprising Euclidean $l_2$-norm, $l_1$-norm or generally $l_p$-norm, Pearson correlation, Hamming distance, moment matching and embedded space distances.

9. The method according to claim 1, wherein output of said multi-metric similarity scores is concatenated into a feature vector and serves as an input to said one-class classifier which is implemented as a kernel one-class SVM, deep classifier or as a hand-crafted decision rule bounding said set of multi-metric similarity scores from those of hypothetical fakes.

10. The method according to claim 1, wherein said blueprints $\{t_i\}^N_{i=1}$ are secured and kept secret by an adequate securing process at the stage of generating, providing or acquiring the blueprints $\{t_i\}^N_{i=1}$, the securing process being chosen from the group comprising of modulation by use of a secret key k, modulation by use of a secret mapping, modulation by use of a space of secret carriers of a transform domain, such as to produce modulated blueprints $\{t^s\}^N_{i=1}$.

11. The method according to claim 1, wherein said blueprints $\{t_i\}^N_{i=1}$ are provided by a party manufacturing and/or commercializing the objects to be authenticated and/or are acquired by a party supposed to provide for the authentication, in particular by examining the objects to be authenticated in a non-invasive manner.

12. The use of a method according to claim 1 comprising selecting an application chosen from a group comprising protection of documents, certificates, contracts, identity documents, packaging, secure labels, stickers, banknotes, checks, luxury goods such as watches, precious stones and metals, diamonds, electronics, chips, holograms, medicaments, cosmetics, food, spare and medical parts and components and providing the related object tracking and tracing, circulation and delivery monitoring and connectivity to the corresponding database records including blockchain.

13. The use of a method according to claim 1 comprising selecting an application chosen from a group comprising generation of synthetic samples of printed objects acquired under various imaging conditions and simulation of various distortions in imaging systems that include the noise in RAW images under various settings of imaging device, geometric aberrations and defocusing.

14. The use of a method according to claim 1 comprising authentication of a person from a probe signal y with respect to a reference blueprint $t_i$ reproduced on an identification document of said person or stored in some electronic form in private or public domain and a fingerprint $x_i$ representing reference biometric data of said person.

15. The use of a method according to claim 1 comprising selecting an application chosen from a group comprising automatic quality estimation of newly produced objects and anomaly detection during manufacturing.

16. The method according to claim 1, wherein said mapper is realized by an encoder adapted to produce an estimate $\tilde{t}_j$ of blueprint $t_i$ based on fingerprint $x_i$ and the method further comprises, at said training stage, the steps of:
providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data;

providing a decoder adapted to produce an estimate $\hat{x}_i$ of fingerprint $x_i$ based on blueprint $t_i$, a set of similarity scores for said fingerprints, fingerprint discriminators and blueprint discriminators;

performing a joint training of said encoder, decoder, fingerprint discriminators and blueprint discriminators and one-class classifier on said set of pairs of blueprints and fingerprints $\{t_i, x_i\}^N_{i=1}$ or said unpaired blueprints $\{t_j\}^J_{j=1}$ and fingerprints $\{x_j\}^J_{j=1}$ to obtain a jointly learned encoder, decoder, fingerprint and blueprint discriminators and one-class classifier, with said encoder and decoder being trained in a direct way $x \rightarrow \tilde{t} \rightarrow \hat{x}$ from fingerprints $x_i$ of said set of pairs of blueprints and fingerprints $\{t_i, x_i\}^N_{i=1}$; and at said authentication stage, the steps of:

applying jointly the learned encoder, decoder, fingerprint discriminators and blueprint discriminators and one-class classifier to the probe signal y;

said output of the one-class classifier, allowing a decision about authenticity of the object represented by the probe signal y, being produced based on blueprints $t_i$.

17. The method of claim 1, wherein said mapper is realized by an encoder adapted to produce an estimate $\hat{t}_i$ of blueprint $t_i$ based on fingerprint $\tilde{x}_i$ and the method further comprises, at said training stage, the steps of:

providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data, providing a decoder adapted to produce an estimate $\tilde{x}_i$ of fingerprint $x_i$ based on blueprint $t_i$, a set of similarity scores for said fingerprints, fingerprint discriminators and blueprint discriminators, performing a joint training of said encoder, decoder, fingerprint discriminators and blueprint discriminators and one-class classifier on said set of pairs of blueprints and fingerprints $\{t_i, x_i\}^N_{i=1}$ or said unpaired blueprints $\{t_j\}^J_{j=1}$ and fingerprints $\{x_j\}^J_{j=1}$ to obtain a jointly learned encoder, decoder, fingerprint and blueprint discriminators and one-class classifier, with said encoder and decoder being trained in a reverse way $t \rightarrow \tilde{x} \rightarrow \hat{t}$ from blueprints $t_i$ of said set of pairs of blueprints and fingerprints $\{t_i, x_i\}^N_{i=1}$, and at said authentication stage, the steps of:

applying jointly the learned decoder, fingerprint discriminators and one-class classifier to the probe signal y, said output of the one-class classifier, allowing a decision about authenticity of the object represented by the probe signal y, being produced based on blueprints $t_i$.

18. The method according to claim 1, wherein said mapper is realized by an encoder adapted to produce an estimate $\hat{t}_i$ of blueprint $t_i$ based on fingerprint $x_i$ and the method further comprises, at said training stage, the steps of:

providing, next to said fingerprints $\{x_i\}^N_{i=1}$ and blueprints $\{t_i\}^N_{i=1}$ representing a set of pairs of blueprints and fingerprints $\{t_i, x_i\}^N_{i=1}$, blueprints $\{t_j\}^J_{j=1}$ and fingerprints $\{x_j\}^J_{j=1}$ representing unpaired data, providing a decoder adapted to produce an estimate $\tilde{x}_i$ of fingerprint $x_i$ based on blueprint $t_i$, a set of similarity scores for said fingerprints, fingerprint discriminators and blueprint discriminators, performing a joint training of said encoder, decoder, fingerprint discriminators and blueprint discriminators and one-class classifier on said set of pairs of blueprints and fingerprints $\{t_i, x_i\}^N_{i=1}$ or said unpaired blueprints $\{t_j\}^J_{j=1}$ and fingerprints $\{x_j\}^J_{j=1}$ to obtain a jointly learned encoder, decoder, fingerprint and blueprint discriminators and one-class classifier, with said encoder and decoder being trained in two ways combining a direct way $x \rightarrow \tilde{t} \rightarrow \hat{x}$ from fingerprints $x_i$ of said set of pairs of blueprints and fingerprints $\{t_i, x_i\}^N_{i=1}$ and a reverse way $t \rightarrow \tilde{x} \rightarrow \hat{t}$ from blueprints $t_i$ of said set of pairs of blueprints and fingerprints $\{t_i, x_i\}^N_{i=1}$, and at said authentication stage, the steps of:

applying jointly the learned encoder, decoder, fingerprint discriminators, and blueprint discriminators and one-class classifier to the probe signal y, said output of the one-class classifier, allowing a decision about authenticity of the object represented by the probe signal y, being produced based on fingerprints $x_i$ and/or blueprints $t_i$.

19. The method according to claim 4, wherein said discriminators are realized as criteria implementing density ration estimation, MMD, Wasserstein or generalized divergences, U-net with a latent and output space used as a global and local discrimination, the discriminators being applied to the entire data or only to its parts having further aggregation of scores of local discriminators.

20. The method according to claim 4, wherein said encoder and decoder are represented as deep neural networks and implemented based on U-net architecture, several down sampling convolutional layers followed by several ResNet layers and several up sampling convolutional layers, invertable networks such as normalizing FLOWS or similar ones and also by injecting the randomization.

21. The method according to claim 4, wherein said encoder, decoder and discriminators are trained from target samples $x_1, \ldots, x_K$ representing examples of printing and acquisition or fakes.

22. The method according to claim 4, wherein said encoder, decoder and discriminators are trained from parameters defining printer settings encoded by the encoder and phone settings encoded by the encoder.

23. The method according to claim 4, wherein said encoder and decoder are trained on paired data of blueprints-fingerprint $\{t_i, x_i\}^N_{i=1}$ with similarity scores for intra-modal encodings of fingerprint-to-blueprint and blueprint-to-fingerprint and on unpaired data of blueprints $\{t_i\}^N_{i=1}$ and fingerprint with discriminators estimating the proximity of synthetic data to real data of corresponding modalities.

24. The method according to claim 4, wherein said learned encoder and decoder are used to produce synthetic samples $\{\tilde{x}_i\}^N_{i=1}$ in a controlled proximity to the manifold of original fingerprints $\{x_i\}^N_{i=1}$ from said set of blueprints $\{t_i\}^n_{i=1}$, the synthetic samples $\{\tilde{x}_i\}^N_{i=1}$ being used to train the classifier.

25. The method according to claim 24, wherein said synthetic samples $\{\tilde{x}_i\}^N_{i=1}$ are within boundaries of the manifold of original fingerprints $\{x_i\}^N_{i=1}$ and said one-class classifier is trained on an augmented training set comprising both original fingerprints $\{xi_i\}^N_{i=1}$ and synthetic samples $\{\tilde{x}_i\}^N_{i=1}$, or the synthetic samples $\{\tilde{x}_i\}^N_{i=1}$ are in close proximity to the manifold of original fingerprints $\{x_i\}^N_{i=1}$ and the synthetic samples $\{\tilde{x}_i\}^N_{i=1}$ are considered as worst case fakes to original fingerprints $\{x_i\}^N_{i=1}$ and the classifier is trained in a supervised way.

26. The method according to claim 24, wherein said synthetic samples $\{x_i\}^N_{i=1}$ generated in close proximity to the manifold of original fingerprints $\{x_i\}^N_{i=1}$ are considered as synthetic fakes representing non-authentic samples and the encoder and decoder are trained to maximize the mutual information for the encoder path and encoder-decoder path encoding the original blueprints and fingerprints while performing the corresponding minimization of mutual information for the same encoder-decoder while operating on synthetic fakes.

27. A device comprising the mapper of claim 1 and the classifier of claim 1, the device configured to perform the steps of claim 1, and the device selected from a group consisting of a mobile phone, a smart phone equipped with a camera, a digital photo apparatus, a barcode reader equipped with a camera, a scanning device, and a portable microscope connected to any portable device equipped with communication capability.

28. A non-transitory, tangible computer-readable medium storing instructions that, when executed by a computer, cause it to implement the method according to claim 1.

* * * * *